United States Patent
Akins, III et al.

(10) Patent No.: US 6,937,729 B2
(45) Date of Patent: *Aug. 30, 2005

(54) REPRESENTING ENTITLEMENTS TO SERVICE IN A CONDITIONAL ACCESS SYSTEM

(75) Inventors: Glendon L. Akins, III, Gainesville, GA (US); Robert O. Banker, Cumming, GA (US); Michael S. Palgon, Atlanta, GA (US); Howard G. Pinder, Norcross, GA (US); Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 732 days.

This patent is subject to a terminal disclaimer.

(21) Appl. No.: 09/930,901

(22) Filed: Aug. 16, 2001

(65) Prior Publication Data

US 2001/0053226 A1 Dec. 20, 2001

Related U.S. Application Data

(63) Continuation of application No. 09/487,076, filed on Jan. 19, 2000, now Pat. No. 6,292,568, which is a continuation of application No. 09/126,783, filed on Jul. 31, 1998, now abandoned, and a continuation-in-part of application No. 09/111,958, filed on Jul. 8, 1998, now abandoned, and a continuation-in-part of application No. 08/767,535, filed on Dec. 16, 1996, now Pat. No. 6,005,938, and a continuation-in-part of application No. 08/580,759, filed on Dec. 29, 1995, now Pat. No. 5,870,474, and a continuation-in-part of application No. 08/415,617, filed on Apr. 3, 1995, now Pat. No. 5,742,677.

(60) Provisional application No. 60/054,575, filed on Aug. 1, 1997, provisional application No. 60/054,578, filed on Aug. 1, 1997, and provisional application No. 60/007,962, filed on Dec. 4, 1995.

(51) Int. Cl.[7] .............................................. H04N 7/167
(52) U.S. Cl. ..................... 380/239; 380/241; 380/202
(58) Field of Search ................................ 380/239–242, 380/20, 21, 25

(56) References Cited

U.S. PATENT DOCUMENTS

| 4,155,042 A | 5/1979 | Permut et al. |
| 4,358,672 A | 11/1982 | Hyatt et al. |

(Continued)

FOREIGN PATENT DOCUMENTS

| EP | 0 723 371 A | 7/1996 |
| EP | 0 752 786 A | 1/1997 |
| WO | WO 94/13107 A | 6/1994 |
| WO | WO 95/29560 A | 11/1995 |

OTHER PUBLICATIONS

ISO/IEC 13818–1, "Information Technology—Generic Coding of Moving Pictures and Associated Audio Systems," Draft of: Nov. 13, 1994.

(Continued)

*Primary Examiner*—Ayaz Sheikh
*Assistant Examiner*—Longbit Chai

(57) ABSTRACT

A cable television system provides conditional access to services. The cable television system includes a headend from which service "instances", or programs, are broadcast and a plurality of set top units for receiving the instances and selectively decrypting the instances for display to system subscribers. The service instances are encrypted using public and/or private keys provided by service providers or central authorization agents. Keys used by the set tops for selective decryption may also be public or private in nature, and such keys may be reassigned at different times to provide a cable television system in which piracy concerns are minimized.

45 Claims, 21 Drawing Sheets

U.S. PATENT DOCUMENTS

| | | | |
|---|---|---|---|
| 4,388,643 A | 6/1983 | Aminetzah | |
| 4,405,829 A | 9/1983 | Rivest et al. | |
| 4,531,020 A | 7/1985 | Weschselberger et al. | |
| 4,600,921 A | 7/1986 | Thomas et al. | |
| 4,613,901 A | 9/1986 | Gilhousen et al. | |
| 4,634,807 A | 1/1987 | Chorley et al. | |
| 4,649,533 A | 3/1987 | Chorley et al. | |
| 4,658,093 A | 4/1987 | Hellman | |
| 4,712,238 A | 12/1987 | Gilhousen et al. | |
| 4,712,239 A | 12/1987 | Frezza | |
| 4,736,422 A | 4/1988 | Mason | |
| 4,823,385 A | 4/1989 | Hegendörfer | |
| 4,864,615 A | 9/1989 | Bennett et al. | |
| 4,866,770 A | 9/1989 | Seth-Smith et al. | |
| 4,885,777 A | 12/1989 | Takaragi et al. | |
| 4,887,296 A | 12/1989 | Horne | |
| RE33,189 E | 3/1990 | Lee et al. | |
| 4,912,762 A | 3/1990 | Lee et al. | |
| 4,982,430 A | 1/1991 | Frezza et al. | |
| 4,993,068 A | 2/1991 | Piosenka et al. | |
| 5,003,591 A | 3/1991 | Kauffman | |
| 5,018,196 A | 5/1991 | Takaragi et al. | |
| 5,029,207 A | 7/1991 | Gammie | |
| 5,036,537 A | 7/1991 | Jeffers et al. | |
| 5,073,935 A | 12/1991 | Pastor | |
| RE33,808 E | 1/1992 | Wright, Jr. | |
| 5,124,117 A | 6/1992 | Tatebayashi et al. | |
| 5,142,578 A | 8/1992 | Matyas et al. | |
| 5,151,782 A | 9/1992 | Ferraro | |
| 5,155,591 A | 10/1992 | Wachob | |
| 5,175,765 A | 12/1992 | Perlman | |
| 5,231,665 A | 7/1993 | Auld et al. | |
| 5,235,643 A | 8/1993 | Anderson et al. | |
| 5,237,610 A | 8/1993 | Gammie et al. | |
| 5,243,652 A | 9/1993 | Teare et al. | |
| 5,249,230 A | 9/1993 | Mihm, Jr. | |
| 5,270,822 A * | 12/1993 | Choi | |
| 5,282,248 A * | 1/1994 | DeJoy | |
| 5,282,249 A * | 1/1994 | Cohen et al. | |
| 5,285,497 A * | 2/1994 | Thatcher, Jr. | |
| 5,301,233 A * | 4/1994 | Coutrot et al. | |
| 5,341,425 A * | 8/1994 | Wasilewski et al. | |
| 5,343,527 A * | 8/1994 | Moore | |
| 5,381,477 A * | 1/1995 | Beyers, III et al. | |
| 5,381,481 A * | 1/1995 | Gammie et al. | |
| 5,400,401 A * | 3/1995 | Wasilewski et al. | |
| 5,402,490 A * | 3/1995 | Mihm, Jr. | |
| 5,414,773 A * | 5/1995 | Handelman | |
| 5,420,866 A * | 5/1995 | Wasilewski | |
| 5,425,101 A * | 6/1995 | Woo et al. | |
| 5,432,542 A * | 7/1995 | Thibadeau et al. | |
| 5,440,633 A * | 8/1995 | Augustine et al. | |
| 5,465,299 A * | 11/1995 | Matsumoto et al. | |
| 5,473,692 A * | 12/1995 | Davis | |
| 5,481,542 A | 1/1996 | Logston et al. | |
| 5,481,613 A | 1/1996 | Ford et al. | |
| 5,488,410 A | 1/1996 | Lieberfarb et al. | |
| 5,497,422 A | 3/1996 | Tysen et al. | |
| 5,499,294 A | 3/1996 | Friedman | |
| 5,499,295 A | 3/1996 | Cooper | |
| 5,506,904 A | 4/1996 | Sheldrick et al. | |
| 5,509,073 A | 4/1996 | Monnin et al. | |
| 5,519,780 A | 5/1996 | Woo et al. | |
| 5,524,052 A | 6/1996 | Augustine et al. | |
| 5,550,984 A | 8/1996 | Gelb | |
| 5,557,678 A | 9/1996 | Ganesan | |
| 5,557,765 A | 9/1996 | Lipner et al. | |
| 5,559,889 A | 9/1996 | Easter et al. | |
| 5,563,950 A | 10/1996 | Easter et al. | |
| 5,565,909 A | 10/1996 | Thibadeau et al. | |
| 5,568,552 A | 10/1996 | Davis | |
| 5,568,554 A | 10/1996 | Eastlake, 3rd | |
| 5,583,939 A | 12/1996 | Chang et al. | |
| 5,588,058 A | 12/1996 | Le Berre | |
| 5,590,202 A | 12/1996 | Bestler et al. | |
| 5,621,793 A | 4/1997 | Bednarek et al. | |
| 5,671,276 A | 9/1997 | Eyer et al. | |
| 5,675,649 A | 10/1997 | Brennan et al. | |
| 5,740,246 A | 4/1998 | Saito | |
| 5,742,677 A | 4/1998 | Pinder et al. | |
| 5,764,770 A | 6/1998 | Schipper et al. | |
| 5,787,172 A | 7/1998 | Arnold | |
| 5,857,020 A | 1/1999 | Peterson, Jr. | |
| 5,862,220 A | 1/1999 | Perlman | |
| 5,870,474 A | 2/1999 | Wasilewski et al. | |
| 5,920,626 A | 7/1999 | Durden et al. | |
| 6,005,938 A * | 12/1999 | Banker et al. | 380/239 |
| 6,105,134 A | 8/2000 | Pinder et al. | |
| 6,246,767 B1 | 6/2001 | Akins, III et al. | |
| 6,292,568 B1 * | 9/2001 | Akins et al. | 380/239 |

OTHER PUBLICATIONS

ISO/IEC JTC1/SC29/WG11, "Universal Multi–Program Multiplex and Transport for MPEG–2 Systems," Jan. 1993.

ISO/IEC JTC1/SC29/WG11, "An MGEG–2 Multi–Program Multiplex Syntax," Jan. 1993.

ISO/IEC JTC1/SC2/WG11, "Requirements and Method for High–Level Multiplexing of MPEG and Other Digital Service Bitstreams with Universal Transport Layer," Nov. 1992.

Whitfield, Diffie, "Authentication and Authenticated Key Exchanges," Designs, Codes and Cryptography, An International Journal, vol. 2, No. 2, Jun. 1992, pp. 107–125.

Schneier, Bruce, "Applied Cryptography Second Edition: Protocols, Algorithms and Source Code in C," pp. 357–363.

Menezes, Alfred J., "Handbook of Applied Cryptography," pp. 506–525.

TM–1244 Rev. 4, "Final Technical Report of the Conditional Access Specialist Group," Nov. 17, 1994.

Coutrot et al., "A Single Conditional Access System for Satellite–Cable and Terrestrial TV," IEEE Transactions on Consumer Electronics, vol. 35, No. 3, Aug. 1989, pp. 464–468.

Louise Claude Guillou and Jean–Luc Giachetti, "Encipherment and Conditional Access," SMPTE Journal, 103 (1994) Jun., No. 6, White Plains, NY.

\* cited by examiner

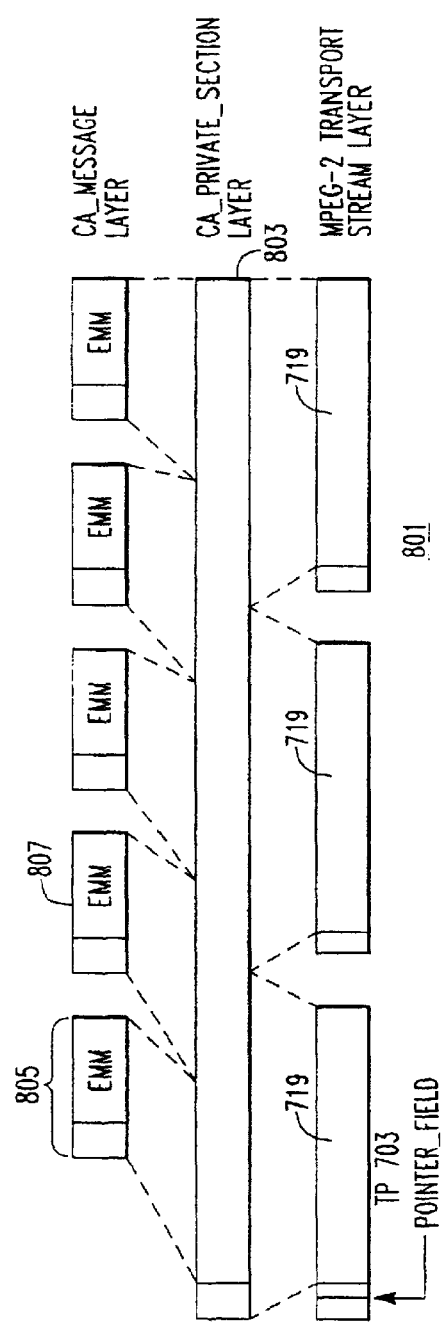
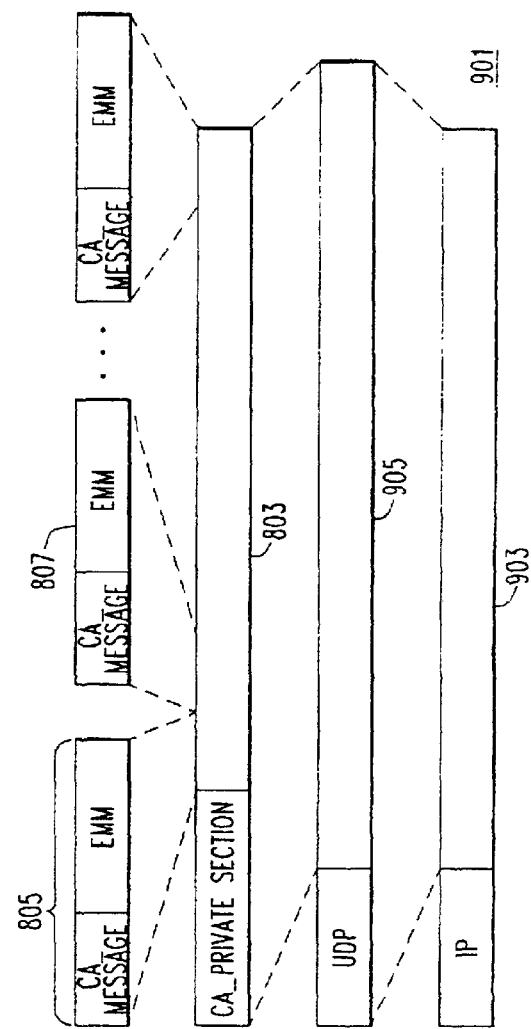
FIG. 8
FIG. 9

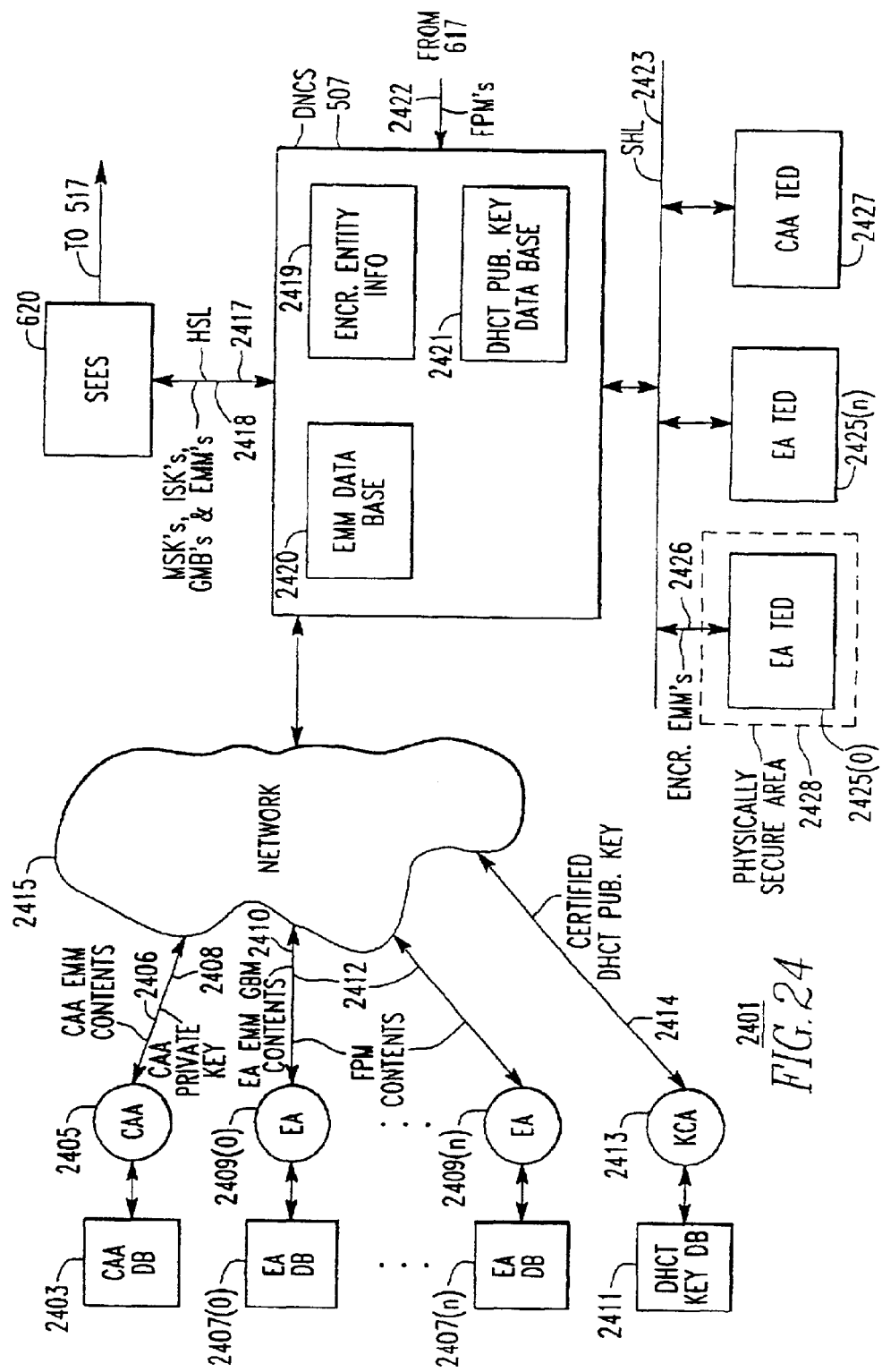

REPRESENTING ENTITLEMENTS TO SERVICE IN A CONDITIONAL ACCESS SYSTEM

CROSS-REFERENCE TO RELATED APPLICATIONS

This Application is a continuation of application Ser. No. 09/487,076, filed Jan. 19, 2000 now U.S. Pat. No. 6,292,568, presently allowed, which is a continuation of application Ser. No. 09/126,783, filed Jul. 31, 1998, now abandoned, which claims the benefit of U.S. Provisional Application No. 60/054,575, filed Aug. 1, 1997, and is a CIP of Application No. 09/111,958, filed Jul. 8, 1998, now abandoned, which claims the benefit of U.S. Provisional Application No. 60/054,578, filed Aug. 1, 1997, and is CIP of application Ser. No. 08/767,535, filed Dec. 16, 1996, U.S. Pat. No. 6,005,938, and is CIP of Application No. 08/580,759 filed Dec. 29, 1995, U.S. Pat. No. 5,870,474, which claims the benefit of U.S. Provisional Application No. 60/007,962, filed Dec. 4, 1995, and is CIP of application Ser. No. 08/415,617, filed Apr. 3, 1995, U.S. Pat. No. 5,742,677.

RELATED PATENT APPLICATIONS

The present application descends from an application which was one of seven original applications with identical Detailed Descriptions. All of these applications have the same filing date and the same assignee. The serial numbers and filing dates of the six applications follow: Ser. No. 09/127,152, filed Jul. 31, 1998, presently abandoned, for which a continuation Ser. No. 09/488,104 was filed on Jan. 20, 2000; issued as U.S. Pat. No. 6,246,767; Ser. No. 09/126,921, filed Jul. 31, 1998, issued as U.S. Pat. No. 6,157,719; Ser. No. 09/127,273, filed Jul. 31, 1998, presently abandoned, for which a continuation Ser. No. 09/493,409 was filed on Jan. 28, 2000; Ser. No. 09/127,352, filed Jul. 31, 1998, presently abandoned, for which a continuation Ser. No. 09/488,230 was filed on Jan. 20, 2000; Ser. No. 09/126,888, filed Jul. 31, 1998, presently abandoned, for which a continuation Ser. No. 09/464,794 was filed on Dec. 16, 1999; and Ser. No. 09/126,795, filed Jul. 31, 1998, issued as U.S. Pat. No. 6,105,134.

FIELD OF THE INVENTION

The invention concerns systems for protecting information and more particularly concerns systems for protecting information that is transmitted by means of a wired or wireless medium against unauthorized access.

BACKGROUND OF THE INVENTION

One way of distributing information is to broadcast it, that is, to place the information on a medium from which it can be received by any device that is connected to the medium. Television and radio are well-known broadcast media. If one wishes to make money by distributing information on a broadcast medium, there are a couple of alternatives. A first is to find sponsors to pay for broadcasting the information. A second is to permit access to the broadcast information only to those who have paid for it. This is generally done by broadcasting the information in scrambled or encrypted form. Although any device that is connected to the medium can receive the scrambled or encrypted information, only the devices of those users who have paid to have access to the information are able to unscramble or decrypt the information.

A service distribution organization, for example a CATV company or a satellite television company, provides its subscribers with information from a number of program sources, that is, collections of certain kinds of information. For example, the History Channel is a program source that provides television programs about history. Each program provided by the History Channel is an "instance" of that program source. When the service distribution organization broadcasts an instance of the program source, it encrypts or scrambles the instance to form encrypted instance. An encrypted instance contains instance data, which is the encrypted information making up the program.

An encrypted instance is broadcast over a transmission medium. The transmission medium may be wireless or it may be "wired", that is, provided via a wire, a coaxial cable, or a fiber optic cable. It is received in a large number of set top boxes. The function of set-top box is to determine whether encrypted instance should be decrypted and, if so, to decrypt it to produce a decrypted instance comprising the information making up the program. This information is delivered to a television set. Known set top boxes include decryptors to decrypt the encrypted instance.

Subscribers generally purchase services by the month (though a service may be a one-time event), and after a subscriber has purchased a service, the service distribution organization sends the set top box belonging to the subscriber messages required to provide the authorization information for the purchased services. Authorization information may be sent with the instance data or may be sent via a separate channel, for example, via an out-of-band RF link, to a set top box. Various techniques have been employed to encrypt the authorization information. Authorization information may include a key for a service of the service distribution organization and an indication of what programs in the service the subscriber is entitled to watch. If the authorization information indicates that the subscriber is entitled to watch the program of an encrypted instance, the set-top box decrypts the encrypted instance.

It will be appreciated that "encryption" and "scrambling" are similar processes and that "decryption" and "descrambling" are similar processes; a difference is that scrambling and descrambling are generally analog in nature, while encryption and description processes are usually digital.

The access restrictions are required in both analog and digital systems. In all systems, the continued technological improvements being used to overcome the access restrictions require more secure and flexible access restrictions. As more systems switch from an analog format to a digital format, or a hybrid system containing both analog and digital formats, flexible access restrictions will be required.

Restricting access to broadcast information is even more important for digital information. One reason for this is that each copy of digital information is as good as the original; another is that digital information can be compressed, and consequently, a given amount of bandwidth carries much more information in digital form; a third is that the service distribution organizations are adding reverse paths which permit a set-top box to send a message to the service distribution organization, thereby permitting various interactive services.

Thus, the service distribution organizations require access restrictions which are both more secure and more flexible than those in conventional systems

BRIEF DESCRIPTION OF THE DRAWING

FIG. 8 is a diagram of how EMMs are mapped into an MPEG-2 transport stream:

FIG. 9 is a diagram of how EMMs are mapped into an IP packet;

FIG. 24 is a diagram showing the relationship between TEDs and the rest of conditional access system 601;

Figure 1:
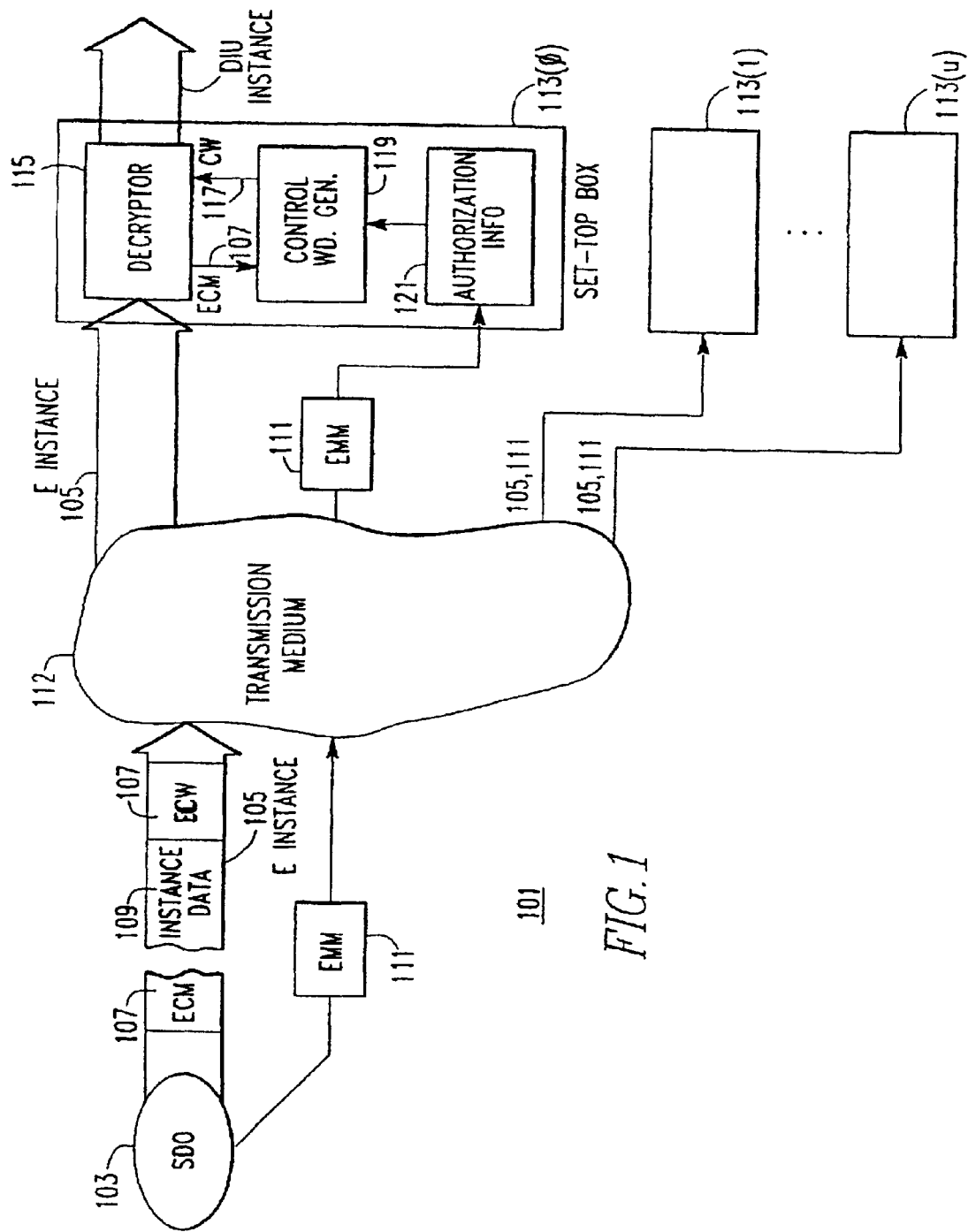
FIG. 1 is a block diagram of a conditional access system.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION OF A PREFERRED EMBODIMENT

The following Detailed Description will first provide a general introduction to a conditional access system and to encryption and decryption, will then describe how service instance encoding and decoding is done in a preferred embodiment, and will thereupon describe the techniques used in the preferred embodiment to authenticate the ECMs and EMMs of the preferred embodiment. Next, the Detailed Description will describe how EMMs can be used to dynamically add and remove access to services and the role of encryption and authentication in these operations. Finally, there will be a detailed exposition of how the techniques described in the foregoing are employed in a broadcast data delivery system with a node structure and a reverse path from the set top box to the head end, of how secure processors and memory are employed in the preferred embodiment to protect keys and entitlement information, and of how certain operations are performed in the preferred embodiment.

Conditional Access System Overview

FIG. 1 provides an overview of a system 101 for limiting access to broadcast information. Such systems will be termed in the as "conditional access systems". A service distribution organization 103, for example a CATV company or a satellite television company, provides its subscribers with information from a number of services, that is, collections of certain kinds of information. For example, the History Channel is a service that provides television programs about history. Each program provided by the History Channel is an "instance" of that service. When the service distribution organization broadcasts an instance of the service, it encrypts or scrambles the instance to form encrypted instance 105. Encrypted instance 105 contains instance data 109, which is the encrypted information making up the program, and entitlement control messages (ECM) 107. The entitlement control messages contain information needed to decrypt the encrypted portion of the associated instance data 109. A given entitlement control message is sent many times per second, so that it is immediately available to any new viewer or a service. In order to make decryption of instance data 109 even more difficult for pirates, the content of the entitlement control message is changed every few seconds, or more frequently.

Encrypted instance 105 is broadcast over a transmission medium 112. The medium may be wireless or it may be "wired", that is, provided via a wire, a coaxial cable, or a fiber optic cable. It is received in a large number of set top boxes 113(0. . . n), each of which is attached to a television set. It is a function of set-top box 113 to determine whether encrypted instance 105 should be decrypted and if so, to decrypt it to produce decrypted instance 123, which is delivered to the television set. As shown in detail with regard to set top box 113(0), set top box 113 includes decryptor 115, which uses a control word 117 as a key to decrypt encrypted instance 105. Control word 117 is produced by control word generator 119 from information contained in entitlement control message 107 and information from authorization information 121 stored in set-top box 113. For example, authorization information 121 may include a key for the service and an indication of what programs in the service the subscriber is entitled to watch. If the authorization information 121 indicates that the subscriber is entitled to watch the program of encrypted instance 105, control word generator 119 uses the key together with information from ECM 107 to generate control word 117. Of course, a new control word is generated for each new ECM 107.

The authorization information used in a particular set top box 113(*i*) is obtained from one or more entitlement management messages 111 addressed to set top box 113(*i*). Subscribers generally purchase services by the month (though a service may be a one-time event), and after a subscriber has purchased a service, service distribution organization 103 sends set top box 113(*i*) belonging to the subscriber entitlement management messages 111 as required to provide the authorization information 121 required for the purchased services. Entitlement management messages (EMMs) may be sent interleaved with instance data 109 in the same fashion as ECMs 107, or they may be sent via a separate channel, for example via an out-of-band RF link, to set top box 113(*i*), which stores the information from the entitlement management message (EMM) 111 in authorization information 121. Of course, various techniques have been employed to encrypt entitlement management messages 111.

Encryption and Decryption Generally

The encryption and decryption techniques used for service instance encoding and decoding belong to two general classes: symmetrical key techniques and public key techniques. A symmetrical key encryption system is one in which each of the entities wishing to communicate has a copy of a key; the sending entity encrypts the message using its copy of the key and the receiving entity decrypts the message using its copy of the key. An example symmetrical key encryption-decryption system is the Digital Encryption Standard (DES) system. A public key encryption system is one in which each of the entities wishing to communicate has its own public key-private key pair. A message encrypted with the public key can only be decrypted with the private key and vice-versa. Thus, as long as a given entity keeps its private key secret, it can provide its public key to any other entity that wishes to communicate with it. The other entity simply encrypts the message it wishes to send to the given entity with the given entity's public key and the given entity uses its private key to decrypt the message. Where entities are exchanging messages using public key encryption, each entity must have the other's public key. The private key can also be used in digital signature operations, to provide authentication. For details on encryption generally and symmetrical key and public key encryption in particular, see Bruce Schneier, *Applied Cryptography*, John Wiley and Sons, New York, 1994.

The design of an encryption system for a given application involves a number of considerations. As will be seen in the following, considerations that are particularly important in the broadcast message environment include the following:

key security: A symmetrical key system is useless if a third party has access to the key shared by the communicating parties, and a public key system is also useless if someone other than the owner of a given public key has access to the corresponding private key.

key certification: how can the recipient of a key be sure that the key he or she has received is really a key belonging to the entity to which the recipient wishes to send an encrypted message and not a key belonging to another entity which wishes to intercept the message?

message authentication: how can the recipient of a message be sure that the message is from the party it claims to be from, and/or that the message has not been altered?

speed of encryption and decryption: in general, symmetrical key encryption systems are faster than public key encryption systems and are preferred for use with real-time data.

key size: in general, the longer the key used in an encryption system, the more resources will be required to break the encryption and thereby gain access to the message.

All of the foregoing considerations are influenced by the fact that the environment in which a conditional access system operates must be presumed to be hostile. Many customers of broadcast services see nothing wrong with cheating the service provider and have nothing against tampering physically with the portion of the conditional access system that is contained in the receiver or using various cryptographic attacks to steal keys or to deceive the receiver about the source of the messages it receives. Moreover, the providers of the systems that actually broadcast the services do not necessarily have the same interests as the providers of the service content, and therefore need to control not only who can access a given instance of a service, but also what entities can offer services to a given receiver.

Figure 2A:
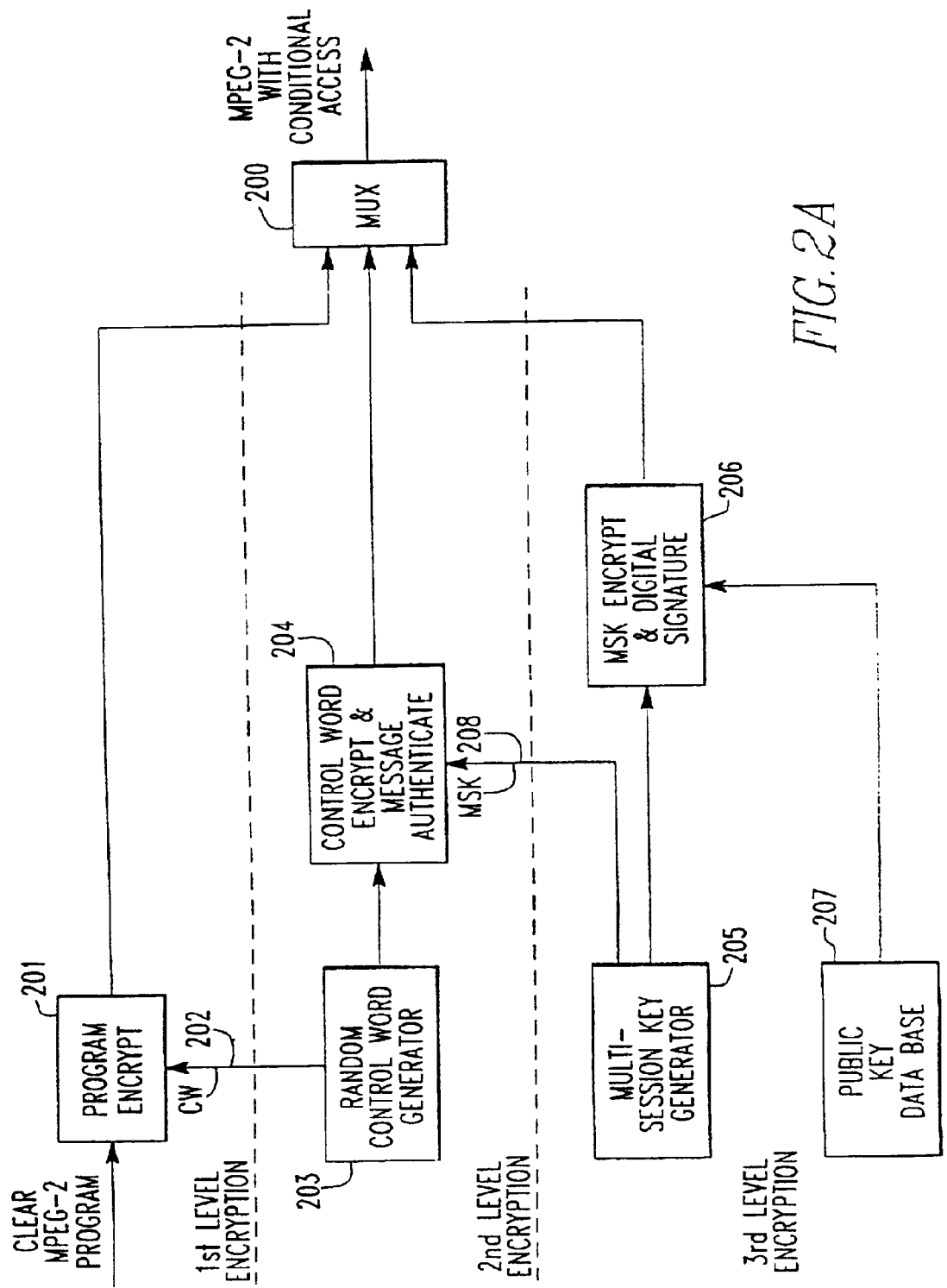
FIG. 2A is a block diagram of the service instance encryption techniques disclosed herein.
Figure 2B:
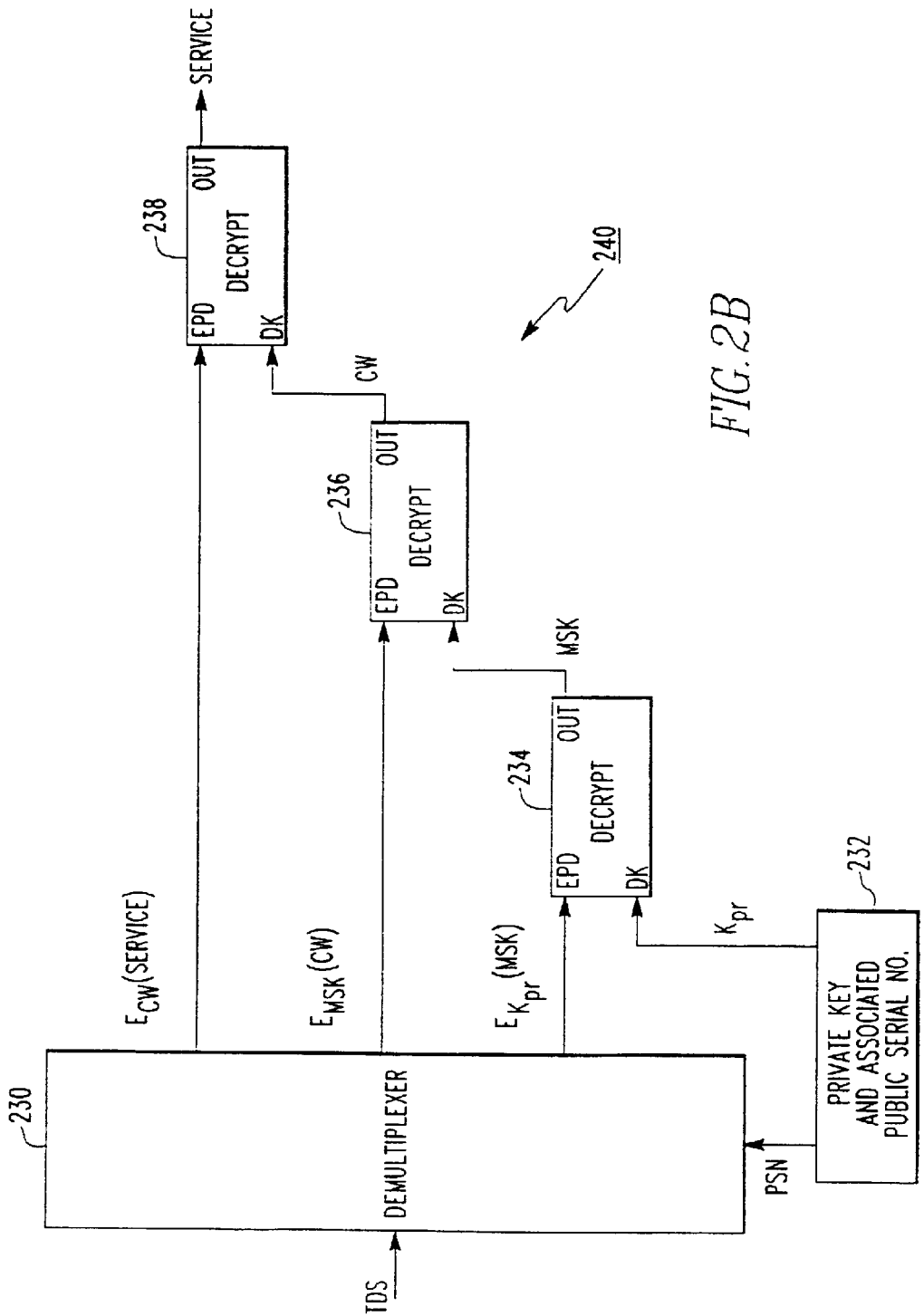
FIG. 2B is a block diagram of the service instance decryption techniques disclosed herein.

Service Instance Encryption and Decryption: FIGS. 2A and 2B

In overview, the encryption system of the present invention uses symmetrical key encryption techniques to encrypt and decrypt the service instance and public key encryption techniques to transport a copy of one of the keys used in the symmetrical key techniques of the key from the service provider to the set-top box.

In FIG. 2A, clear services such as the elementary digital bit streams which comprise MPEG-2 programs are sent through a $1^{st}$ level encryption called the Program Encrypt function 201, which is preferably a symmetric cipher such as the well-known DES algorithm. Each elementary stream may be individually encrypted and the resulting encrypted streams are sent to MUX 200 to be combined with other elementary streams and private data, such as conditional access data. The key used in the Program Encrypt function 201 is called the Control Word (CW) 202. The CW 202 is generated by control word Generator 203 which can be either a physically random number generator or can use a sequential counter with a suitable randomization algorithm to produce a stream of random CWs. A new CW is generated frequently, perhaps once every few seconds and is applied to each elementary stream on the same time scale. Each new CW is encrypted by Control Word Encrypt & Message Authenticate function 204 using a Multi-Session key (MSK) 208 provided by Multi-Session Key generator 205. The CW is then combined into an ECM 107 with other service-related information. The ECM 107 is authenticated by Control Word Encrypt & Message Authenticate function 204 which produces a message authentication code using a keyed-hash value derived from the message content combined with a secret which can be shared with the receiving set-top box 113. This secret is preferably part or all of the MSK 208. The message authentication code is appended to the rest of the ECM 107. The CW 202 is always encrypted before being sent along with the other parts of the ECM to MUX 200. This encryption is preferably a symmetric cipher such as the Triple-DES algorithm using two distinct 5-bit keys (which taken together comprise MSK 208).

The MSK 208 has a longer lifetime than CW 202. The MSK lifetime is typically hours to days in length. MSK 208 is both encrypted and digitally signed by MSK Encrypt & Digital Signature function 206 before being sent to MUX 200 encapsulated in EMM 111. MSK 208 and other parts of EMM 111 are preferably encrypted using a public key algorithm, such as the well-known RSA algorithm, with a public key associated with the specific set-top box 113 to which the EMM is addressed. The public keys of all set-top boxes 113 in a system 101 are stored in Public Key Data Base 207. The public keys in this data base are preferably certified by a certificate authority. The digital signature function in 206 is preferably the RSA digital signature method, although others could be used. In the case of an RSA digital signature, the private key which is used to make the signature belongs to the entitlement agent within service distribution organization 103 responsible for authorizing the associated service.

In FIG. 2B, the corresponding DHCT private key and associated DHCT public secure micro serial number are stored in memory 232 of decoder 240. Public secure micro serial number is provided so that demultiplexer 230 can select an encrypted multi-session key addressed to decoder 240 from transport data stream (TDS). Encrypted multi-session key $E_{kpr}$ (MSK) is decrypted in decryptor 234 using DHCT private key from memory 232 to provide multi-session key MSK. Demultiplexer 230 also selects from transport data stream TDS encrypted control word (CW) $E_{MSK}$ (CW). The encrypted CW is processed in decryptor 236 using multi-session key MSK as the decryption key to provide the unencrypted CW. The unencrypted CW preferably changes at a high rate, for example, once every few seconds. Demultiplexer 230 also selects from transport data stream TDS encrypted service $E_{CW}$ (SERVICE). The encrypted service is processed in decryptor 238 using the CW as the decryption key to recover the unencrypted service.

Figure 3:
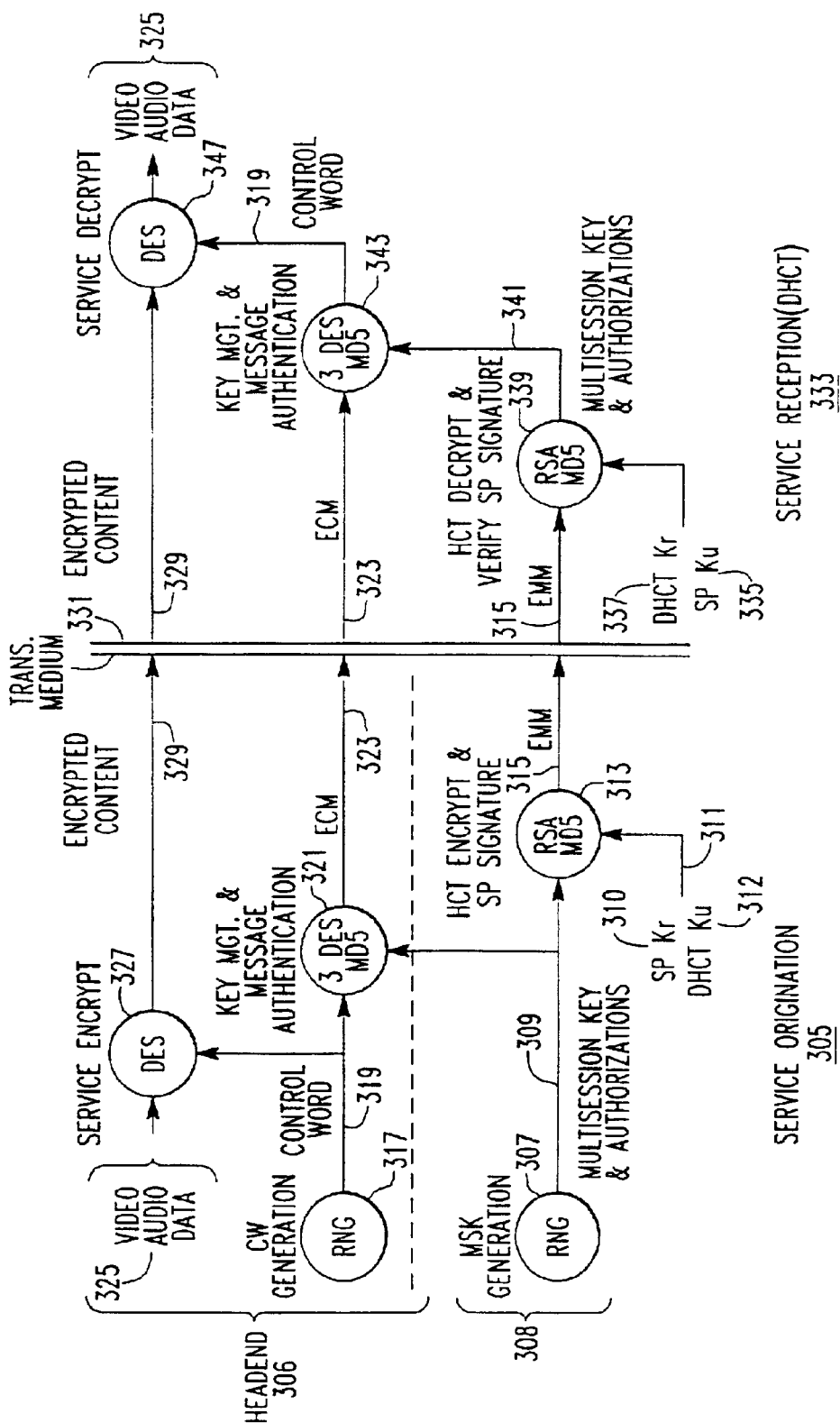
FIG. 3 is a more detailed block diagram of the service instance encryption and decryption techniques disclosed herein.

Detailed Implementation of the Encryption System of FIG. 2: FIG. 3

FIG. 3 presents more details about a preferred implementation of the system of FIG. 2. Encryption/decryption system 301 has two main components: service origination component 305 and service reception component 333. The two are connected by a transmission medium 331, which may be any medium which will carry a message from service origination component 305 to service reception component 333. Service reception component 333 is implemented in a set-top box, termed hereinafter a digital home communications terminal (DHCT). It may, however be implemented in any device which has the necessary computation power, for example, a personal computer or work station or an "intelligent" television set. In the service origination component, at least the portion labeled 306 is typically implemented in equipment located at the head end of a broadcasting system such as a cable television (CATV) or satellite TV system. In some embodiments, however, the head end may be provided with already-encrypted instances of the service. The remaining portion 308 may also be located at the head end, but may also be located anywhere which has access of some kind to head end 306 and service reception component 333. The latter is particularly the case if the EMMs are sent out of band, for example by way of a wide-area network such as the Internet. Also, the transmission medium may be storage media, where the service origination point is the manufacturer of the media, and the service reception component may be the element which reads the storage media. For example, the transmission medium can be a CD-ROM, DVD, floppy disk, or any other medium that can be transferred, physically, electronically, or otherwise.

Beginning with service origination portion 305, random number generator 307 is used to generate MSK 309. Next, an EMM 315 containing MSK 309 and related information is produced. EMM 315 also includes a sealed digest. The sealed digest has two purposes: to ensure that the information placed in EMM 315 by service origination 305 is the same information that arrives at DHCT 333 and to ensure that the information has in fact come from an entity which is empowered to give access to the service.

The sealed digest is made in two stages: first, a digest of the EMM's contents (here, MSK 309 and the related information) is made by hashing the contents in a secure one-way hash function to produce a relatively short bit string. The secure one-way hash function has three properties:

the contents that were hashed to produce the short bit string cannot be determined from the short bit string; and any change in what is hashed produces a change in the short bit string; and it is computationally infeasible to construct a different message which produces the same short bit string as the EMM.

The short bit string output of the hash function can thus be used to determine whether the contents of the EMM have changed in transit without disclosing those contents. The preferred embodiment uses the Message Digest 5 one way hash function, as indicated by the notation MD5. For details on one-way hash functions, see the Schneier reference, supra. The digest is a sealed digest because it is encrypted with a private key SP Kr 310 belonging to the entitlement agent (EA) that has the right to give the DHCT access to the service for which the MSK is used to produce the key. Before the sealed digest can be used to check whether the EMM was transmitted correctly, it must be decrypted using the entitlement agent's public key. The sealed digest thus confirms to the DHCT both that the contents of the EMM have been transmitted correctly and that the source of the EMM is the entitlement agent.

Once the sealed digest is made, the contents of the EMM (here, MSK 309 and the related information) are encrypted with the public key DHCT Ku 312 of the DHCT 333 to which EMM 315 is addressed and EMM 315, containing the encrypted contents and the sealed digest, is sent via transmission medium 331 to the DHCT 333. In the following, the notation Kr is used to indicate a private key and Ku is used to indicate a public key. The notation RSA indicates that the encryption is done using the well-known RSA public keys encryption algorithm.

As shown in DHCT 333, EMM 315 can only be decrypted by the DHCT 333 whose private key 337 (DHCT Kr) corresponds to the public key used to encrypt EMM 315. DHCT 333 decrypts EMM 315 and uses the sealed digest to determine whether the EMM 315 was correctly transmitted. The determination is made by using public key SP Ku 335 for the entitlement agent to decrypt the sealed digest. Then the contents of EMM 315 are hashed using the same secure one-way hash function that was used to make the digest. If the results of this hash are identical to the decrypted sealed digest, the determination succeeds. The check with the sealed digest will fail if the transmission to the DHCT 333 was corrupted in transit, if DHCT 333 does not have the private key corresponding to the public key used to encrypt the EMM (i.e., is not the DHCT 333 for which EMM 315 was intended), or if DHCT 333 does not have public key 335 (SP Ku) corresponding to the private key of the EA that was used to make the sealed digest. The latter will be the case if that DHCT 333 has not been given access to services provided by the entitlement agent. EMMs 315 addressed to DHCT 333 are sent repeatedly; consequently, if the problem was corruption in transit, an uncorrupted EMM 315 will be received shortly and the determination will succeed. How DHCT 333 comes to have SP Ku 335 needed to decrypt the sealed digest will be explained in more detail later.

The next stage in service origination 305 is generating control word 319 used to actually encrypt service instance 325 and generating the ECM 323 which carries the information needed to decrypt the service instance to DHCT 333. The control word 319 is generated by random number generator 317. This can be a true random number generator, whose output is the result of some basic underlying random physical process, or some other means, for example, the result of encrypting a value, called a "counter" (which increments by one after each use) with 3DES, using the MSK as the key. In the case of a true random number, the encrypted control word is transmitted in the ECM. In the case of the counter-based control word generation, the clear version of the "counter" is used in the transmitted ECM. As mentioned above, the control word is a short-term key, i.e, it has a life time of a few seconds or less. Included in the ECM 323 is a digest of the contents plus the MSK which is made using the MD5 one-way hash just described. The inclusion of the MSK in making the digest gives the entitlement agent to which the ECM 323 belongs a shared secret with the DHCTs 333 that are entitled to receive service instances from the entitlement agent and consequently prevents "spoofing" of ECMs 323, that is, provision of ECMs 323 from a source other than the entitlement agent. As will be seen in more detail later, the preferred embodiment uses the shared secret technique generally to authenticate messages which contain messages that have real-time value with regard to an instance of a service.

ECM 323 is sent together with encrypted content 329 to DHCT 333. The first ECM 323 for a given portion of encrypted content 329 must of course arrive at DHCT 333 before the encrypted content does. In the preferred embodiment, content 325 and ECM 323 are encoded according to the MPEG-2 standard. The standard provides for a transport stream which includes a number of component streams. Some of these carry content 329, another carries the ECMs 323, and a third carries the EMMs 315. Only the streams carrying content 329 are encrypted according to DES 329; since the control words in ECMs 323 and the contents of EMMs 315 have already been encrypted, no further encryption is needed when they are sent in the MPEG-2 transport stream. The manner in which EMMs and ECMs are transported in the MPEG-2 transport stream will be described in more detail later.

When an ECM 323 is received in DHCT 333, control word 319 is either decrypted or found by encrypting the counter value at 343 using the MSK. The integrity of the contents of the ECM 323 is checked by comparing the value resulting from hashing the contents plus some or all of the MSK (based on cryptographic principles) in the one-way hash function with the message digest contained in ECM 323. Included in the contents are control word 319 and information identifying the service instance 325 which ECM 323 accompanies. The identifying information is used together with the authorization information received with EMM 315 to determine whether DHCT 333 is authorized to receive the service instance 325. If it is, control word 319 is used in service decryptor 347 to decrypt encrypted content to produce original content 325.

System 301 offers a number of advantages with regard to security. It takes advantage of the speed of symmetrical encryption systems where that is needed to decrypt encrypted content 329 and the control word in ECM 323. The control word is protected by encrypting it using the MSK, and ECM 323 is authenticated by using some or all of MSK 309 as a shared secret between the entitlement agent and DHCT 333. MSK 309 is protected in turn by the fact that it is sent in an EMM which is encrypted using the DHCT's public key and by the fact that the EMM includes a sealed digest which is encrypted using the entitlement agent's private key. Further security is provided by the fact that service identification information from ECM 323 must agree with the authorization information received in EMM 315 before control word 319 is provided to service decryptor 347. For example, as described in detail in the Banker and Akins parent patent application supra, one use of the information in ECM 323 and EMM 315 is to prevent what are termed "replay attacks" on the encrypted services. In addition to being secure, system 301 is flexible. The authorization information contained in EMM 315 and the service identification information contained in ECM 323 together permit a wide range of access to service instances received in DHCT 333.

Figure 4:
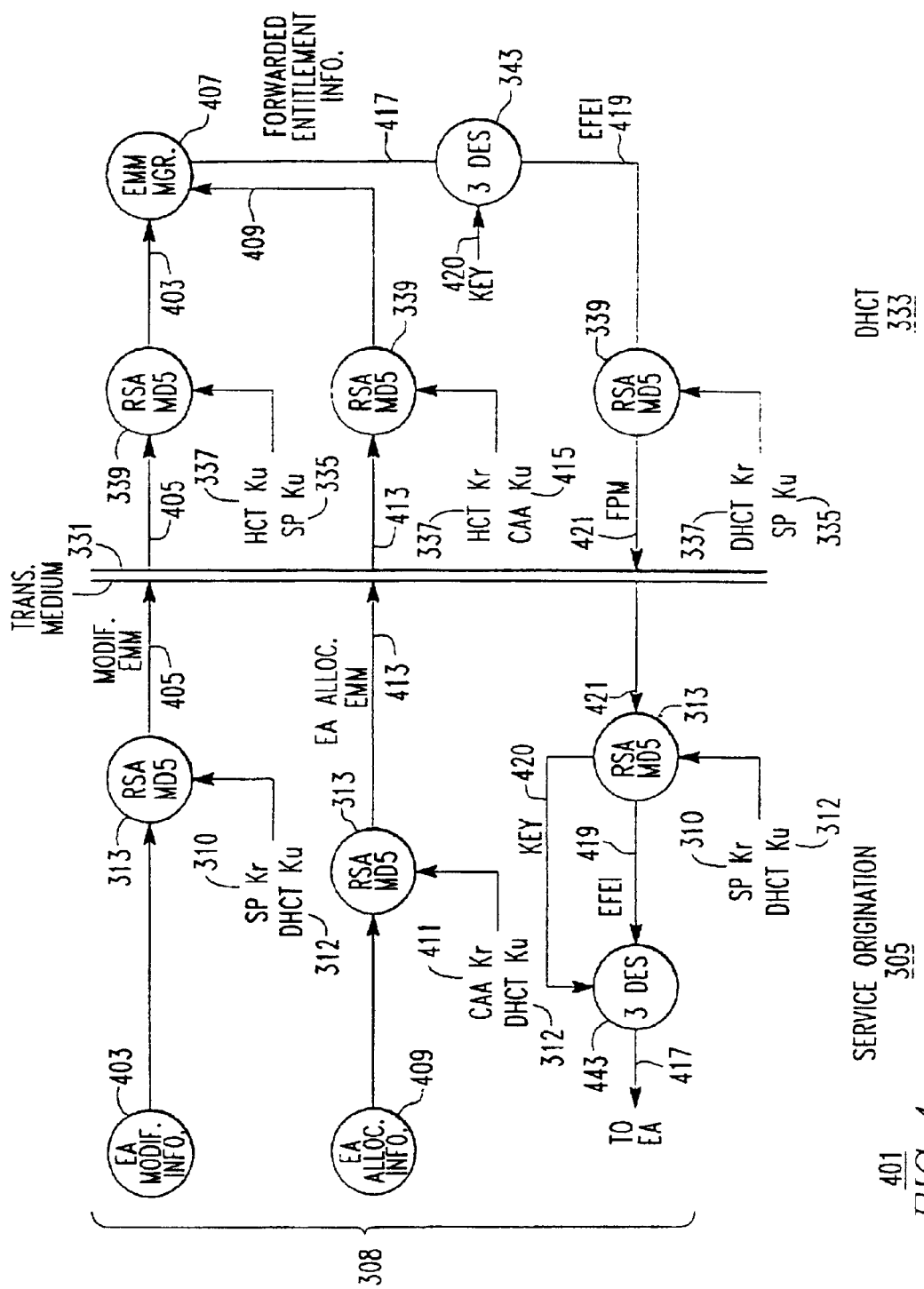
FIG. 4 is a block diagram of the techniques used to dynamically provide entitlement agents to a DHCT.

Dynamic Provision of Multiple Entitlement Agents to DHCT 333: FIG. 4

The use of the sealed digest in EMM 315 means that DHCT 333 will not respond to EMM 315 unless it has a public key for the entitlement agent that has the power to give entitlements to the service to be decrypted by the MSK in EMM 315. This is part of a broader arrangement which makes it possible to dynamically provide DHCT 333 with one or more entitlement agents and to dynamically remove provided entitlement agents from DHCT 333.

The entity which provides and removes entitlement agents is called the conditional access authority (CAA). The arrangement further permits entitlement agents that have been provided to DHCT 333 to dynamically modify their authorization information in DHCT 333. All of the information needed to perform these operations is sent via EMMs, with the sealed digests being used to ensure that only the CAA may add or remove entitlement agents and that only the entitlement agent to which authorization information belongs may modify the authorization information.

The above arrangement has a number of advantages:

It permits multiple entitlement agents.

It permits dynamic addition and removal of entitlement agents.

It places limits on the services to which an entitlement agent may grant entitlements, but otherwise permits entitlement agents to manage their own authorization information.

It separates the business of providing entitlements to services and service instances from the business of actually providing instances of the service: consequently, a CATV operator may simply run as a distribution utility.

It separates the business of giving an entity the right to be an entitlement agent from the business of being an entitlement agent.

It provides an easy way of permitting a customer to change entitlement agents as he or she sees fit.

It provides a secure arrangement whereby a DHCT 333 may communicate by means of a reverse path with an entitlement agent, a conditional access authority, or potentially the provider of the instances of the service.

FIG. 4 shows how the arrangement is implemented in a preferred embodiment. FIG. 4 is best understood as an extension of FIG. 3. Both FIG. 4 and FIG. 3 have the same major components: service origination 305. DHCT 333, and transmission medium 331 for coupling the two. Further, encryptor 313 and decryptor 339 are used in both figures. Moreover, as indicated by reference number 308, the EMMs may be either sent together with a service instance or by another channel. FIG. 4 further shows an additional component of DHCT 333, namely EMM manager 407. EMM manager 407 is implemented in software executed in a secure processor in DHCT 333. The task of EMM manager 407 is to respond to EMMs which add or remove entitlement agents and to EMMs which modify the authorizations for an entitlement agent. EMM manager 407 further provides messages by means of which DHCT 333 may communicate with an entitlement agent or a conditional access authority.

Initially, EMMs that modify an entitlement agent's authorization information are made in response to modification information 403 provided by the entitlement agent or required by the network operator. As shown at 313, the modification information is encrypted using the public key 312 for DHCT 333 and has a sealed digest that is encrypted using the private key 310 for the entitlement agent. The resulting authorization modification EMM 405 is sent via transmission medium 331 to decryptor 339 in DHCT 333, where it is decrypted and checked in the manner described above for EMMs 315 containing an MSK. The EA modification information 403 contained in the EMM goes, however, to EMM manager 407, which uses the information to modify the authorization information for the entitlement agent in DHCT 333. Examples of modifications include adding or canceling services provided by the entitlement authority and changing the conditions under which access to instances of a given service will be granted.

As indicated above, the sealed digest is encrypted using the private key of the entitlement agent. Consequently, the validity of the EMM can only be determined if DHCT 333 has the entitlement agent's public key. The public key for an entitlement agent is provided to DHCT 333 by an EA allocation EMM 413 from a conditional access authority. EMM 413 contains entitlement agent allocation information 409 from the conditional access authority; at a minimum, entitlement agent allocation information 409 contains the public key for the entitlement agent; it may also contain information about the amount of memory an entitlement agent may have in DHCT 333 and about classes of service that an entitlement agent may offer. For example, the entitlement agent may not be permitted to offer interactive services. Information 409 is encrypted with the public key 312 of DHCT 333, and the sealed digest is encrypted with private key 411 of the conditional access authority.

In DHCT 333, EMM 413 is decrypted using private key 337 belonging to DHCT 333 and the sealed digest is decrypted using CAA public key 415. If the digest confirms the correctness of the contents of the EMM, EMM manager 407 allocates storage for the entitlement agent whose public key is contained in EMM 413. That done, EMM manager 407 places the entitlement agent's public key in the storage. The storage provides a piece to store the entitlement agent's public key, the authorization information for the services and service instances provided by the entitlement agent, and the MSKs provided by the entitlement agent. Once DHCT 333 has the entitlement agent's public key and storage for the entitlement agent's authorization information and MSK, EMM manager 407 can respond to EMMs from the entitlement agent. Of course, in order to decrypt the sealed digest, DHCT 333 must have public key 415 for the conditional access authority. As will be explained in more detail later on, in a preferred embodiment, public key 415 and the public and private keys for DHCT 333 are installed in DHCT 333 at the time that DHCT 333 is manufactured.

When a customer orders a service, the arrangements just described interact as follows:

1. If the service is provided by an entitlement agent for which the customer's DHCT 333 does not have the public key, the conditional access authority must first send EA allocation EMM 413 to DHCT 333; EMM manager 407 responds by allocating storage for the entitlement agent. Only the conditional access authority can send EA allocation EMM 413, and consequently, the conditional access authority (CAA) can control access by entitlement agents to customers of a particular service distribution organization.

2. If DHCT 333 has the entitlement agent's public key, either because step (1) has just been performed or was performed at some time in the past, the entitlement agent sends modification EMM 405 with the authorization information for the newly-ordered service or service instance to DHCT 333. EMM manager 407 responds thereto by storing the authorization information in the allocated space.

3. Once step (2) is done, DHCT 333 can receive EMM 315 with the MSK for the service from the entitlement agent. EMM manager 407 stores the MSK in the allocated space.

4. When the actual service instance is sent, it is accompanied by ECMs containing the current control word. The MSK is used to decrypt the ECMs and the control words obtained from the ECMs are used to decrypt the instance of the service.

The above use of EMMs and ECMs to control access to instances of a service thus guarantees that no entitlement agent will have access to DHCT 333 without permission of the conditional access authority and that no DHCT 333 will have access to an instance of a service without permission of the entitlement agent for the service. It also makes it possible for the entitlement agent to be in complete control of the service. Access to the service is defined by the EMMs 405 and 315, and these may be sent by the entitlement agent to DHCT 333 independently of the service distribution organization. Further, it is the entitlement agent which provides the MSK used to generate control words and decrypt the ECM to both the service distribution organization and DHCT 333. Indeed, if the entitlement agent wishes to do so, it can itself provide encrypted instances of the services to the service distribution organization, which, in such a case, merely functions as a conduit between the entitlement agent and DHCT 333.

Secure Transmission of Messages via the Reverse Path

FIG. 4 also shows how the techniques used to ensure the security of EMMs are also used to ensure the security of messages sent from DHCT 333. The example shown in FIG. 4 is a forwarded purchase message (FPM). The forwarded purchase message is used for the interactive purchase of an instance of a service. One example of such a purchase is what is called impulse pay-per-view, or IPPV. In such a system, the beginning of an event, for example, a baseball game, is broadcast generally and customers can decide whether they want to see all of it. In that case, they must provide input to DHCT 333 that indicates that they wish to see the entire event. EMM manager 407 responds to the input by making the FPM and sending it to the entitlement agent so that the entitlement agent can charge the customer for the event and send an EMM 315 confirming that DHCT 333 may continue to decrypt the event. The information needed by the entitlement agent is forwarded entitlement information 417; to ensure the privacy of the customer, this information is encrypted using the 3DES algorithm with a key 420, as shown at 343, to produce encrypted forward entitlement information 419. The key 420 is composed of two 56-bit DES keys. The 3DES encryption operation is a sequence of three DES operations: encryption using the first DES key, decryption using the second DES key, and encryption using the first DES key Then key 420 is encrypted using the public key 335 of the entitlement agent and the sealed digest is made using the private key of DHCT 333. All of these parts together make up forwarded purchase message 421, which is addressed to the entitlement agent.

At the entitlement agent, key 420 is decrypted using the entitlement agent's private key 310, and the sealed digest is decrypted using the public key 312 of the DHCT. If the Encrypted Forwarded Entitlement Information (EFEI) 419 contained in the FPM 421 is determined not to have been tampered with, it is passed to 3DES decryption 443, which decrypts it using key 420 and provides forwarded entitlement information 417 to the entitlement agent. As will be immediately apparent, the same technique, with or without the 3DES encryption of the contents of the message, can be used to send messages to any entity for which DHCT 333 has the public key. At a minimum, this includes the CAA and any entitlement agent which has been allocated memory in DHCT 333.

Authentication of Global Broadcast Messages

A global broadcast message is one which is not addressed to any individual DHCT 333 or to any group of DHCTs 333. In a preferred embodiment, global broadcast messages accompany instances of services and contain information that is relevant to the instance they accompany. Consequently, the encryption and authentication techniques used in the global broadcast messages must permit rapid decryption and authenticity checking. One example of a global broadcast message is the ECM. Other examples are the different types of global broadcast authenticated messages, or GBAMs. As with ECMs, it is necessary to prevent global broadcast messages from being spoofed, and it is done in the same fashion as with the ECMs. More specifically, the digest is made using some or all of the MSK together with the content of the global broadcast message. The MSK thus functions as a shared secret between the entitlement agent and DHCT 333. When EMM manager 407 receives the global message, it makes a digest using the contents of the received message and the MSK and responds to the received message only if the digest agrees with the one contained in the message. An advantage of using a digest made with the MSK to authenticate the global broadcast message is that the digest may be both made and checked very quickly.

Implementation of the Conditional Access System in a Digital Broadband Delivery System The foregoing has described the conditional access system in terms of ECMs, EMMs, and other messages and in terms of the manner in which the messages and their digests are encrypted and decrypted. The conditional access system as just described will work with any communications arrangement which permits an instance of a service to be delivered to a DHCT together with ECMs and other broadcast messages and which permits the DHCT to receive EMMs from a conditional access authority and one or more entitlement agents. The conditional access system is, however, particularly well-suited for use in a modern digital broadband delivery system, and the following will describe how the conditional access system is implemented in such a delivery system.

Figure 5:
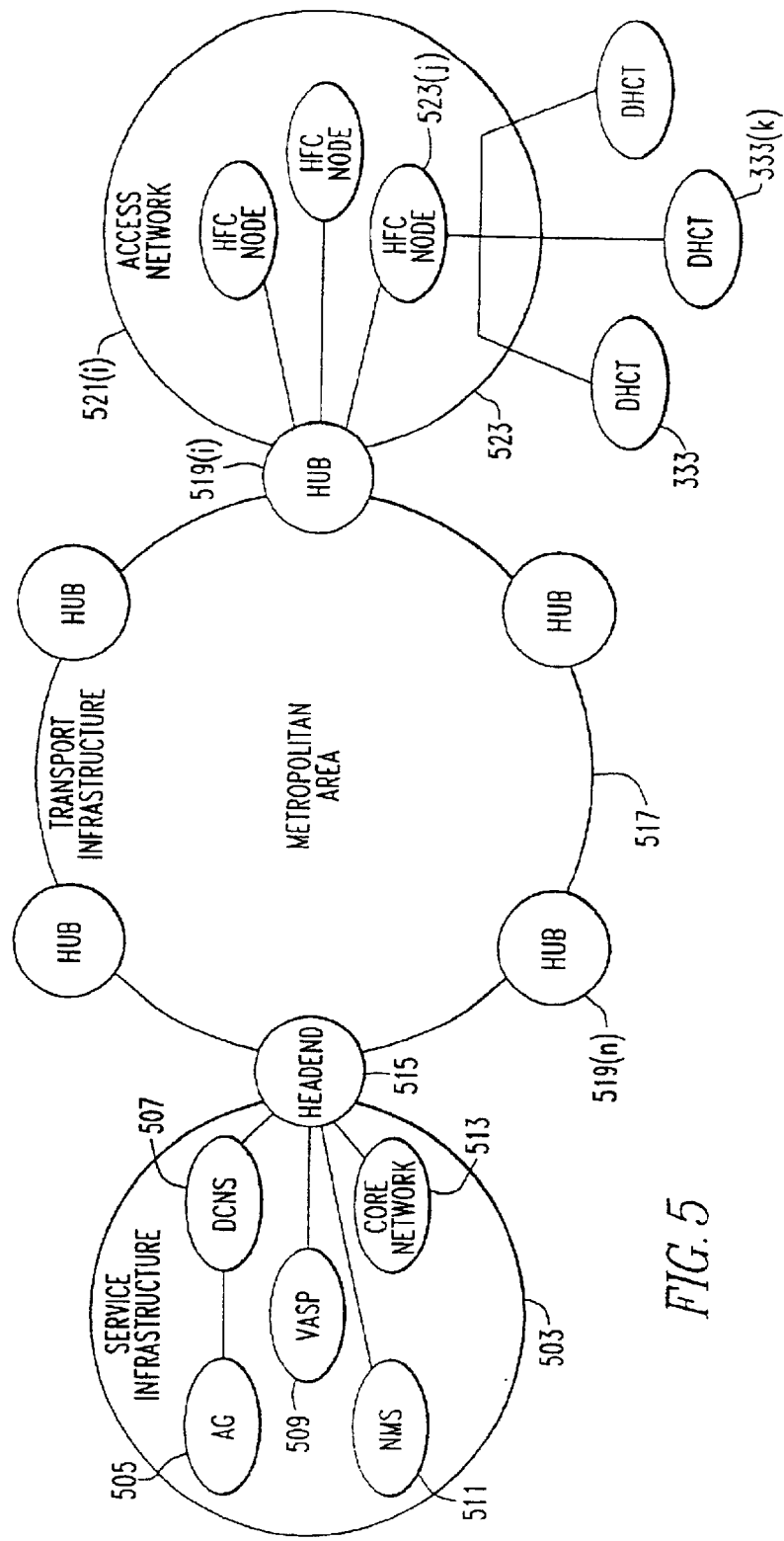
FIG. 5 is a block diagram of a digital broadband delivery system in which the conditional access system is implemented.

Overview of the Digital Broadband Delivery System: FIG. 5

FIG. 5 provides an overview of digital broadband delivery system (DBDS) 501. DBDS 501 includes service infrastructure 503, a headend 515, a transport infrastructure 517, hubs 519 (0 . . . n), access networks 521 (0 . . . n), and Digital Home Communications Terminals (DHCTs) 333. The service infrastructure consists of Value-Added Service Provider (VASP) systems 509, which are systems that provide services to the broad band delivery system, the Digital Network Control System (DNCS) 507, which manages and controls services provided by means of DBDS 501, the Administrative Gateway (AG) 505, which is a source of service provisioning and authorization information in DBDS 501, Network Management System (NMS) 511, which maintains a database of system status and performance information, and the Core Network 513, which interconnects other Service Infrastructure 503 components with headend 515. In a preferred embodiment, Core Network 513 consists of ATM-based switching and transmission facilities. Headend 515 provides an interface between service infrastructure 503 and transport infrastructure 517. Transport infrastructure 517 provides a high-bandwidth interconnection from headend 515 to hubs 519(0 . . . n). Each hub 519(i) serves an access network 521(i), which consists of hybrid fiber coax (HFC) nodes 523 connected via a coax bus network to DHCTs 333. A given DHCT 333(k) in DBDS 501 thus belongs to an HFC node 532(j) in an access network 521(i). Transport infrastructure 517 and access network 523 may provide only a forward channel from head end 515 to a given DHCT 333(k), but preferably provide both a forward channel and a reverse path. Each instance of a DBDS 501 generally provides service to a metropolitan area.

DBDS 501 can be implemented in a variety of configurations to fit the circumstances of a particular service environment. For example, headend equipment may be deployed within headend 515, within a hub 519(i), or as part of a VASP system 509. DNCS components 506 may be deployed within headend 515 or distributed among the hubs 519. Transport infrastructure 517 may utilize SONET add/drop multiplexing, analog fiber technology, or other transmission technologies.

Figure 6:
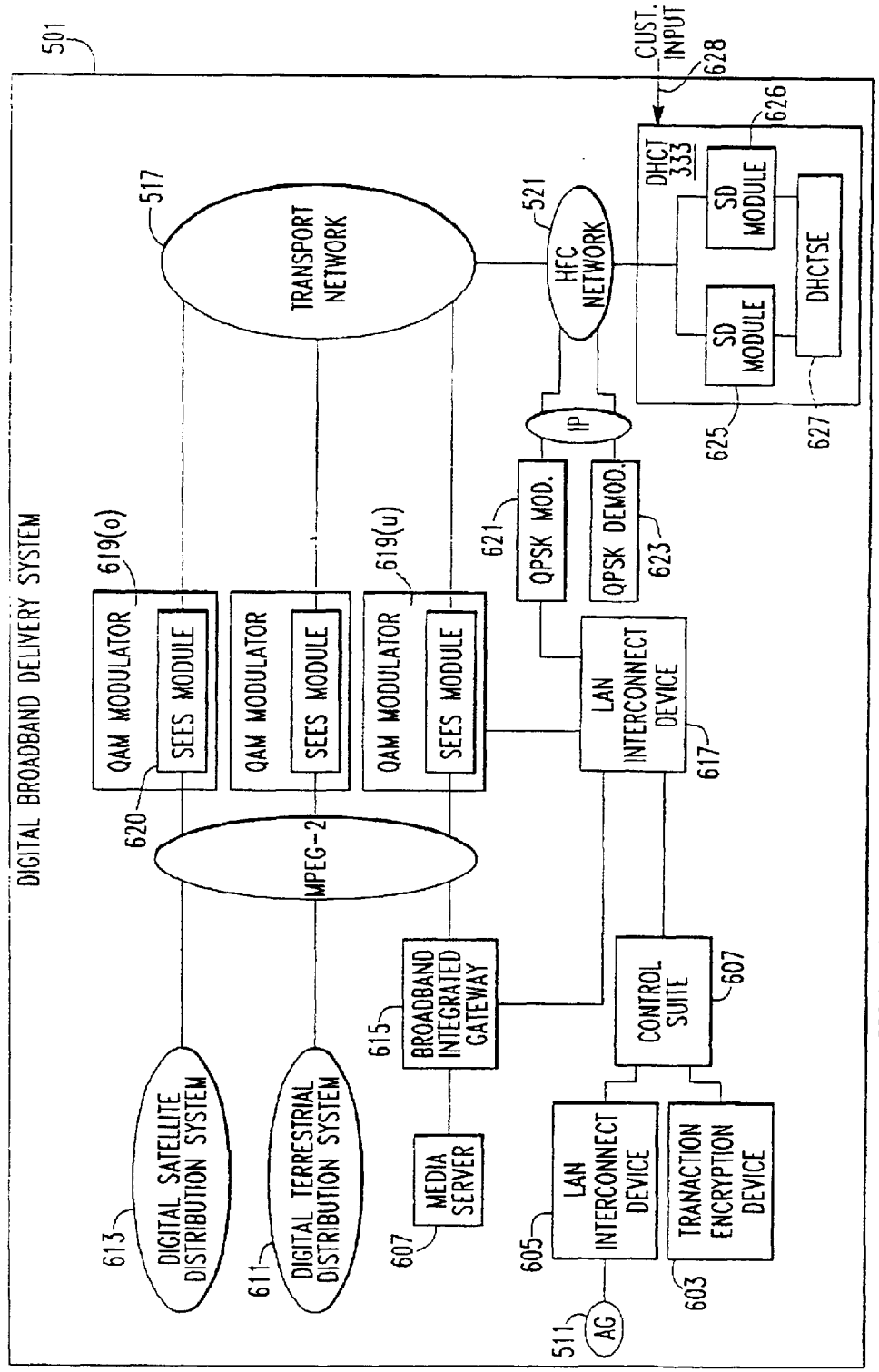
FIG. 6 is a block diagram of the conditional access system in the digital broadband delivery system of FIG. 5.

Overview of the Conditional Access System: FIG. 6

FIG. 6 shows the components of a preferred embodiment of conditional access system 601 in DBDS 501. Conditional access system 601 is a collection of components DNCS 507, headend 515, and DHCT 333 that together provide security and conditional access services.

The components of conditional access system 601 perform the following functions:

1. encrypting the service content
2. encrypting the control words used for service encryption
3. authenticating the ECMs that contain the encrypted control words
4. passing the ECMs to DHCTs
5. managing a subscriber authorization database
6. encrypting and authenticating EMMs containing subscriber entitlement information
7. passing the EMMs to DHCTs
8. decrypting the EMMs and checking their authenticity at the DHCTs
9. responding to the EMMs by modifying entitlement information in the DHCTs
10. responding to the ECMs by authenticating them, decrypting the control word, and checking entitlement at DHCT 333, and
11. if the ECM is authentic and the authorizations permit, decrypting the service content.

These requirements are met by the following components of conditional access system 601:

Stream Encryption & ECM Streamer Modules 620 in head end 515:

Control Suite 607 in DNCS 507;

I. Transaction Encryption Device 605 in head end 515, with secure link to DNCS 507;

II. Service Decryptor Module 625 in DHCT 333;

II. Security Manager Module 626 in DHCT 333; and

IV. DHCTSE 627 in DHCT 333.

FIG. 6 depicts a typical configuration of these components for securing digital services within DBDS 501. In the following, the components will be described in more detail.

Service Encryption & ECM Streamer Module 620

Service Encryption and ECM Streamer (SEES) module 620 is a component of QAM Modulator 619 that operates under direction of control suite 607 to encrypt the MPEG-2 transport stream packets that are employed in the preferred embodiment to transmit service content 325. As shown in FIG. 6, service content 325 may be received from sources such as a digital satellite distribution system 613, a digital terrestrial distribution system 611, or a media server 609. Media server 609 may be connected to head end 515 by a broadband integrated gateway 615. SEES 620 uses MSK 309 to generate the control words 319 used for service encryption and creates ECMs 323 for transporting the control words together with encrypted service content 329 within the outgoing MPEG-2 Transport Stream. SEES 620 encrypts the control words in the ECMs 323 with MSKs 309. The MSKs are generated by TED 603 and are sent to SEES 620 in encrypted form in EMM-like messages.

DHCT 333

DHCT 333 is connected between the HFC network 521 and the customer's television set DHCT 333 receives and interprets EMMs, ECMs, and GBAMs and decrypts instances of services. DHCT 333 further provides the customer interface for DBDS 501 and receives customer input 628 from the customer. In response to the customer input, DHCT 333 may generate FPMs or other messages that travel via the reverse path to the CAA or to EAs. In a preferred embodiment, DHCT 333 is implemented using a combination of general purpose processors, ASICs, and secure elements (which may be implemented discretely or integrated). For purposes of the present discussion, DHCT 333 has three important components: service decryption module 625, security manager 626, and DHCT secure element (DHCTSE) 627. Service decryption module 625 is preferably implemented in an ASIC, and security manager 626 is preferably implemented in software. DHCTSE 627 is a secure element for performing security and conditional access-related functions.

Service Decryptor Module 625

Service decryptor module 625 is the component of DHCT 333 that decrypts the encrypted MPEG-2 transport stream packets. Service decryptor 625 receives the control words to be used for service decryption from DHCTSE 627. DHCTSE 627 controls which transport stream packets are decrypted by only passing the control words for authorized services to service decryptor 625.

Security Manager 626

Security manager 626 is a software module of the DHCT that provides an interface between applications running on DHCT 333 which use the conditional access system and DHCTSE 627. It also coordinates processing between the service decryptor module and DHCTSE 627.

DHCTSE 627

DHCTSE 627 stores keys, interprets EMMs and ECMs, and produces FPMs. With the EMMs and ECMs, it does the decryption and authentication required for interpretation and with FPMs, it makes the sealed digest and encrypts the FPM. Thus, in the preferred embodiment, EMM manager 407 is implemented in secure element 627. In addition, DHCTSE 627 provides encryption, decryption, digest, and digital signature services for other applications executing on DHCT 333. Secure element (DHCTSE) 627 includes a microprocessor and memory that only the microprocessor may access. Both the memory and the microprocessor are contained in tamper-proof packaging. In interpreting EMMs, DHCTSE 627 acquires and stores keys and entitlement information; in interpreting ECMs, DHCTSE 627 uses the entitlement information to determine whether DHCT 333 receiving the ECM has an entitlement for the instance of the service which the ECM accompanies; if it does, DHCTSE 627 processes the ECM, and provides the control word to service decryptor module 625 in a form that it may use to decrypt or descramble services. DHCTSE 627 further records purchase information for impulse-purchasable services such as IPPV and stores the purchase data securely until the data is successfully forwarded via a forwarded purchasing message to control suite 607. DHCTSE 627 maintains MSK for the EAs, the private/public key pairs for DHCT 333, and the public keys of the conditional access authorities and the entitlement agents.

Control Suite 607

Control suite 607 is a member of the DNCS family of software. Control suite 607 controls the encryption of services performed by a SEES module 620 based upon input from the DNCS broadcast control suite component. Control Suite 607 also maintains a database of subscriber authorizations based upon transactions received from Administrative Gateway 511. Control suite 607 generates EMMs for communicating subscriber authorizations and other conditional access parameters to the DHCTSE 627. Control suite 607 acts on behalf of entitlement agents. The EMMs generated by control suite 607 for communicating subscriber authorizations and other conditional access parameters to DHCTSE 627 are encrypted with the public keys of the DHCTs 333 to which they are directed and are authenticated with the private key of the EA, which is maintained by transaction encryption device (TED) 603. DHCTSE 627 maintains the public key of the EA and uses it to confirm the authenticity of EMMs generated by control suite 607 for the EA.

Control Suite 607 further enables the establishment of a conditional access authority (CAA). Control suite 607 generates EA allocation EMMs 413 which pass the public key of the EA to a DHCTSE 627. These EMMs 413 are encrypted as described above, but are authenticated using a digital signature made with the private key of the CAA, which is maintained by TED 603. DHCTSE 627 is pre-provisioned with the public key of the CAA for use in confirming the authenticity these EMMs 413.

Communications between control suite 607 and the rest of conditional access system 601 are by means of LAN interconnect devices 605 and 617. Device 605 connects Control Suite 607 to Administrative Gateway 505, from which it receives the information necessary to make ECMs and EMMs, and device 617 connects it to the SEES modules 620 in the QAM modulators and to QPSK modulator 621 and QPSK demodulator 623, which are in turn connected to HFC network 521. The connection between Control Suite 607 and DHCT 333 via LAN interconnect device 617, modulator 621, demodulator 623, and HFC network 521 implements the reverse path needed for messages such as FPM 421 and also implements a forward channel to DHCT 333. This forward channel is independent of the forward channel used to provide the services. In conditional access system 601, Control Suite 607 can send EMMs or broadcast messages to DHCT 333 either by the forward channel just described or by sending them together with an instance of a service.

Transaction Encryption Device 603

Transaction Encryption Device (TED) 603 serves as a peripheral to Control Suite 607. TED 603, under the direction of Control Suite 607, encrypts and makes sealed digests of various conditional access system messages, including EMMs. TED 603 may also generate and store (MSKs) which are used by SEES 620 to encrypt the control words in the ECMs and to decrypt the control words in DHCTSE 627. TED 603 further uses the MSKs to authenticate the global broadcast message class of conditional access system messages. Authentication is done by hashing the contents of the message together with some or all of the MSK. TED 603 decrypts and verifies the authenticity of Forwarded Purchase Messages 421 sent from the DHCTs 333 as well as other messages sent using the reverse path. TED 603 maintains the private keys of the CAA and the EA and receives from the DNCS the public keys of the DHCTs from which it receives messages. As will be explained in more detail below, TED 603 receives the public keys from a source that confirms the authenticity of each key. TED 603 finally makes a sealed digest for the EMMs using the private key of the CAA and EA as appropriate for the EMM.

Using the Conditional Access System to Support Services and Programs Executing in DHCT 333 or Service Infrastructure 507

The conditional access system can be utilized to secure the provisioning of a service or to provide security services to programs executing on DHCT 333 or programs in Control Suite 607. Secure service provision does not require that the DHCT programs that support the service be secure. The reason for this is that the following may be done only by DHCTSE 627 in DHCT 333 or by a TED 603:

generation of the MSK;

storage of the MSK;

storage of the keys needed to encrypt and/or decrypt EMMs and to make and check sealed digests;

storage of the entitlement information received from the EAs;

encryption and/or decryption of EMMs;

encryption or decryption of the control word;

provisioning of the MSK to SEES module 607 and the decrypted control word to service decryption module 625;

making and checking digests with shared secrets;

making and checking sealed digests;

confirming that a DHCT 333 is entitled to receive a service.

A program executing on DHCT 333 or a program in control suite 607 has no access to any of the information stored in DHCTSE 627 or TED 603 and can thus do nothing with EMMs and ECMs beyond asking DHCTSE 627 or TED 603 to generate or interpret them. For example, when DHCT 333 receives an EMM, it simply passes the EMM to DHCTSE 627 for processing; when it receives an ECM, it does the same; if the authorization information contained in the ECM and stored in the DHCTSE 627 indicates that DHCT 333 is entitled to the service, DHCTSE 627 provides the decrypted control word to service decryption module 625.

The conditional access system can also do security checking for programs generally. For example, a program executing on DHCT 333 that requires downloaded information from a server application may expect that a sealed digest was added to the information before it was downloaded, and the program may use DHCTSE 627 to check the sealed digest and determine whether the information is authentic, but it is up to the program to decide what to do with the information when DHCTSE 627 indicates that it is not authentic.

Details of Messages in Conditional Access System 601

In conditional access system 601, the ECM, the EMM, the FPM, and the GBAM are all different types of conditional access messages. The conditional access messages all have a common format, namely a header, the message itself, and a message authentication code, or MAC. The header contains the following information:

the type of the message, i.e., whether it is an ECM, EMM, GBAM, or something else;

the length of the message;

an identifier for the conditional access system;

an identifier for the type of security algorithm used with the message, including encryption of the message and authentication of its contents; and the length of the message content.

The header is followed by the encrypted message and the MAC, which, depending on the message type, may be a sealed digest or a digest made with some or all of the MSK together with the message.

In digital broadband delivery system 501, CA messages may travel either in a MPEG-2 data stream or in an IP packet, that is, a packet made according to the rules of the Internet Protocol. Also, other transport protocols such as ATM may be used. In the preferred embodiment, messages from control suite 607 to DHCT 333 may travel in MPEG-2 or IP packets; messages from DHCT 333 to control suite 607 travel as IP packets on the reverse path provided by QPSK demodulator 623 and LAN interconnect device 617. In general, messages to DHCT 333 which are closely associated with particular instances of services, such as ECMs and GBAMs, travel in the MPEG-2 data stream; EMMs may travel either in the MPEG-2 transport stream or as IP packets via LAN interconnect device 617 and QPSK modulator 621.

Figure 7:
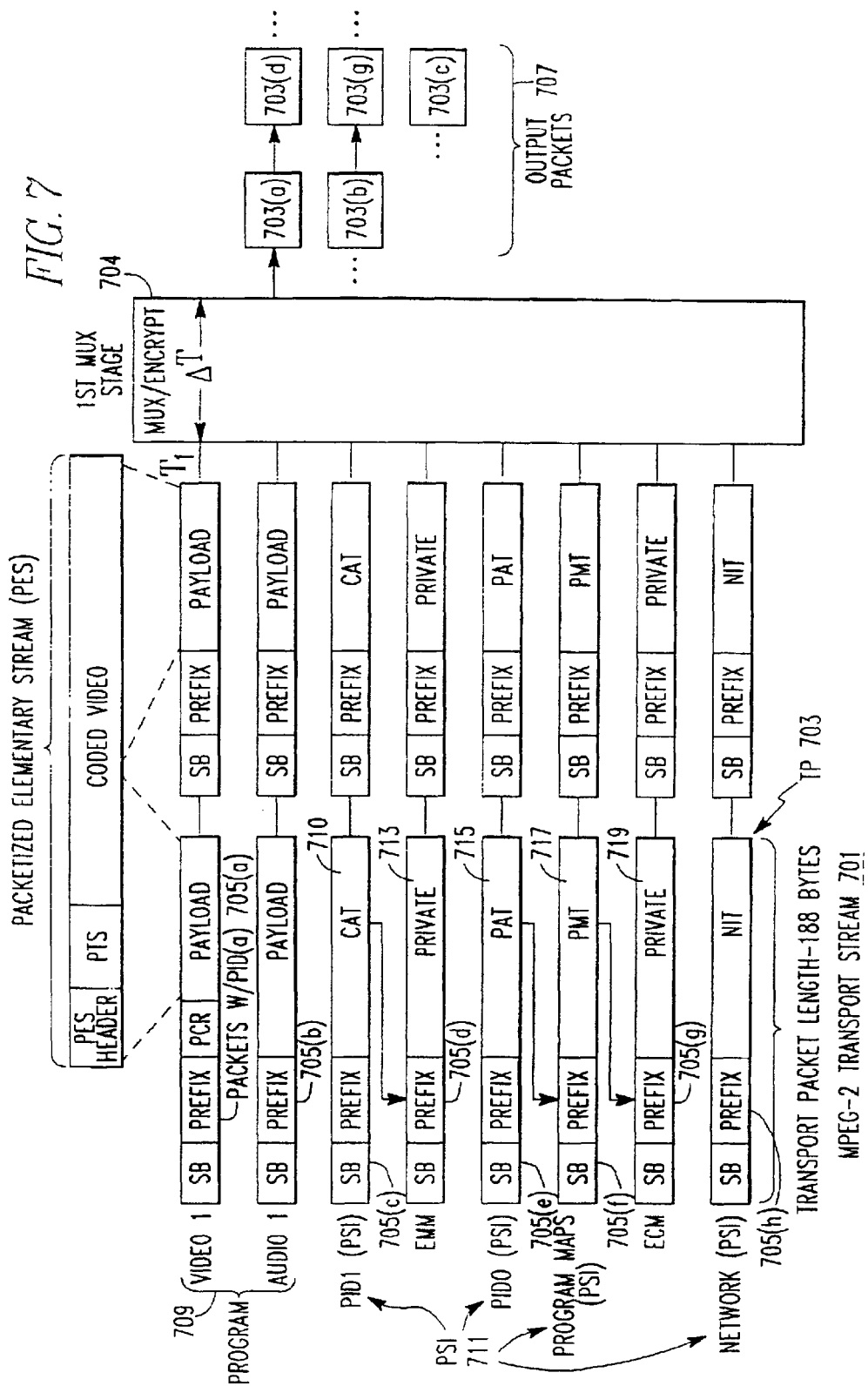
FIG. 7 is a diagram of an MPEG-2 transport stream.

CA Messages in the MPEG-2 Transport Stream: FIG. 7

FIG. 7 is a schematic representation of an MPEG-2 transport stream 701. An MPEG-2 transport stream is made up of a sequence of 188-byte long transport packets 703. The packets 703 in the stream carry information that, when combined at DHCT 333, defines an instance of a service and the access rights of a given DHCT 333 to the service. There are two broad categories of information: program 709, which is the information needed to produce the actual pictures and sound and program specific information (PSI) 711, which is information concerning matters such as how the transport stream is to be sent across the network, how the program 709 is packetized, and what data is used to limit access to the program 709. Each of these broad categories has a number of subcategories. For example, program 709 may include video information and several channels of audio information.

Each transport packet 703 has a packet identifier, or PID, and all of the packets 703 that are carrying information for a given subcategory will have the same PID. Thus, in FIG. 7, the packets carrying Video 1 all have PID ($a$), and the packets belonging to that subcategory are identified by 705($a$). Similarly, the packets carrying Audio 1 all have PID ($b$), and the packets belonging to that category are identified by 705($b$). A subcategory of information can thus be identified by the PID of its packets. As shown at output packets 707, the output from mux 704 is a sequence of contiguous individual packets from the various subcategories. Any part or all of MPEG-2 transport stream 701 may be encrypted, except that packet headers and adaptation fields are never encrypted. In the preferred embodiment, the sets of packets making up program 709 are encrypted according to the DES algorithm, with the control word as a key.

Two of the subcategories are special: those identified by PID 0 (705($e$)) and PID 1 (705($c$)) list the PIDs of the other packets associated with the service(s) and thus can be used to find all of the information associated with any service. The packets in PID 1 705($c$) have as their contents a conditional access table 710, which lists the PIDs of other packets that contain EMMs. One set of such packets appears as EMM packets 705($d$), as indicated by the arrow from CAT 710 to packets 705(*d*). Each packet 703 in packets 705(*d*) contains private information, that is, information which is private to conditional access system 601. As will be explained in more detail below, private information 713, for the purposes of this invention, is a sequence of CA messages, each of which contains an EMM, and private information 719, is a sequence of messages, each of which contains an ECM.

The packets in PID 0 705(*e*) contain a program association table which lists PIDs of packets that are associated with a particular instance of a service. One such set of packets is program maps packets 705(*f*), which contain a program map table 717 that lists, amongst other things, the PIDs of transport packets 703 containing ECMs for the program. One such set of packets is shown at 705(*g*). Each of the transport packets contains private information 719, which in this case is a sequence of CA messages, each of which contains an ECM.

FIG. 8 shows in detail how EMMs are carried in transport packets 703. The payload space 719 in the packets carries data from a CA_PRIVATE_SECTION layer 803, which in turn contains a sequence of CA messages 805, each of which contains an EMM 807. In the sets of packets 705(*g*) carrying ECMs, the control words in the ECMs are encrypted using the 3DES algorithm with the MSK as key; in the sets of packets 705(*d*) carrying EMMs, the EMMs are encrypted using the public key of DHCT 333 for which they are intended. As will be immediately apparent, the techniques just described can be employed to transmit any CA message 805 as part of an MPEG-2 transport stream.

Mapping CA Messages into IP Protocol Packets: FIG. 9

FIG. 9 shows how EMMs are mapped into the Internet Protocol (IP) packets used to communicate between control suite 607 and DHCT 333 via LAN device 617 and QPSK modulator 621 and demodulator 623. An IP packet 903 is a variable-length packet that consists simply of a header and a payload. The header contains source and destination IP addresses for the packet. With an EMM, the source address is the IP address of the CA or EA, and the destination address is the IP address of DHCT 333. In the preferred embodiment, the IP address of DHCT 333 is constructed using its serial number. The IP addresses in DBDS 501 are partitioned by HFC node 523. The payload of the IP packet is a packet 905 belonging to the User Datagram Protocol (UDP) which has as its payload a CA_PRIVATE_SECTION 803, which in turn contains a sequence of CA messages 805, each of which contains an EMM 807.

Figure 10:
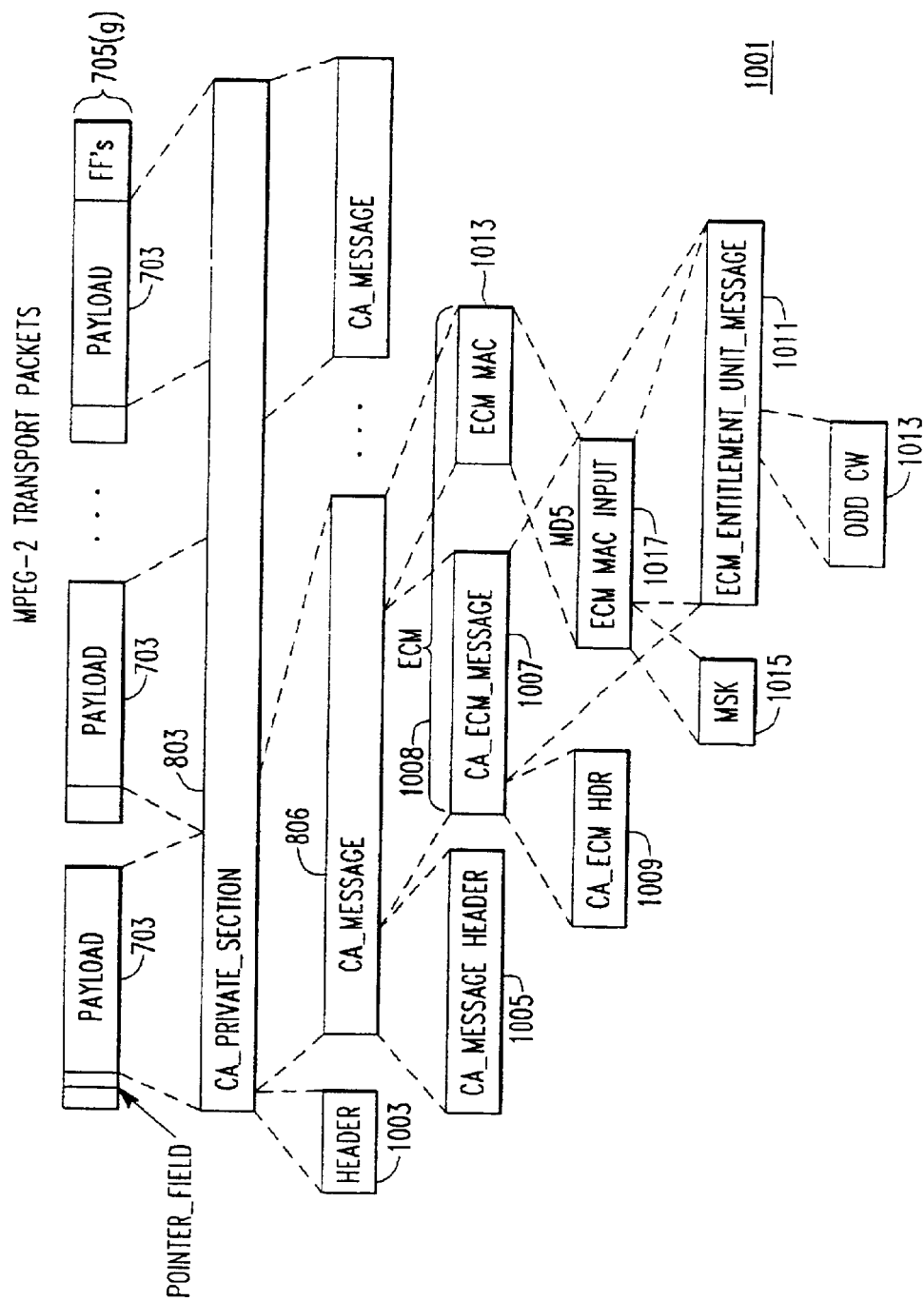
FIG. 10 is a diagram of how ECMs are mapped into a MPEG-2 transport stream.

ECM Structure Details: FIG. 10

FIG. 10 shows details of the structure of an ECM 1008 and shows the mapping 1001 from an ECM 1008 to a set 705(*e*) of MPEG-2 transport packets 703. As before, the data of a CA_PRIVATE_SECTION 803 is carried in a set of MPEG-2 transport packets 703 with the same PID. The data is a header 1003 for private section 803 and a sequence of CA messages 805, each of which includes a CA message header 1005, a CA ECM message 1007, and an ECM MAC 1013. CA ECM message 1007 and ECM MAC 1013 together make up ECM 1008.

FIG. 10 also shows how the control word is protected in ECM 1008 and how ECM MAC 1013 is produced. The control word is a random value that is either encrypted using 3DES encryption or created by encrypting a counter value using 3DES encryption, using the MSK as the key. In either case, the preferred embodiment calls for an MSK which is made up of two 56-bit DES keys, and the 3DES encryption operation is a sequence of three DES operations: encryption using the first DES key, decryption using the second DES key, and encryption using the first DES key. The control word, too, may have even or odd parity. As shown at 1013, the odd control word (after suitable encryption) becomes part of ECM_entitlement_unit_message 1011, and, in its non-encrypted form, is used together with some or all of the NISK as input to the MD5 one-way hash function to produce ECM MAC 1013. The same procedure is used with the even-parity control word. The contents other than the control word of ECM_entitlement_unit_message 1011 will be examined in more detail later.

Figure 11:
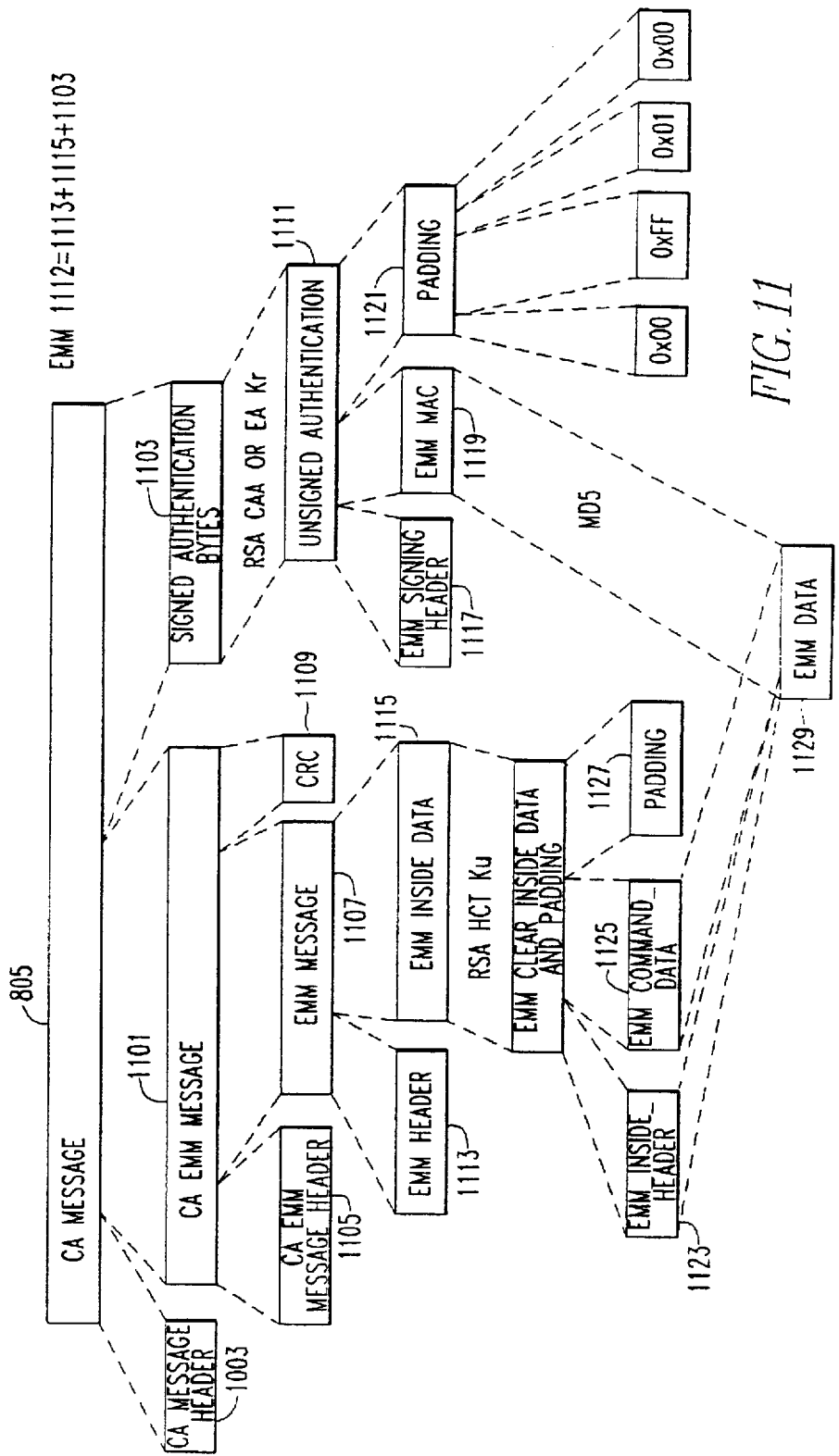
FIG. 11 is a detailed diagram of an EMM.

EMM Structure Details: FIG. 11

FIG. 11 shows a CA message 805 which contains an EMM 1112. CA message 805 has a header 1003, a CA EMM message 1101, and a sealed digest 1103. CA EMM message 1101 consists of CA EMM message header 1105, EMM message 1107, and CRC error detection code 1109. EMM message 1107 in its turn contains EMM header 1113 and EMM_inside_data 1115. EMM_inside_data 115 is encrypted using the public key of the DHCT 333 for which it is intended. The data which is encrypted is EMM data 1129, which in turn is made up of EMM_inside_header 1123 and EMM command_data 1125 together with padding 1127. EMM data 1129 is also input to the MD5 one-way hash function to produce EMM MAC 1119 and sealed digest 1103 is made by encrypting EMM_signing_header 1117. EMM MAC 1119, EMM_signing header 1117, and padding 1121 with the private key of either an entitlement agent or a conditional access authority, depending on what kind of EMM it is.

The EMM_signing_header is information from the EMM_inside_header. This information is particularly sensitive and is consequently encrypted by both the public key of DHCT 333, for privacy reasons, and the private key of the entitlement agent or the conditional access authority, to apply a digital signature. Upon reception, and after the privacy decryption, if the signature verification fails, the EMM is discarded by DHCT 333. Included in this information are an ID for the conditional access system, the type of the CA message, the serial number of the microprocessor in the DHCT's DHCTSE 627, an identifier for the CAA or EA which is the source of the EMM, an indication of which of the three public keys for the CAA in DHCT 333's secure element is to be used to decrypt the sealed digest, and an indication of the format of the EMM. The contents of EMM command_data 1125 will be explained in more detail in the discussion of the operations performed using EMMs.

Figure 12:
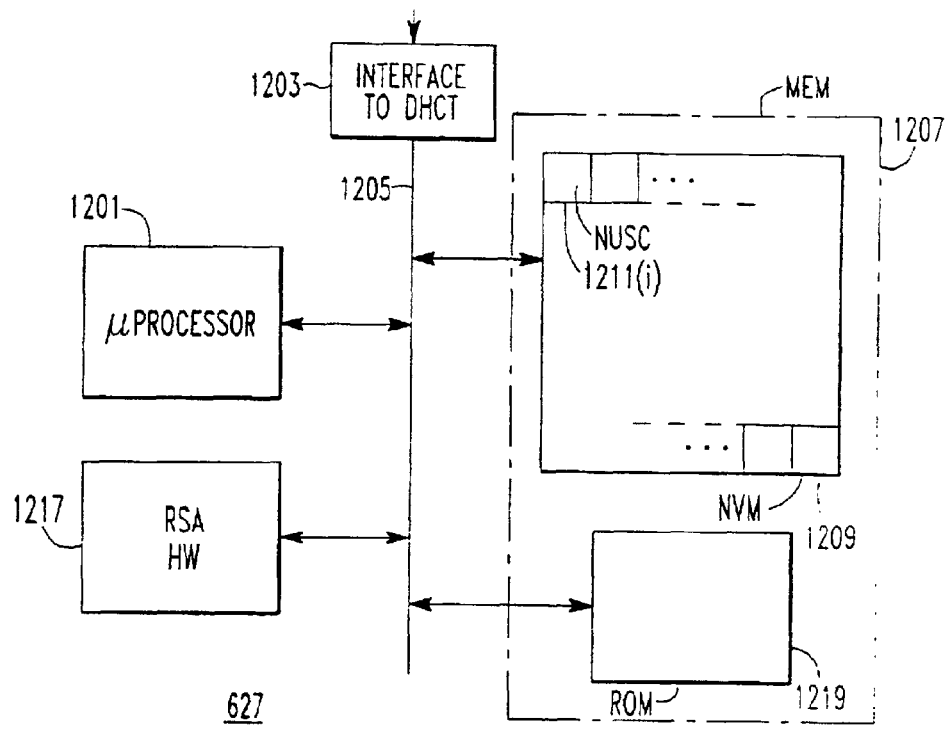
FIG. 12 is a detailed diagram of a preferred embodiment of DHCTSE 627.
Figure 14:
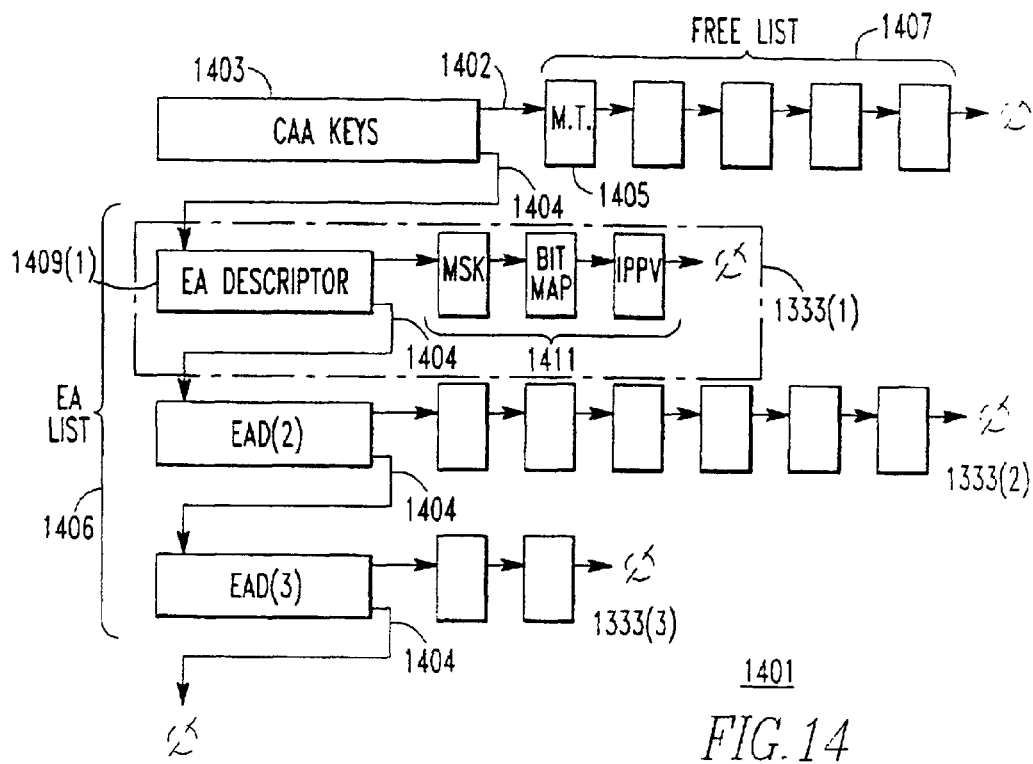
FIG. 14 is a diagram of how NVSCs are allocated to entitlement agents in a preferred embodiment.
Figure 13:
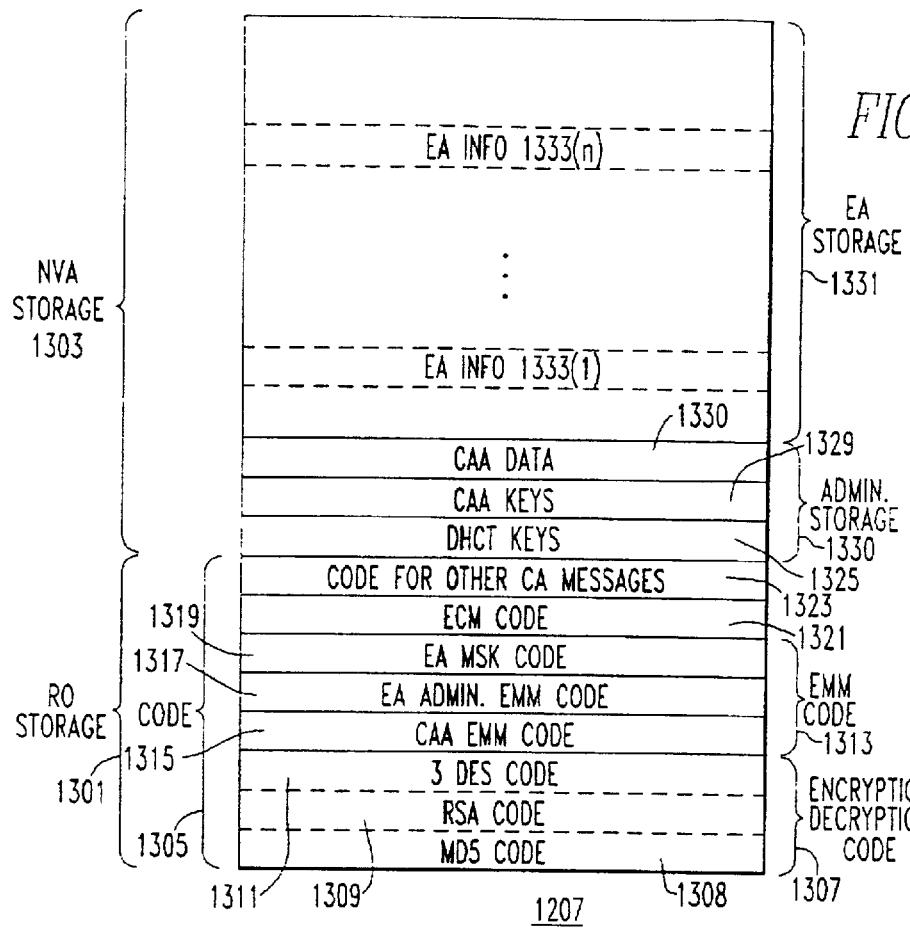
FIG. 13 is a diagram of the contents of memory in DHCTSE 627.

Details of DHCTSE 627: FIGS. 12–14

DHCTSE 627 has five main functions in conditional access system 601:

It securely stores keys including the public and private keys for DHCT 333, public keys for the CAA, public keys for EAs from which DHCT 333 is authorized to receive services, and MSKs provided by those EAs.

It securely stores entitlement information sent by the EAs.

It decrypts, authenticates, and responds to EMMs.

It decrypts the control words in the ECMs, authenticates the ECMs, and when DHCT 333 is authorized to receive the service instance to which the ECM belongs, it provides the control word to service decryptor 625.

It provides encryption, decryption, and authentication services to applications running on DHCT 333.

DHCTSE 627 includes a microprocessor (capable of performing DES), specialized hardware for performing RSA encryption and decryption, and secure memory elements All of the components of DHCTSE 627 are contained in a single tamper-proof package, such as a package that upon attempting to access the information contained within the information is destroyed. Only the components of DHCTSE 627 have access to the information stored in the secure memory elements. Any attempt by a user to gain access to any of the parts of DHCTSE 627 renders DHCTSE 627 unusable and its contents unreadable. DHCTSE 627 may be an integral part of DHCT 333 or it may be contained in a user-installable module such as a "smart card". The user "personalizes" the DHCT 333 by installing the module in it.

FIG. 12 provides an overview of the components of DHCTSE 627. As shown, the components of DHCTSE 627 are all connected to a bus 1205. Beginning with interface 1203 to the general purpose processor upon which applications execute in DHCT 333. interface 1203 permits passage of data between the remaining components of DHCT 333 and DHCTSE 627, but does not permit components in the remainder of DHCT 333 to address and read the contents of secret values in memory in DHCTSE 627. Microprocessor 1201 executes the code for doing encryption, decryption, and authentication and interpreting EMMs and ECMs; RSA hardware 1217 is special hardware performing the calculations involved with RSA encryption and decryption.

Memory 1207 contains the code executed by microprocessor 1201, the keys, and the entitlement information. In a preferred embodiment, there are two kinds of physical memory in memory 1207: ROM 1219, which is read-only memory whose contents are fixed when DHCTSE 627 is manufactured, and non-volatile memory (NVM) 1209, which can be read and written like normal random-access memory, but which retains its current values when DHCTSE 627 is without power. Non-volatile memory 1209 is organized as a set of non-volatile storage cells (NVSCs) 1211(0 . . . n), as described in U.S. Pat. No. 5,742,677, Pinder, et al., *Information Terminal Having Reconfigurable Memory*, filed 3 Apr. 1995.

As will be explained in greater detail below, code executing in microprocessor 1201 dynamically allocates NVSCs 1211 to entitlement agents. In the preferred embodiment. NVM 1209 is used for the storage of information which can be rewritten by means of EMMs, and ROM 1219 is used for code which will not change during the life of DHCTSE 627.

FIG. 13 is a schematic overview of the contents of memory 1207 in DHCTSE 627. The memory is divided into two main parts: read-only storage 1301, which contains code and other information that does not change as a result of the interpretation of EMMs, and NVA storage 1303, which is non-volatile storage that changes as a result of the interpretations of EMMs. RO storage 1301 contains code 1305.

Code 1305 falls into four categories: code 1307 for the encryption, decryption, and authentication operations performed by DHCTSE 627, code for interpreting EMMs 1313, code for interpreting ECMs 1321, and code for handling other CA messages such as the FPM and the GBAM. Code 1307 includes code 1308 for the MD5 one-way hash algorithm, the code 1309 for the RSA public key algorithm, and the code 1311 for the 3DES algorithm. EMM code 1313 falls into three classes: code 1315 which interprets EMMs received from a conditional access authority, code 1317 which interprets EMMs employed by the entitlement agents to configure the storage allocation they receive from the CAA, and code 1319 which interprets EMMs containing MSKs and entitlements. Code 1315, 1317 and 1319 thus implements EMM manager 407 in a preferred embodiment. The code for interpreting ECMs 1321 decrypts the control word contained in the ECM and checks whether DHCT 333 is permitted to access the instance of the service that the ECM accompanies; if so, the code provides the decrypted control word to service decryption module 625. The code for other CA messages 1323 deals with messages such as the FPM and GBAM.

NVA storage 1303 has two main components: administrative storage 1330 and EA storage 1331. Administrative storage 1330 contains DHCT keys 1325, CAA keys 1329, and CAA data 1330. Beginning with DHCT keys 1325, each DHCT 333 has two public-private key pairs. The public key of one of the pairs serves as the public key used to encrypt EMMs sent to DHCT 333, and the private key is used in DHCT 333 to decrypt the messages; the private key of the other of the pairs is used to encrypt the sealed digests of messages sent by DHCT 333, and the public key is used by other network elements to decrypt the sealed digests of messages received from DHCT 333. The pairs of keys are installed in DHCTSE 627 when DHCTSE 627 is manufactured.

In a preferred embodiment, the manufacturer of DHCT 333 maintains a certified database which has the serial number of each DHCT together with the pair of public keys belonging to it. When a CAA or EA wishes to begin sending EMMs to a DHCT 333, it sends a message to control suite 607 with the serial number of the DHCT. Control suite 607 responds to the request by requesting the public key for the DHCT from a database maintained by the manufacturer of DHCT 333. The database responds to the message by sending control suite 607 certified copies of the public keys for the DHCT. The manufacturer thus functions as the certification authority for the keys. Control suite 607 stores the public keys in a database of its own. For details on key certification, see Schneier, supra, pages 425–428. Getting the public keys for the DHCT from the manufacturer has two advantages: first, it solves the problem of certifying the keys; second, because the public keys come from the manufacturer and not from DHCT 333, there is no requirement in conditional access system 601 that DHCT 333 have a reverse path to control suite 607.

CAA keys 1329 are public keys for the conditional access authority. In a preferred embodiment, CAA keys 1329 include three public keys for the conditional access authority. These keys are originally installed when DHCTSE 627 is manufactured, but may be changed in response to EMMs, as will be explained in more detail below. CAA data 1330 includes parameters used by the CAA in managing EA storage 1331, and maps which map NVSCs belonging to particular entitlement agents to 8-bit names and thereby permit the CAA and the entitlement agents to manipulate the NVSCs 1211 by name.

Entitlement agent 1331 has EA information 1331 for each entitlement agent from which DHCT 333 containing DHCTSE 627 can obtain services. The CAA uses EMMs to allocate NVSCs 1211 for an entitlement agent and the entitlement agent then uses EMMs to set the contents of its entitlement agent information 1333.

FIG. 14 shows how NVSCs 1211 are organized into EA storage 1331 in a preferred embodiment. There are two kinds of NVSC's 1211: "skinny" NVSCs, as shown at 1405, and "fat" NVSCs, as shown at 1409. A fat NVSC is made up of a number of skinny NVSCs. The storage 1403, which contains the three CAA public keys, also contains two pointers: one, 1402, to a free list 1407 of unallocated skinny NVSCs and the other, 1404, to an entitlement agent list 1406 of allocated fat NVSCs 1409. There is such a fat NVSC 1409($i$) for each entitlement agent from which DHCT 333 may receive services. Each of these NSVCs 1409($i$) may also have a list 1411 of NVSCs, which may be skinny NVSCs 1405, fat NVSCs 1409, or a combination of both. A given NVSC 1409(*i*) and its list of skinny NVSCs make up EA information 1333(*i*) for an EA. The fat NVSC 1409 is an EA descriptor. As shown at 1333(*i*), the skinny NVSCs 1411 contain information for the services provided by the entitlement agent such as an MSK for a service, a bit map of entitlement information, and information needed for interactive services such as IPPV.

Control of NVA Storage 1303

In a preferred embodiment, allocation and de-allocation of the NVSCs 1211 may be ultimately controlled by either the CAA or DHCTSE 627. When the CAA controls allocation and de-allocation, the CAA, usually representing the operator of DBDS 501, negotiates with each of the entitlement agents and agrees on an allocation of the various types of NVSCs for that entitlement agent. EA administrative code 1317 checks when it is interpreting EMMs from an entitlement agent to ensure that the entitlement agent does not use more NVSCs of each type than those allocated to it.

When DHCTSE 627 controls NVA storage 1303, the operator of the CAA negotiates with each of the service providers and agrees on the allocation of storage needed for the services provided. The CAA then sends an encrypted message to the entitlement agent. The encrypted message contains the allocation based on data types, and the entitlement agent prevents the service provider from asking for more resources than were negotiated. If DHCTSE 627 nevertheless receives requests for storage area above what is available in NVA 1303, it indicates to the user of DHCT 333 via the user interface that no more storage is available and requests the user to either remove some service provider resources or to rescind the request.

Details of Operations Specified by EMMs

In the following, examples of operations specified by EMMs will be given, beginning with changing a CAA public key, continuing through establishing an EA in DHCTSE 627, and ending with providing entitlement information for broadcasts, events, and interactive services. In the preferred embodiment, a single CAA controls the allocation of EA storage 1331 to entitlement agents. In other embodiments, there may be more than one CAA. There are two kinds of entitlement information: that for broadcast services and that for interactive services. Storage for broadcast entitlements is more permanent than that for interactive entitlements.

The amount of memory 1207 in DHCTSE 627 is limited. The CAA manages this scarce resource and allocates it to the entitlement agents from which DHCT 333 receives services. Different EAs may have different amounts of storage area allocated, depending on their needs. Once an EA has received an allocation from the CAA, the EA may configure the storage area within limits defined by the CAA. Different EAs may have different limits and different types of limits. At one extreme, the CAA only restricts the total number of NVSCs 1211 that an EA may have in its EA information 1333. The CA may impose tighter restrictions by limiting the types of NVSCs 1211 and/or the number of each type. In this way, the CAA can prevent the EA from offering specific kinds of services and can limit the amount of such services offered, i.e., the amount of time that such services are offered.

When a CAA allocates fat and skinny NVSCs 1211 for an EA, it gives each allocated NVSC 1211 a "name", i.e., each NVSC 1211 has an identifier, such as an 8-bit identifier, that the CAA associates with the EA for which it has allocated the NVSCs 1211. The CAA and the EA use the name for the NVSC 1211 to refer to it in EMMs that manipulate the NVSC. An NVSC's name need not have anything to do with its physical location in NVM 1209. Since the name space is 8-bits wide, the names are assigned using a 256-bit map. If an entitlement agent has the name of an NVSC, it may make the NVSC into any type of NVSC as long as the type is one that is permitted for the EA and as long as the total number of NVSCs of the type belonging to the EA does not exceed the limit set by the CAA that authorized the EA.

Once the CAA has allocated the EA storage area in the DHCTSE, it is up to the EA to configure the storage area The first step is to load certain parameters such as a PIN into a descriptor for the EA. The second step is to determine which types of NVSCs are to be used for the protected services to be offered. The names allocated by the CAA are then distributed among the various types of NVSCs. Lastly, each NVSC is loaded by sending the appropriate EMM.

Addressing EMMs

In the conditional access layer, EMMs are addressed to a specific DHCTSE 627, indexed by CAA or EA. This indexing is taken care of in EMM header 1113, which includes a unique identifier for the CAA or EA that is the source of the EMM, and that therefore is associated with the private key used to make the EMM's sealed digest. The EMM header also includes the serial number for DHCTSE 627. The DHCTSE 627 responds only to those EMMs that include its serial number. When a CAA is the source of the EMM, there is also a value in the header indicating which of the CAA public keys is the public key for the source of the message. Conditional access messages may be transported in other data protocols, which may include other addressing mechanisms.

DHCTSE 627 ignores EMMs that are addressed to a CAA or EA that is not "known" DHCTSE 627 (i.e., EMMs for which there is no CAA corresponding to the CAAID or EA that corresponds to the EAID). As will be explained in more detail below, information about individual entitlements is contained in NVSCs 1211 for the entitlements. Each of these NVSCs has a type, and an EA may change the type or contents of an NVSC 1211 by sending an EMM which specifies the name of the NVSC 1211 to be altered. DHCTSE 627 will alter the NVSC 1211 as indicated in the EMM unless the entitlement agent does not have an NVSC with that name or the change violates a constraint set by the CAA. In those cases, the EMM is ignored by DHCTSE 627. Conditional access system 601 does not require that digital broadband delivery system 501 have a reverse path, or, if one exists, that any bandwidth on the reverse path be available to the EMM conditional access function. Consequently, DHCT 333 does not return any acknowledgment, confirmation, or error messages in response to an EMM. Therefore, the CAA or EA that is the source of an EMM should track the allocations of NVSCs 1211 and send only EMMs that request legal operations. In other embodiments, a reverse path may be required, and for these embodiments, the reverse path can be used for acknowledgment or error messages Changing a CAA As previously indicated, a CAA is represented in DHCTSE 627 by its public key. Three public keys for the CAA are installed in DHCTSE 627 when it is manufactured. A need may occasionally arise to change the CAA of DHCTSE 627. One circumstance under which such a need would arise would be if the private key for the CAA had been compromised; another would be if a new entity has taken over the function of authorizing entitlement agents. That might happen, for example, as a consequence of the sale of all or part of a DBDS 501.

Any one of the public keys for a CAA can be replaced by means of a sequence of two EMMs, the first of which has a sealed digest encrypted with the private key corresponding to a first one of the other two public keys, and the second of which has a sealed digest encrypted with the private key corresponding to the second one of the other two private keys. Each of the two EMMs contains an identifier, the CAAID for the new CAA, a key select value indicating which of the three CAA public keys is to be replaced, and the public key for the new CAA. After the first EMM is successfully authenticated by DHCTSE 627 by verifying the digital signature applied by the first CAA key, DHCTSE 627 computes a MD5 hash of the new CAA public key in this first EMM and stores it. After the second EMM is successfully authenticated by the DHCTSE by verifying the digital signature applied by the second CAA key, the DHCTSE computes a MD5 hash of the new CAA public key included in this second EMM. This second hash is compared with the first. If the hashes are identical, the new CAA public key and CAAID are substituted for the public key and CAAID of the CAA specified by the key select value. A single CAA public key must not be changed twice without one of the other two CAA public keys being changed in between.

Figure 15:
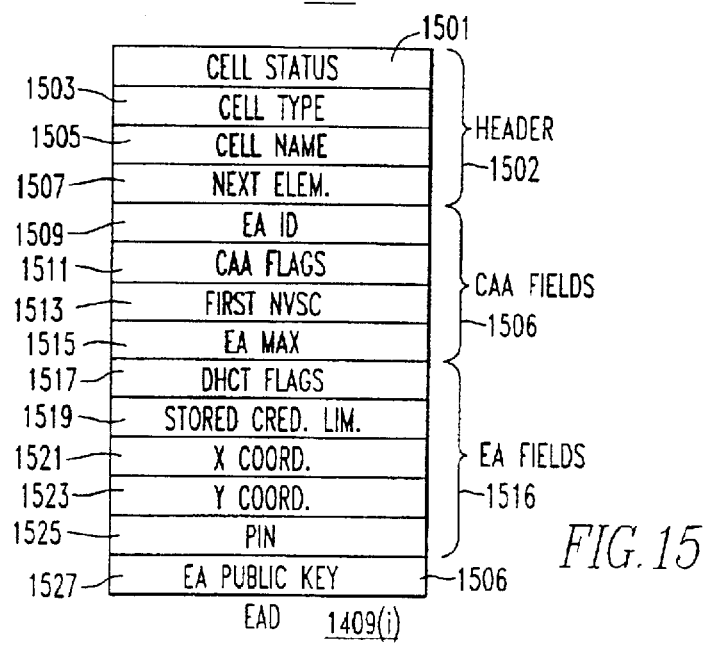
FIG. 15 is a diagram of an EAD NVSC.

Dynamically Adding and Removing Entitlement Agents in DHCTSE 627: FIG. 15

When a CAA authorizes a DHCT 333 to receive services from an entitlement agent, it does so by sending a sequence of EMMs that create an entitlement agent descriptor EAD 1409 for the new entitlement agent. FIG. 15 shows a detailed view of an EAD 1409(*i*) as created by the CAA EMMs. Header 1502 is common to all NVSCs 1211. Cell status 1501 indicates whether the NVSC 1211 is allocated. Cell type 1503 indicates what kind of data it contains; with an EAD 1409. Cell type 1503 indicates that the cell is a "fat" NVSC. Cell name 1505 is the 8-bit name that the CAA gives the cell when it allocates it. The names are per-EA. That is, the EA information 1333 for an EA may include up to 255 NVSCs. Next element 1507 is a pointer to the next element in the list to which the NVSC belongs. Thus, in an unallocated NVSC, it is a pointer to the next NVSC in free list 1407; in an EAD 1409, it is a pointer to the next element in EAD list 1406, and in a skinny NVSC that is part of a list 1411, it is the next skinny NVSC in that list. Next element 1507 is set in response to whatever EMM causes the list to be manipulated.

The remaining fields are particular to EADs 1409. The fields labeled 1506 in FIG. 15 are all set by EMMs from the CAA. EAID 1509 is an identifier for the entitlement agent to which EAD 1409 belongs; in the preferred embodiment, EAID 1509 is used to locate EAD 1409 for a given entitlement agent. CAA flags 1511 are a set of flags that indicate (1) the classes of service to which the entitlement agent can grant access and (2) whether the public key for the entitlement agent is installed in EAD 1409. First skinny NVSC 1513 is a pointer to skinny NVSC list 1411 belonging to EA information 1333 to which EAD 1409 belongs. EA maximums 1515 define the maximum amounts of services for the EA to which EA information 1333 belongs. The last field 1506 set by the CAA is EA public key 1527, which is the public key for the EA to which EA information 1333 belongs.

The fields in EA fields 1516 contain information that is associated with the customer to whom DHCT 333 belongs. The fields are set by an EMM received from the EA after EAD 1409 has been allocated and fields 1506 have been set. DHCT flags 1517 include flags indicative of the services provided by the EA that this specific DHCT 333 is presently entitled to receive. Stored credit limit field 1519 is used with instances of impulse services, i.e., instances of services that need not be purchased in advance. Stored credit limit field 1519 indicates the maximum amount of a service that an interactive customer can use without authorization from the EA. As will be explained in detail below, authorization is obtained by sending an FPM to the EA and receiving a confirming EMM from the EA. X coordinate 1521 and Y coordinate 1523 define a location of DHCT 333 in a coordinate system (to be explained more fully later) established by the entitlement agent. The coordinate system may be geographic and may, for example, be used to determine whether the DHCT 333 is in an area which is to be blacked out in a broadcast The coordinate system may also be used generally to define subsets of an EA's customers. For instance, the X coordinate and Y coordinate could be used to define customers who do not wish to receive movies that have ratings other than G or PG-13. The PIN is a multi-character code that the customer for the DHCT uses to identify himself or herself to the entitlement agent.

The EMMs that the CAA sends to set up EA information 1333 for an EA are the following:

Set EA Allocation Name Map

Set EA Maximum Allocations

Update Entitlement Agent Public Key

EMM header 1113 in all of these EMMs contains a CAAID for the CAA, and all of the EMMs have a sealed digest that has been encrypted with the CAA's private key. The CAA may use these EMMs not only to set up EA information 1333, but also to modify already existing EA information 1333 for an EA and to remove EA information 1333 for an EA. When the latter has been done, DHCTSE 627 will no longer respond to EMMs or ECMs from the entitlement agent.

Set EA Allocation Name Map

The Set EA Allocation Name Map EMM contains an EAID, which uniquely identifies the EA for which the EA information 1333 is being created or modified, and a name map. The map has a bit for each name; when the CAA has allocated a NVSC for the EA, the bit corresponding to the NVSC's name is set. CAA EMM code 1315 responds to this EMM by allocating the NVSCs required for EA information 1333, mapping the names for the EAID to the physical locations of NVSCs, making list 1411 and setting first NVSC flag 1513 to point to it, adding the new EA Descriptor 1409 to the head of EA list 1406 and setting next element pointer 1507 accordingly, and filling out header fields 1502 and EAID field 1509.

CAA EMM code 1315 stores the current name map for the EA in CAA data 1330 and consequently can compare the name map in a newly-received Set EA Allocation Name Map EMM with the current name map. If a name is specified in both name maps, the Set EA Allocation Name Map command does not affect the NVSC 1211 with the name. If the name map in the EMM specifies a name that was not in the current name map, an NVSC 1211 corresponding to that name is added to list 1411. If the name map in the EMM no longer specifies a name that was previously allocated to the entitlement agent, the NVSC 1211 corresponding to that name is returned to free list 1407. After this is done, the name map in the EMM becomes the current name map.

Typically, an entitlement agent and a conditional access authority will cooperate in determining how large list 1411 should be. For example, if an entitlement agent needs less space, it will send a message to that effect to the CAA, the message will contain the names of the NVSCs 1211 that the entitlement agent wishes to have removed, and the name map in the EMM sent by the CAA will specify only the names of the NVSCs 1211 that the entitlement agent wishes to keep. It may, however, happen that the entitlement agent is not cooperative or that the conditional access authority must reduce the size of list 1411 for the entitlement agent before it receives a message from the entitlement agent. In that case, the CAA may remove NVSCs 1211 from list 1411 by the value of the name, beginning with the name with the highest numeric value, continuing with the next highest, and so on, until the required number of NVSCs 1211 have been removed.

The CAA can also use the Set EA Allocation Name Map EMM to remove EA information for an EA from DHCTSE 627. When the EMM is used in this fashion, none of the bits in the name map are set. CAA EMM code 1315 responds by returning all of the NVSCs in the EA information 1333 and EA Descriptor 1409(*i*) for the EA identified by the EAID in the EMM to free list 1407 and re-linking EA list 1406 as required.

Set EA Maximum Allocations

The Set EA Maximum Allocations EMM contains the EAID for the EA having the entitlement information 1333 that is being created or modified and also contains values for fields 1511 and 1515 of EAD 1409. CAA EMM code 1315 responds to this EMM by reading down EA list 1406 until it finds EA descriptor 1409 with the EAID specified in the EMM and then setting fields 1511 and 1515 of EAD 1409 using the values in the EMM. When an entitlement agent sends an EMM to DHCTSE 627 that establishes entitlement information of a certain type, for example, for an event, the code that interprets the EMM checks the EA maximum allocations to determine whether the maximum number of entitlements for that EA has been exceeded. In the preferred embodiment, entitlements are represented by NVSCs. Consequently, what is limited is the number of NVSCs of a given type in list 1411.

Update Entitlement Agent Public Key

The Update Entitlement Agent Public Key EMM contains the EAID for the EA having the entitlement information that is being created or modified and the EA's public key. CAA EMM code 1315 responds to this EMM by locating EA descriptor 1409 as described above and setting field 1527 from the public key in the EMM. With the EA's public key in place, DHCTSE 627 can then use the signed digests of the EMMs to verify that they are from the EA. This verification is possible since the EA uses the private key corresponding to the updated public key to perform the signing operation.

EA EMMs that Modify Entitlement Information 1333

The EA EMMs that modify entitlement information have sealed digests that are encrypted using the EA's private key. The EMMs fall into two groups: EMMs that modify EA fields 1516 of EAD 1409 and EMMs that modify contents of the NVSCs making up list 1411. As set forth with regard to EAD 1409, each NVSC has a name, and each NVSC in list 1411 has a type. An NVSC is named by the CAA, as described above, and its name cannot be changed by the entitlement agent. The entitlement agent can, however, change the type and contents of a NVSC, subject only to the maximums for the types established in EAD 1409 for the EA. It is up to the entitlement agent to keep track of the types and contents of the NVSCs in EA information 1333.

The EMM that modifies EA fields 1516 of EAD 1409 is the Update Entitlement Agent Properties EMM. The second group of EMMs is further subdivided according to the kinds of entitlements they provide. There are two broad families of entitlements: broadcast entitlements for non-interactive services and interactive entitlements for interactive sessions. Within the broadcast entitlements, there are further event entitlements for events that the user pays for individually, as is the case with pay-per-view events, interactive pay-per-view events, and near video-on-demand events. The non-event broadcast EMMs include:

Update MSK
Update Digital Bit Map
Update Digital List
Update Analog MSK and Bit Map
Update Analog MSK and List
Update Analog Bit Map
Update Analog List
The broadcast EMMs for events include
New Event Storage
Add/Remove PPV Event
Acknowledge IPPV/NVOD Event
The EMMs for interactive sessions include
New Interactive Session Storage
Add Interactive Session
Remove Interactive Session As can be seen from the names of the EMMs, the EA can change the type of the named NVSCs allocated by the CAA as needed for events and interactive sessions, subject only to the maximums specified in EAD 1409.

There are separate CAA EMMs for allocating NVSCs, setting limits on types of NVSCs, and assigning a public key to an entitlement agent. Also, the EA EMMs for writing NVSCs 1211 do so by name and can change the NVSC 1211 type as well as its content. Therefore, access control system 601 has a high degree of control and flexibility. A CAA may dynamically constrain the total number of entitlements that an entitlement agent may give, the types of entitlements, and the number of entitlements of each kind as required. The CAA may also change the constraints either in part or as a whole, and can do so either in cooperation with the entitlement agent or unilaterally. Within the constraints imposed by the CAA, however, the entitlement agent is free to dynamically manage its own entitlements, changing not only entitlements of a given type, but even changing the types themselves.

Update Entitlement Agent Properties

This EMM contains the values for EA fields 1516 of EAD 1409. EA administration EMM code 1317 reads EMM header 1113 to get the EAID for the EA to which the EMM is directed and simply sets fields 1516 in EAD 1409 for the EA from the EMM.

Non-Event Broadcast EMMs

Figure 16:
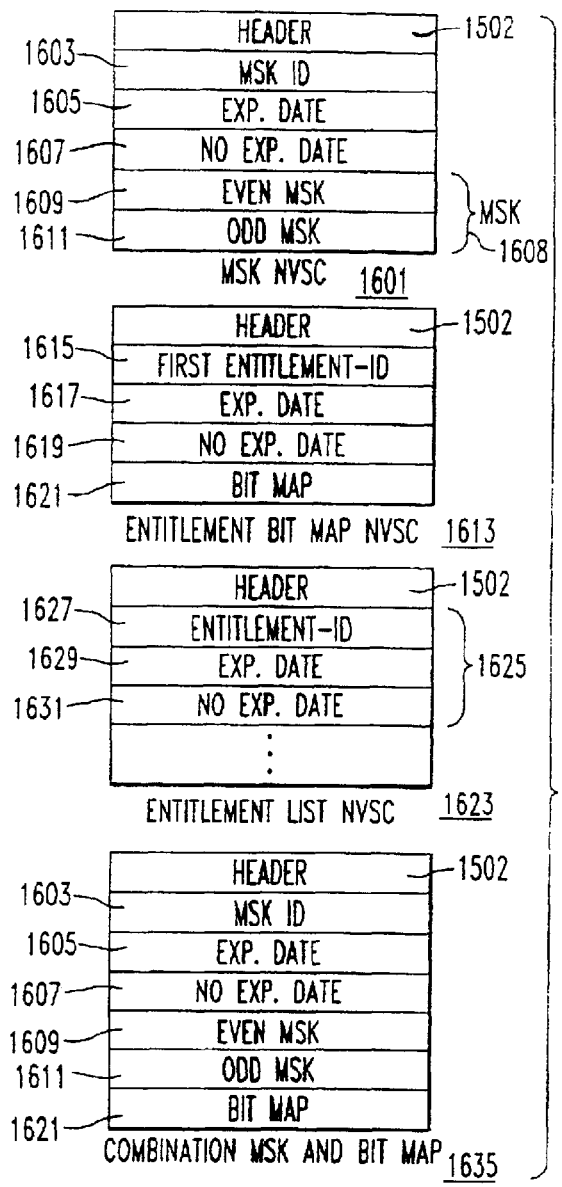
FIG. 16 is a diagram of other kinds of NVSCs.

Of the non-event broadcast EMMs, four types will be discussed here. These are Update MSK, Update Bit Map, Update List, and update combinations with MSK and list or bitmap. Those skilled in the art will be able to easily apply the principles explained below to EMMs that perform the functions indicated by the names of the other non-event broadcast EMMs. For example, the principles of digital EMMs can be applied to analog EMMs. There is a separate type of NVSC 1405 for each information type provided by the above non-event broadcast EMMs. FIG. 16 shows the contents of four of these types of NVSCs. Each NVSC type will be discussed together with the EMM that provides the information it contains.

Update MSK

The Update MSK EMM is used to send a new MSK for a set of services provided by the EA specified by the EMM. The new MSK and other information associated with the MSK are stored in MSK NVSC 1601 in list 1411 for EA information 1333 belonging to the EA specified by the EMM. Included in MSK NVSC 1601 is header 1502.

Header 1502 specifies that NVSC 1601 is a MSK NVSC, gives the NVSC's name, and contains next element pointer 1507 to the next element in list 1411. The other fields contain information about the MSK. In the preferred embodiment, MSK 1608 has two 128-bit parts: the even MSK 1609 and the odd MSK 1611. Each part has two halves, i.e., a first half and second half, each of which has 56 key bits and 8 unused parity bit. The MSK 1608 is associated with a pair identifier 1603 for MSK 1608, an expiration date 1605 for MSK 1608, and a flag 1607 indicating whether the value of expiration date 1605 should be ignored. If the expiration date 1605 is not to be ignored, DHCTSE 627 will not use MSK 1608 to decrypt a control word after the expiration date. The identifier 1603 is per-EA, and consequently, a given EA may have one or more MSK NVSCs 1601 at any given time to store a plurality of different MSKs. Thus, conditional access system 601 not only permits separate security partitions for each EA, but also permits security partitions within an EA.

The Update MSK EMM header contains the EAID needed to locate EA information 1333 for the EA; the message contains the name of the NVSC that is to receive the MSK, a MSK pair selector which specifies a MSK pair ID for the MSK to be updated, a set of flags permitting the EA to selectively change MSK pair ID 1603, expiration date 1605, no expiration date 1607 and either half of MSK 1608, and the information needed to make the changes. At a maximum, the EMM contains a value for MSK pair ID 1603, a value for expiration date 1605, a value for no expiration date 1607, and values for even MSK 1609 and odd MSK 1611. EA MSK code 1319 processes the Update MSK EMM by locating EA Information 1333 for the EA identified by the EMM header's EAID, using the cell name to locate the proper NVSC, giving that NVSC the MSK type, and then writing to the MSK NVSC 1601 as required by the flags and the information in the EMM. This procedure is the same for both analog and digital Update MSK EMMs. The differences are in the EMM command code in EMM Header 1123 and NVSC type 1503.

Entitlement Identifiers

As will be explained in more detail below, an ECM specifies the service instance that it accompanies by means of (1) the EAID for the entitlement agent that is the source of the ECM and (2) a 32-bit entitlement ID for the instance. Entitlement IDs are per-EA. By making the entitlement IDs 32 bits long, each EA will have enough entitlement IDs even for transient services such as pay-per-view events and interactive services. In the preferred embodiment, when DHCTSE 627 interprets an ECM, it checks whether DHCT 333 is entitled to decrypt the instance by looking in EA information 1333 for the EA specified in the ECM for an entitlement ID that corresponds to the entitlement ID specified in the ECM. The entitlement IDs in the EMM and in EA information 1333 can be represented in at least two ways. One way is by simply listing entitlement IDs. The drawback with this technique is that the 32-bit entitlement IDs are large, and NVSCs are a scarce resource. The other way is by means of a starting entitlement ID value and a bit map. Any entitlement ID having a value within 255 of the entitlement ID value specified by the starting entitlement ID value can be specified by setting a bit in the bit map. This technique is set forth in the Banker and Akins patent application supra. See particularly FIG. 2 of the Banker and Akins patent application and the discussion of that figure. The following discussion of specifying entitlement IDs by means of a starting ID and a bit map is an expansion of the discussion in that patent application.

Update Bit Map EMM

This EMM updates a bit map that specifies one or more entitlement IDs. The bit map is stored in an entitlement bit map NVSC 1613. NVSC 1613 has a header 1502 with the cell number and type of the NVSC; a first entitlement ID 1615, which is the first entitlement ID which may be specified by the bit map; an expiration date 1617, which specifies when the entitlement IDs specified by first entitlement ID 1615 and the bit map expire; a no expiration date flag 1619, which indicates whether there is in fact an expiration date; and bit map 1621. The update bitmap EMM contains the cell name for the NVSC 1613 to be set, a set of flags which indicate the information in NVSC 1613 that is to be set by the EMM, and the values for the information. The EMM may set any or all of first entitlement ID 1615, expiration date 1617, no expiration date 1619, and bit map 1621. EA administrative EMM code 1317 responds to the EMM by setting the fields of the specified NVSC 1613 as indicated in the EMM. This procedure is the same for both Update Digital Bit Map and Update Analog Bit Map EMMs. The differences are in the EMM command code in EMM Header 1123 and NVSC type 1503.

Update List EMM

The Update List EMM updates a list of entitlement IDs that is contained in an entitlement list NVSC 1623. NVSC 1623 has a header 1502 with the cell name and type for the NVSC and contains up to six entitlement ID elements 1625. Each of the elements contains an entitlement ID 1627, an expiration date 1629 for the entitlement ID, and a flag 1631 indicating whether the entitlement ID has an expiration date. The update list EMM contains the cell name for the NVSC, a value for the flag, an expiration date, and values for up to six entitlement ID elements 1625. This procedure is the same for both Update Digital List and Update Analog List EMMs. The differences are in the EMM command code in EMM Header 1123 and NVSC type 1503.

Broadcast Events

A broadcast event is a one-time service, such as a pay-per-view broadcast of a boxing match. In the preferred embodiment, there are two kinds of broadcast events: ordinary pay-per-view broadcast events, in which the customer has ordered in advance to see the event, and impulse events where the customer decides at the time the event is broadcast that he wants to order it. There are different kinds of impulse events, such as: impulse pay-per-view (IPPV) events, which are pay-per-view events where the customer can decide at the time of the event to purchase it and near video-on-demand (NVOD), where popular movies are rebroadcast at short intervals and the customer can decide when the rebroadcast occurs whether he or she wants to view it. Those skilled in the art will realize that the concept of an "event" can refer to any service over a specific time period (whether broadcast or non-broadcast), such as video on demand events or other types of events not listed here.

In the case of pay-per-view events, the customer orders the event from the entitlement agent, and the agent responds by sending an EMM that contains the necessary entitlement information. In the case of events where the customer decides at broadcast time that he or she wants to purchase the event, purchase information, i.e., information about the entitlements that can be purchased, must be distributed with the event. In these cases, the purchase information is distributed by means of global broadcast authenticated messages, or GBAMs. The customer provides input 628 that specifies a purchase. The DHCT 333 responds to the input 628 by storing the record of purchase in the DHCTSE 627 and then beginning to decrypt the event. Later, the DHCT 333 sends the entitlement agent a forwarded purchase message (FPM) indicating what has been purchased by the customer, and the entitlement authority responds with an EMM that confirms the purchase and contains the necessary entitlement information. The record of the purchase remains until an EMM confirming the purchase is received by the DHCTSE 627.

Figure 17:
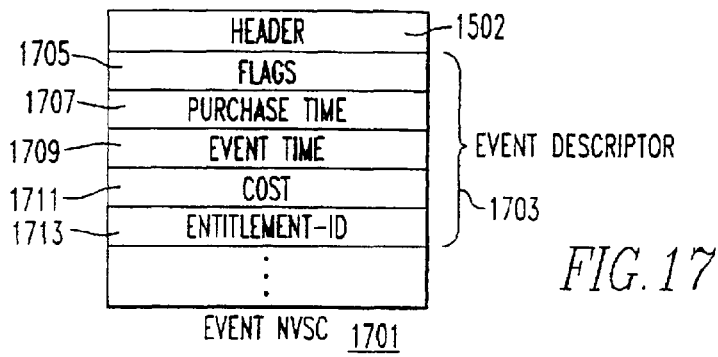
FIG. 17 is a diagram of an event NVSC.

Event NVSCs: FIG. 17

FIG. 17 shows event NVSC 1701 used to store entitlement information for events. Header field 1502 is similar to that for other NVSCs 1701. Each event NVSC 1702 may contain up to three event descriptors 1703, each of which describes a single event. Each event descriptor 1703 contains a Flags Field 1705 that includes flags to indicate (1) whether the event is active, (2) whether its end time has been extended, (3) whether the entitlement agent has confirmed purchase of the event, (4) whether the customer can cancel at any time, (5) whether the customer can cancel in a cancellation window, (6) whether the customer has canceled the purchase, (7) whether the right to copy the event has been purchased, and (8) whether the event is an analog or digital service. Purchase time 1709 is the later of the start time for the event or the time the customer purchased the event. End time 1709 is the time the event is to end. Cost 1711 is the cost of the event to the customer, and entitlement ID 1713 is the entitlement ID for the event.

New Event Storage EMM

When the CAA sets up entitlement agent descriptor 1409 for an entitlement agent, it includes a value in EA Maximums 1515 that limits the number of event NVSCs 1701 the entitlement agent may have. Within that number, however, the entitlement agent is free to allocate event NVSCs 1701 from the total number of NVSCs 1405 belonging to the entitlement agent and to reuse existing event NVSCs 1701. To allocate an event NVSC, the EA uses the new event storage EMM, which simply contains the cell name for the NVSC which is to be allocated. Once the event NVSC 1701 has been allocated, its fields are set as follows:

In the case of an ordinary PPV event, fields are set by an add/delete event EMM;

In the case of an IPPV or NVOD event, fields are set in part from the GBAM for the event and in part from customer input 628.

The contents of an event NVSC 1701 are deleted by an add/delete event EMM or by receiving an ECM containing a time greater than the event end time in the event NVSC 1701, if the event record had been previously acknowledged by receiving the Acknowledge Event EMM.

The Add/delete Event EMM

The add/delete event EMM contains a flag which indicates whether the EMM is setting or deleting an event. In the latter case, the contents of the EMM must match the current contents of the NVSC 1701 that is to be deleted. In the former case, the values of the EMM include flags indicating whether time extensions are allowed and whether the right to copy has been purchased. Further included are values for the event's start time and end time and the entitlement ID for the event. When the add/delete flag indicates "delete", EA administrative code deletes the contents of the NVSC 1701. When it indicates "add", the code sets the corresponding fields of the NVSC 1701 to the values specified in the EMM. The flag that indicates whether the EA has acknowledged the purchase is set to so indicate.

Figure 18:
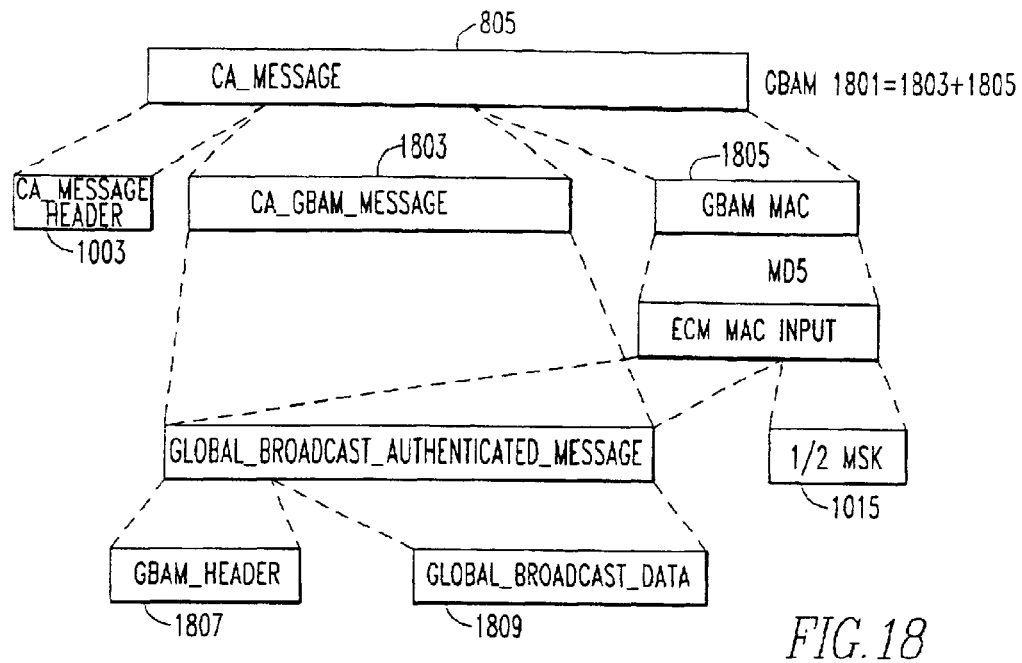
FIG. 18 is a diagram of a global broadcast authenticated message (GBAM)
Figure 19:
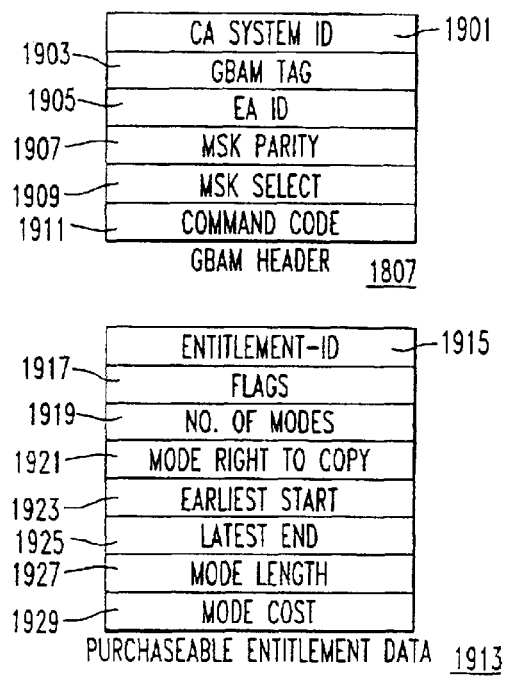
FIG. 19 is a detail of the contents of one kind of GBAM.
Figure 20:
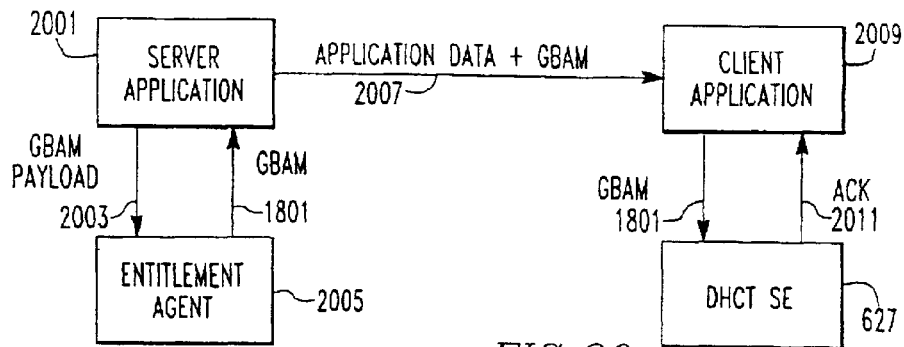
FIG. 20 is a diagram showing how GBAMs may be used generally to provide data to a client application.

The Global Broadcast Authenticated Message: FIGS. 18–20

The Global Broadcast Authenticated Message (GBAM) is, like the EMMs, ECMs, and FPMs, a CA message. A GBAM is broadcast by an entitlement agent to DHCTs 333.

FIG. 18 shows a CA message 805 including a GBAM 1801. Message 805 includes a CA message header 1003 and a CA GBAM message 1803, which in turn is made up of a GBAM header 1807 and global broadcast data 1809. Global broadcast data 1809 is not encrypted, but GBAM 1801 is authenticated in the same fashion as an ECM: header 1807, global broadcast data 1809, and MSK 1015 belonging to the EA which sent the GBAM are hashed by one-way hash function MD5 to produce GBAM MAC 1805. As with the ECM, the MSK 1015 is a shared secret between the EA which sent the GBAM and DHCTs 333 that have EA information 1333 for the EA.

FIG. 19 shows GBAM header 1807 in detail as well as the form that global broadcast data 1809 takes when GBAM 1801 is used to provide entitlement information for IPPV or NVOD. GBAM header 1807 has a conditional access system ID 1901 that identifies CA system 601 in which GBAM 1801 is being used, a tag which indicates that the message is a GBAM, and the identifier 1905 of the entitlement agent sending the GBAM. Fields 1907 and 1909 specify the key that was used to make MAC 1805. Field 1907 specifies the parity of the MSK half used to make the digest, and MSK select 1911 is an identifier for the MSK itself.

Purchasable entitlement data 1913 refers to the form of global broadcast data 1809 that is used to provide entitlement information for IPPV or NVOD. Of the fields that are relevant for the present discussion, Entitlement ID 1915 is the entitlement ID for the event associated with the GBAM, and Flags 1917 include flags indicating what kind of cancellation is allowed and whether the time for the event may be extended. Number of modes 1919 indicates how many different modes there are for purchasing the event. The rights which the purchaser receives to the event and the price the purchaser must pay will vary with the mode. In the preferred embodiment, an event may have up to five purchase modes. If more purchase modes are required, additional GBAMs may be sent. The rights and prices for each mode are indicated by arrays. Each array has as many valid elements as there are modes. The value of an element corresponding to a mode indicates the right or price for that mode. Thus, mode right to copy field 1921 is a bit array; if a bit for a mode is set, the purchaser of the mode has the right to copy the event. Similarly, mode length field 1927 contains a value for each mode which indicates the length of time for the event in that mode. Mode cost field 1929 contains a value for each mode which indicates the cost for the event in that mode. Earliest start field 1923 gives the earliest time at which entitlement for the event can start, and latest end field 1925 gives the latest time at which entitlement must end.

When DHCT 333 receives GBAM 1801, it passes GBAM 1801 to DHCTSE 627 for authentication of global broadcast data 1809. Authentication will fail unless DHCTSE 627 has the required MSK. If (1) DHCTSE 627 has the required MSK and (2) global broadcast data 1809 is data 1913, DHCT 333 permits the customer to purchase the event. In so doing the customer identifies himself or herself to DHCT 333 by means of a PIN, and that PIN must match PIN 1525 in EAD 1409 for the entitlement agent that sent the GBAM. In making his or her purchase, the customer also specifies the relevant modes. Given the mode information and the cost information in the GBAM, DHCT 333 can determine whether ordering the impulse event will cause the customer to exceed the amount (of time, money, etc.) specified in stored credit limit 1519 in EAD 1409. If the customer has not exceeded the limit the information from the GBAM and from the purchaser's inputs are used to make an event descriptor 1703 for the event. DHCT 333 passes the information to DHCTSE 627, which sets the fields in event descriptor 1703 according to the values provided it by DHCT 333. The flag that indicates whether the purchase information has been acknowledged is cleared, and the cost of the event is added to the current credit balance.

Figure 21:
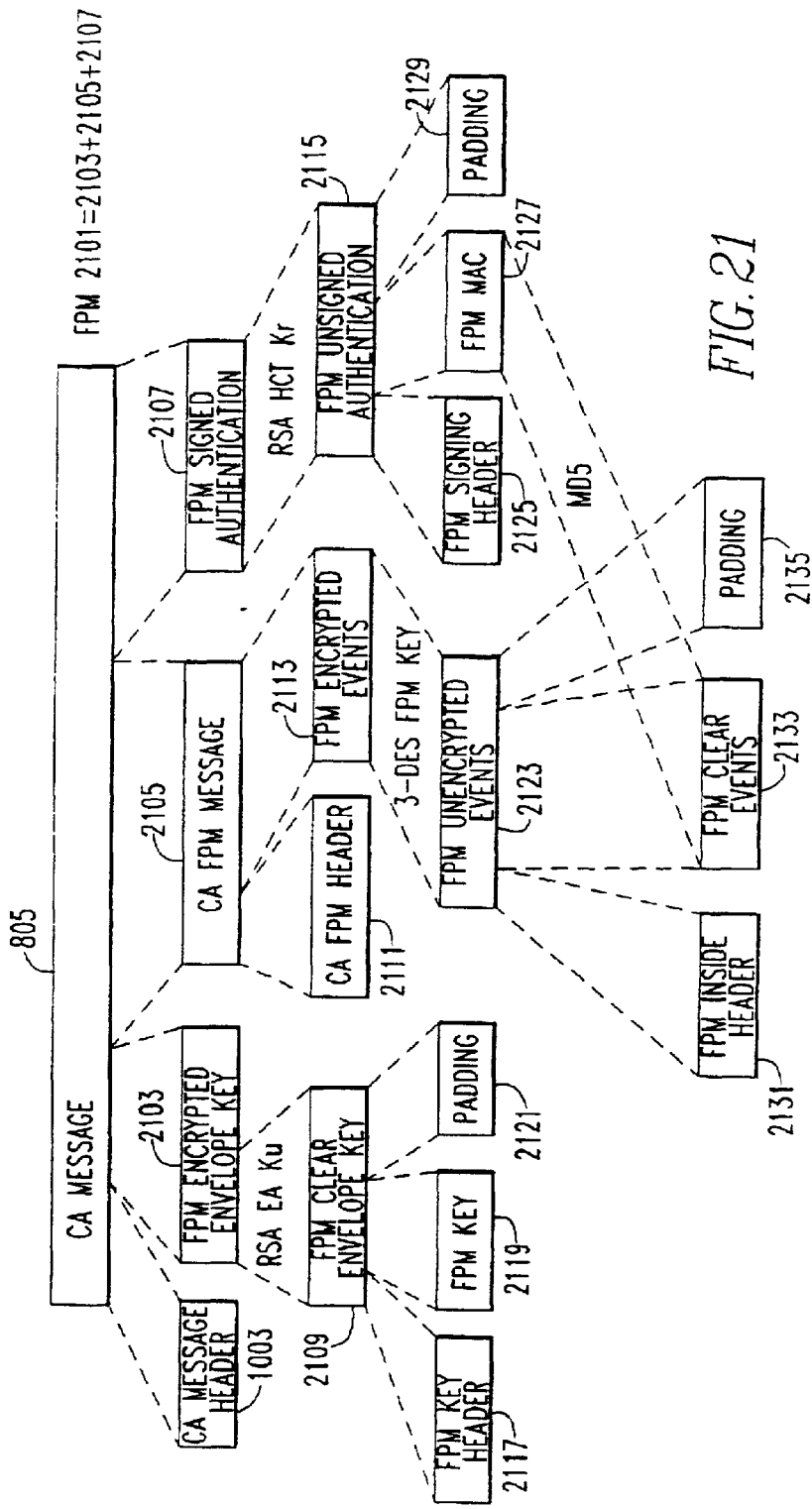
FIG. 21 is a diagram of a forwarded purchase message.

The Forwarded Purchase Message: FIG. 21

The forwarded purchase message (FPM) in a preferred embodiment serves two purposes it informs the entitlement agent that the customer has purchased an IPPV or NVOD event; and it informs the entitlement agent that the customer has canceled the purchase of any event.

In other embodiments, messages like the FPM can be used to transfer any kind of information from DHCT 333 to a CAA or an EA. For example, such a message can be used to transfer monthly order information from DHCT 333 to an EA.

DHCT 333 sends a forwarded purchase message with the purchase information via the reverse channel to the entitlement agent that sent the GBAM. The FPM is contained in a reverse channel data packet that is addressed to the EA. FIG. 21 provides an overview of the FPM and of the cryptographic measures used to protect its contents. FPM 2101 is a CA message 805 and consequently is sent with a CA message header 1003. FPM 2101 itself is made up of FPM encrypted envelope key 2103, which contains the EAID for the entitlement agent and FPM key 2119 for decrypting the purchasing information contained in FPM encrypted events 2113. The key and other contents of envelope key 2103 are encrypted for privacy using the public key of the entitlement agent for which FPM 2101 is intended. CA FPM message 2105 includes CA FPM header 211, which includes the EAID for the intended EA, and FPM encrypted events 2113. The latter are encrypted using the 3-DES algorithm with the key in envelope key 2103. CA FPM message 2105's parts are a header 213, FPM clear events 2133, which contains the purchase information, and padding 2135. The last part of FPM 2101 is FPM signed authentication 2107, which is encrypted with the private key of DHCT 333 from which FPM message 2101 is sent The encrypted material includes FPM signing header 2125, FPM MAC 2127, and padding 2129. FPM MAC 2127 is made using the MD5 one-way hash algorithm from FPM clear events 2133. Only the EA for which the FPM is intended can decrypt envelope key 2103 to obtain key 2119 to decrypt FPM encrypted events 2123, and the EA can check the authenticity of FPM clear events 2133 only if it has the public key for DHCT 333 from which FPM 2101 was sent.

The part of FPM 2101 which is of further interest here is FPM clear events 2133. The information in that part of the FPM includes the serial number of DHCTSE 627 in DHCT 333 from which the message came, the EAID of the destination EA, and an indication of the number of events for which the FPM contains purchase information. The information for each event is contained in forwarded event data for that event. The forwarded event data is taken from GBAM 1801 and event descriptor 1703 for the event. Fields of interest in the present context include flags indicating (1) whether the event has been extended. (2) whether the user has canceled the event, and (3) whether the customer has purchased the right to copy. Other information includes the time the event started or was purchased, whichever is later, the time the event is to end, its cost to the customer, and the entitlement ID for the event. To cancel any event, including an ordinary pay-per-view event, DHCT 333 sends an FPM with the same message, but with the event canceled flag set to indicate cancellation. The conditions under which DHCT 333 sends an FPM cancellation message will be explained in more detail below. FPMs may also be used to purchase other service types, such as monthly subscriptions, or data downloads, for example.

The Acknowledge IPPV/NVOD Event EMM

When the entitlement agent receives the FPM, it enters the information contained in the FPM in its customer information database and returns an acknowledge IPPV/NVOD event EMM to DHCT 333. EMM command data 1125 in this EMM contains an exact copy of the forwarded event data in the FPM that the EMM is acknowledging. When DHCTSE 627 receives this EMM, it decrypts and authenticates it and then, for each item of copied forwarded event data, it uses the entitlement ID to locate event NVSC 1701 for the event. Having located the event NVSC 1701, it compares the copied forwarded event data with the corresponding fields of event NVSC 1701. If they are the same. DHCTSE 627 sets the flag in Flags Field 1705 that indicates that the purchase has been confirmed and adjusts the stored credit balance. If the EMM has its "canceled" flag set, the "in use" flag in event NVSC 1701 is set to indicate that event NVSC 1701 is not in use and is therefore available for reuse by the entitlement agent.

Other uses of GBAM 1801

GBAM 1801 can be used generally to broadcast authenticated messages via a MPEG-2 transport stream, or other transport mechanisms, to DHCTs 333. CA system 601 itself uses GBAM 1801 in two other ways: to periodically broadcast a time value to DHCTs 333 and to extend the time for events. In the former case, GBAM 1801 simply carries the time value, which is a secure time, due to the GBAM's authentication. The code in DHCT 333 which carries out a task for the entitlement agent that sent the system time GBAM can use the time value to coordinate its activities with activities by the EA. Note that this arrangement permits the use of per-entitlement agent time schemes. It also permits establishing a uniform system time throughout a digital broadband delivery system by setting up one entitlement agent in each DHCT 333 of the digital broadband delivery system as the "system time entitlement agent" and addressing the system time GBAM to the system time entitlement agent.

GBAMs 1801 that extend the time for an event carry the entitlement ID for the event and the number of minutes the time for the event is to be extended. When GBAM 1801 is received and provided to DHCTSE 627, the secure element adds the number of minutes to end time 1709.

FIG. 20 shows a server application 2001 executing on a processor having access to entitlement agent 2005 and to the MPEG-2 transport stream being received by a group of DHCTs 333. The server application 2001 can use GBAM 1801 to send authenticated messages to the DHCTs 333. Server application 2001 sends a message to entitlement agent 2005, which uses its transaction encryption device 603 to make a GBAM 1801 including the payload. Entitlement agent 2005 then returns the GBAM to server application 2001 which sends application data together with the GBAM, as shown at 2007, to client application 2009 in the DHCTs 333. Each client application sends GBAM 1801 to DHCTSE 627, which authenticates it. If the authentication succeeds, DHCTSE 627 sends an acknowledgment to client application 2009. It should be noted here that it is the entitlement agent and not server application 2001 which authenticates the payload.

NVSCs and EMMs for Interactive Sessions

DBDS 501 can also be used for interactive sessions. Examples of such uses are browsing the Internet or playing video games. In such applications, data being sent to the customer will generally go via the MPEG-2 transport stream, while data being sent from the customer will go via the reverse channel. Such an arrangement is advantageous for the many interactive applications in which the customer receives a large amount of data, for example, the data that represents an image makes a short response, and then receives another large amount of data.

Each interactive session that is currently taking place with a user of DHCT 333 has an interactive session NVSC 1211 in list 1411 belonging to the entitlement agent that grants access to the interactive session. The interactive session NVSC contains a session key for the interactive session and an entitlement ID for the interactive session. DHCTSE 627 allocates the interactive session NVSC in response to a new interactive session storage EMM from the entitlement agent. The new interactive session storage EMM simply contains the cell name of the NVSC to be used for the interactive session.

Once the EA has established the NVSC, it sends an "add interactive session" EMM that is directed to the name of the newly-allocated NVSC and contains the entitlement ID and the key for the interactive session. The secure element places the entitlement ID and key in the NVSC. When the EA determines that the interactive session is over, it sends a "remove interactive session" EMM with the entitlement ID for the interactive session and the secure element deletes the contents of the NVSC. It is of course possible that the entitlement agent sends a new interactive storage EMM at a time when all of the interactive session NVSCs allotted by the CAA to the EA are already in use. DHCTSE 627 in a preferred embodiment deals with this situation by keeping track of the last time each interactive session sent or received data. When a new interactive session is needed and none is available, DHCTSE 627 shuts down the interactive session that least recently sent or received data and uses that interactive session's interactive session NVSC for the new interactive session. Another solution is to request the user to select an interactive session to be terminated.

Figure 22:
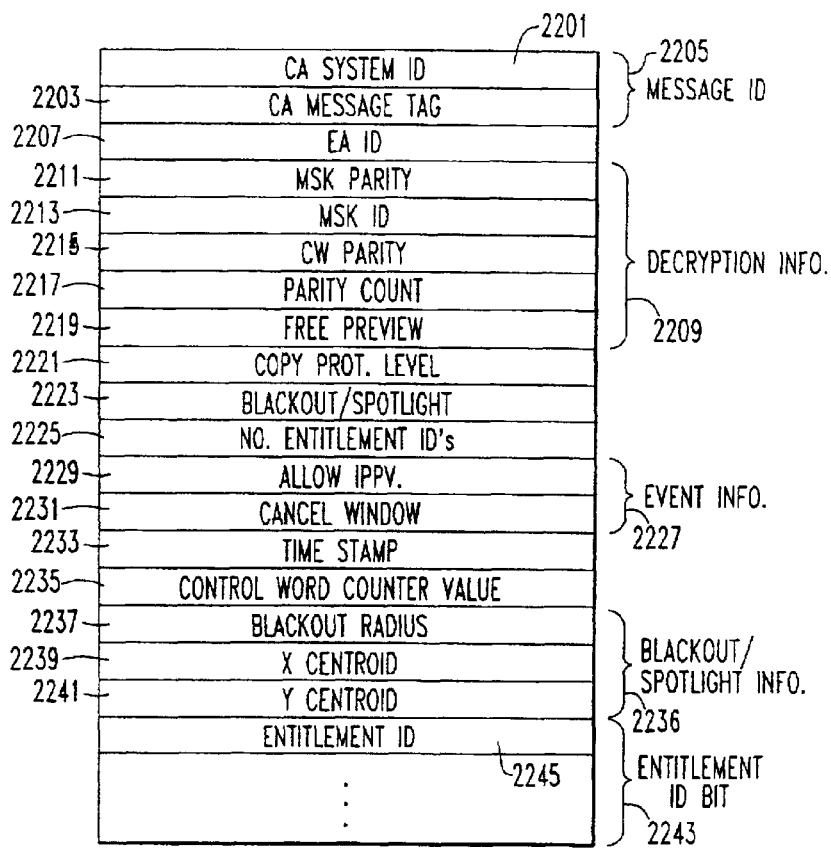
FIG. 22 is a diagram of the entitlement unit message in an ECM.

Details of the ECM: FIG. 22

The information in an ECM that is used to determine whether the instance of a service that the ECM accompanies is to be decrypted in a given DHCT 333 is contained in ECM entitlement unit message 1011. FIG. 22 gives details of the contents of ECM entitlement unit message 1011 for a preferred embodiment of the present invention. Beginning with message ID 2205, the two fields 2201 and 2203 identify this message as an ECM entitlement unit message. EAID 2207 is the identifier for the entitlement agent which grants entitlements to access to the instance of the service that the ECM accompanies.

Decryption information 2209 is information used to produce the control word 2235 Control word counter value 2235 is encrypted using the 3DES algorithm in a preferred embodiment. This algorithm employs two keys, and in a preferred embodiment, each key is ½ of the MSK. Also, there are two versions of the MSK: even and odd. MSK parity 2211 specifies which version is to be used in the 3DES algorithm. MSK ID 2213 specifies which MSK belonging to the entitlement agent is to be used, or if the ECM accompanies data for an interactive session, it specifies that the key is to be found in the NVSC for the interactive session. Control word parity 2215 specifies the parity of the unencrypted control word 2235. Parity count 2217 is a 0–1 counter that has the value 0 when the parity of the control word is even and 1 when it is odd.

Free preview 2219 is a flag that indicates that the ECM is accompanying a portion of the service instance that is a free preview. That is, as long as a customer has the MSK for decrypting the service instance, the customer needs no further entitlements to view the free preview portion of the service. The main use of free previews is with IPPV or NVOD services. Copy protection level 2221 is a value which indicates to what extent the instance may be copied. Blackout/spotlight 2223 is a value which indicates how blackout/spotlight information 2236 is to be used: not at all, for a blackout, or for a spotlight (i.e., the service is targeted to the specific area).

Number of entitlement IDs 2225 specifies the number of entitlement IDs 2245 that are contained in this ECM. The maximum number in a preferred embodiment is six in a single ECM. Multiple ECMs may be sent for each service. Allow IPPV 2229 is a flag which indicates whether the service instance may be viewed on an IPPV or NVOD basis. Cancel window 2231 is a bit that is set in a service instance that may be viewed as an event to indicate the end of the period during which the customer may cancel the event. Time stamp 2233 is a time stamp indicating the time at which the ECM was created. Encrypted control word 2235 is the control word contained in the ECM. It is encrypted using the 3DES algorithm and the MSK for the service instance.

Blackout/spotlight information 2236 defines a geographic area which is to be blacked out or spotlighted by an instance of a service. It does so by means of x centroid 2239 and y centroid 2241, the two of which define a point in a geographical coordinate system defined by the entitlement agent, and blackout radius 2237, which is used to determine a square that is centered on the point defined by fields 2239 and 2241 and that has sides that are twice the value of blackout radius 2237. Entitlement ID list 2243 contains from one to six entitlement IDs for the instance of the service that the ECM accompanies.

Figure 26:
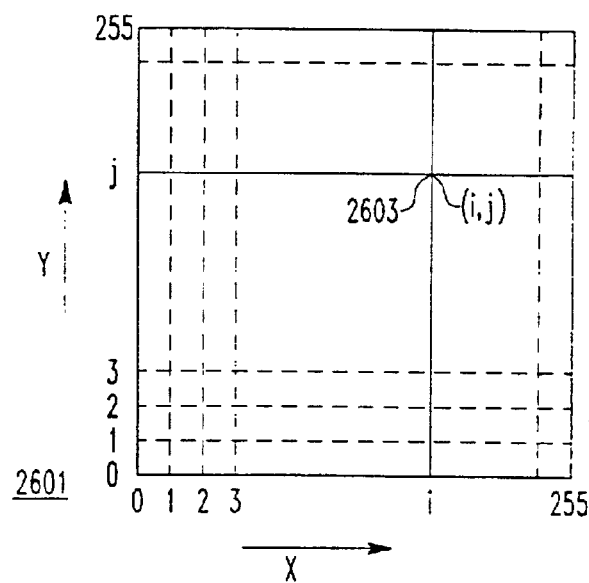
FIG. 26 is an illustration of the coordinate system used for spotlight and blackout.
Figure 27:
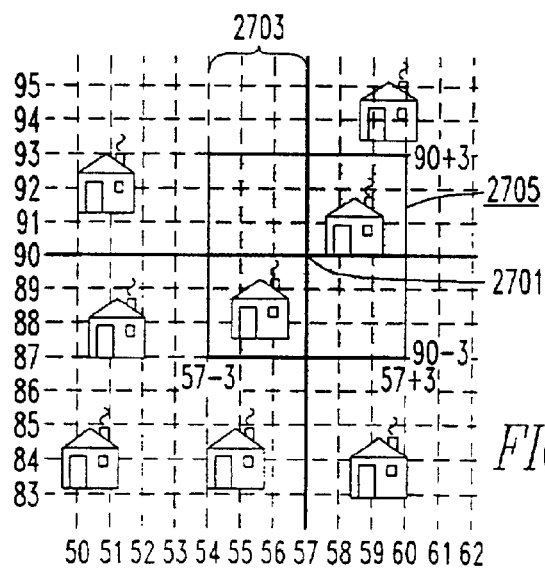
FIG. 27 shows how an area is computed in the coordinate system of FIG. 26.

Details of Blackout/spotlight Info 2236: FIGS. 26 and 27

The coordinate system used in a preferred embodiment is shown in FIG. 26. Coordinate system 2601 is a 256 unit by 256 unit square, with the origin at the lower left-hand corner. In the coordinate system, it is the lines, rather than the spaces between them, that are numbered. The entitlement agent to which coordinate system 2601 belongs assigns each DHCT 333 in the area covered by the coordinate system the coordinates of an intersection of a line that is perpendicular to the x axis with a line that is perpendicular to they axis. Thus, a DHCT 333(*k*) may be assigned the point (i,j) 2603 in coordinate system 2601.

FIG. 27 shows how areas are defined in coordinate system 2601. Area 2705 has its centroid 2701 at the point whose coordinates are (57,90). The radius 2703 of the area is three, so this number is added to and subtracted from each of the coordinates of the centroid to produce a square 2705 whose lower left-hand corner is at (54,87) and whose upper right-hand corner is at (60,93). In the preferred embodiment, points on the left and bottom lines are in the area; points on the top and right lines are not.

Determining Whether to Decrypt the Service Instance that Accompanies an ECM

Conceptually, what happens when DHCT 333 receives an ECM accompanying an instance of a service is that DHCT 333 provides the ECM to DHCTSE 627, which examines the NVSCs in EA storage 1331 to find whether the customer to whom DHCT 333 belongs is entitled to receive the instance of the service. If the customer is so entitled, DHCTSE 627 decrypts the control word in the ECM and provides it to service decryptor 625, which uses it to decrypt the MPEG-2 packets containing the audio and video for the service.

However, the number of different kinds of services, the number of different ways in which a service can be purchased, and the number of ways in which access can be restricted all work together to make the manner in which DHCTSE 627 processes an ECM rather complex.

The simplest case is for a broadcast service such as a standard CATV channel. Here, the customer who owns DHCT 333 has paid his or her monthly bill for the service and the entitlement authority has sent two EMMs to DHCT 333: a MSK EMM with the month's MSK for the service and an EMM that specifies the entitlement ID for the service. As previously pointed out, the latter EMM may either contain a list of entitlement IDs or a first entitlement ID and a bit map. All of these EMMs may also contain expiration dates: in the case of the MSK EMM, there is an expiration date of the MSK; in the case of the entitlement ID list EMM, there is an expiration date for each entitlement ID on the list; in the case of the entitlement bit map EMM, there is an expiration date for the entire bit map.

At a minimum, EA information 1333 for the entitlement agent that provides entitlements for the service instance that the ECM is accompanying contains EA descriptor 1409, a MSK NVSC 1601, and either an entitlement bit map NVSC 1613 or an entitlement list NVSC 1623 for the service to which the instance belongs. EA information 1333 may also contain NVSCs with entitlement information for many other services or instances thereof. The ECM for the service instance will contain, at a minimum, entitlement agent ID 2207, decryption information 2209, time stamp 2233, encrypted control word 2235, and a single entitlement ID 2245 for the instance of the service.

When DHCT 333 receives the ECM, it delivers the ECM to DHCTSE 627, which reads down EA list 1406 until it finds an EA descriptor 1409 having a value in EAID 1509 that is the same as the value EAID 2207 in the ECM. DHCTSE 627 then follows first NVSC pointer 1513 to list 1411 and looks for a MSK NVSC 1601 that has an MSK ID field 1603 containing the same value as MSK ID field 2213 in the ECM. Having found such an MSK NVSC, it determines from no_exp_dat flag 1607 whether expiration date field 1605 contains a valid time value, and if so, it compares that value with the value in the ECM's time stamp field 2233. If the value in time stamp field 2233 is more recent in time, DHCTSE 627 will not use MSK 1608 from MSK NVSC 1601 to decrypt control word 2235. The secure element continues searching for an MSK NVSC with the proper MSK ID and an unexpired MSK, and if it finds such a MSK NVSC, it uses that MSK NVSC; if it finds no such MSK NVSC, it does not decrypt the control word.

DHCTSE 627 similarly searches list 1411 for an entitlement bitmap NVSC 1613 or an entitlement list NVSC 1623 which contains an entitlement ID which is the same as one of the entitlement IDs 2245 in the ECM. If (1) DHCTSE 627 finds an NVSC with such an entitlement ID and (2) there is no valid expiration time in the NVSC that specifies the entitlement ID that is earlier than time stamp 2233 in the ECM and (3) DHCTSE 627 has also found a valid MSK NVSC 1601 as described above, DHCTSE 627 decrypts control word 2235 using the MSK and decryption information 2209 in the ECM. Decryption is done using the 3DES algorithm that was used to encrypt the control word. In a preferred embodiment, the control word contained in the ECM is a counter value as described above, and DHCTSE 627 produces the control word that actually is used to decrypt the service instance by re-encrypting the integer using the MSK and the 3DES algorithm. That control word usable by the service decryptor is then returned to service decryption module 625, which uses it to decrypt the service instance.

As is apparent from the foregoing description, when DHCTSE 627 searches an entitlement agent's entitlement agent information 1333 for a given entitlement for a service, it continues searching until it has either found an NVSC that contains the entitlement or it has reached the end of list 1411. What this means in logical terms is that the entitlements that a given entitlement agent can grant are the logical OR of the entitlements specified in entitlement agent information 1333. For example, if one entitlement bit map NVSC that contains the same entitlement ID as the ECM has expired but another has not, DHCTSE 627 disregards the expired NVSC, and based on the active NVSC, produces control word 2235.

It should further be pointed out here that time stamp 2233 in the ECM and the expiration information in the NVSCs prevent reuse of a previous month's MSK to decrypt an instance in the current month and also prevent reuse of a previous month's entitlements in the current month to implement the protection against replay attacks described in the Banker and Akins patent application supra.

Where further restrictions apply to an entitlement, DHCTSE 627 searches for that information as well in entitlement agent information 1333. For example, if blackout/spotlight field 2223 of the ECM indicates that a blackout applies to the service. DHCTSE 627 uses blackout/spotlight information 2236 to determine whether the location specified by x coordinate 1521 and y coordinate 1523 is within the square specified by blackout/spotlight information 2236; if so, DHCTSE 627 does not decrypt control word 2235. When a spotlight applies, the procedure is of course the opposite: DHCTSE 627 decrypts the control word only if x coordinate field 1521 and y coordinate field 1523 specify a location within the square.

As previously noted, the techniques that are used to grant entitlements according to geographical area may be generalized to grant entitlements to various subsets of customers. For example, entitlements may be conceptually represented in a Venn diagram, blackout/spotlight information 2236 may specify an area in the Venn diagram that represents the set of customers that are entitled to receive the service, and x coordinate 1521 and y coordinate 1523 may specify the location of the customer in the Venn diagram. One use of such an arrangement would be to restrict access to an instance of a service according to a customer's desire that users of his or her DHCT not have access to instances with objectionable content. In other embodiments, of course, more coordinates or other ways of representing set membership could be used.

Event Services

When the ECM accompanies an instance of an event, interpretation of the ECM takes place as described above, except that the entitlement information for the event is contained in an event NVSC 1701. DHCTSE 627 searches the entitlement information 1333 for the entitlement agent having the EAID that is in the ECM for an event NVSC 1701 containing an event descriptor 1703 with an entitlement ID 1713 that is the same as one of the entitlement IDs 2245 in the ECM. If the event is a standard pay-per-view event, DHCTSE 627 then examines the flags 1705 to determine whether the customer has canceled the event and whether purchase of the event has been confirmed (always the case with standard pay-per-view). The DHCTSE 627 then compares purchase time 1707 and end time 1709 with time stamp 2233 to determine whether the time indicated by the time stamp is within the period indicated by fields 1707 and 1709. If the examination of event NVSC 1701 indicates that the customer is entitled to the event, DHCTSE 627 decrypts control word 2235 as described above.

With IPPV or NVOD events, allow IPPV flag 2229 in the ECM must indicate that the event is one that need not be purchased in advance. Free preview flag 2219 may also be set to indicate that the portion of the event instance accompanied by the ECM is part of the free preview, and cancel window flag 2231 may further be set to indicate that the event can still be canceled. If free preview flag 2219 is set, DHCTSE 627 simply looks for a MSK NVSC 1601 in EA information 1333 that contains the MSK specified by MSK ID 2213 in the ECM. If the DHCTSE 627 finds one that is valid, it decrypts control word 2235.

If free preview flag 2219 is not set, DHCTSE 627 goes to the event NVSC 1701 having the entitlement ID 1713 that is the same as one in ECM field 2245. If flags included in flags 1705 indicate that the purchase of the event has been confirmed and the event has not been canceled, DHCTSE 627 decrypts control word 2235. If the event has not been canceled and has not been confirmed, but time stamp 2233 indicates a time that is within a predetermined period after purchase time 1707 indicated in event descriptor 1703, DHCTSE 627 also decrypts control word 2235. It is by this means that the service instance continues to be decrypted between the time the FPM is sent to the entitlement agent and the time the entitlement agent returns the acknowledge IPPVINVOD event EMM. This causes the confirmation flag to be set in flags 1705.

Cancellation of Entitlements to Events: FIGS. 17, 19, and 22

Whether a user can cancel a previously purchased entitlement to an IPPV/NVOD event that he or she has purchased preferably depends on the event. There are three possibilities:

the entitlement can be canceled up to two minutes past purchase;

the event can be canceled during a period of time termed a cancellation window, or the event cannot be canceled.

Which of the three possibilities is associated with a given event is determined by the purchasable entitlement data 1913 in the GBAM that accompanies the event. One flag in flags 1917 indicates whether the event can be canceled; another indicates whether cancellation is possible in a cancellation window. If neither flag is set, the event cannot be canceled. When DHCTSE 627 makes an event descriptor 1703 for the event, the values of the flags in the GBAM are used to set flags in flags 1705 which indicate whether the event may be canceled or during a cancellation window only. Again, if neither flag is set, the event cannot be canceled.

The user cancels an event by requesting cancellation via customer input 628 to DHCT 333. When DHCT 333 receives the input, it provides a cancellation request, including the EAID and entitlement ID for the instance, to DHCTSE 627, which uses the EAID and the entitlement ID to locate the event NVSC 1701 that contains event descriptor 1703 for the event. If the flags in flags 1705 indicate that the entitlement cannot be canceled, DHCTSE 627 indicates that fact to DUCT 333, which then indicates that the entitlement is not cancelable to the user. If the flags indicate that the entitlement can be canceled.

DHCTSE 627 simply sets the canceled flag in event descriptor 1703. If the flags indicate that the entitlement can be canceled only during a cancellation window, and an ECM indicating the cancel window has ended has not yet been received, DHCTSE 627 sets the cancel flag in event descriptor 1703; otherwise, it indicates to DHCT 333 that the entitlement cannot be canceled, and DHCT 333 so informs the user. If the event has been canceled, DHCTSE 627 clears the acknowledged flag, which action causes a new FPM to be sent to the entitlement agent for the event. The entitlement agent responds to the FPM by adjusting its billing as required by the cancellation and sending a new acknowledge EMM.

Interactive Sessions

The chief difference between broadcast services and interactive services is that each session of the interactive service has its own interactive session key, which is contained in the interactive session NVSC for the interactive session. The NVSC for the interactive session also contains the entitlement ID for the interactive session. In an ECM that accompanies the MPEG-2 stream for an interactive session, MSK ID field 2213 is set to a value which indicates that the MPEG-2 stream is to be decrypted using an interactive session key. When DHCTSE 627 interprets such an ECM, it uses entitlement ID 2245 to find the NVSC for the interactive session and then uses the interactive session key contained in the NVSC to decrypt control word 2235.

Figure 25:
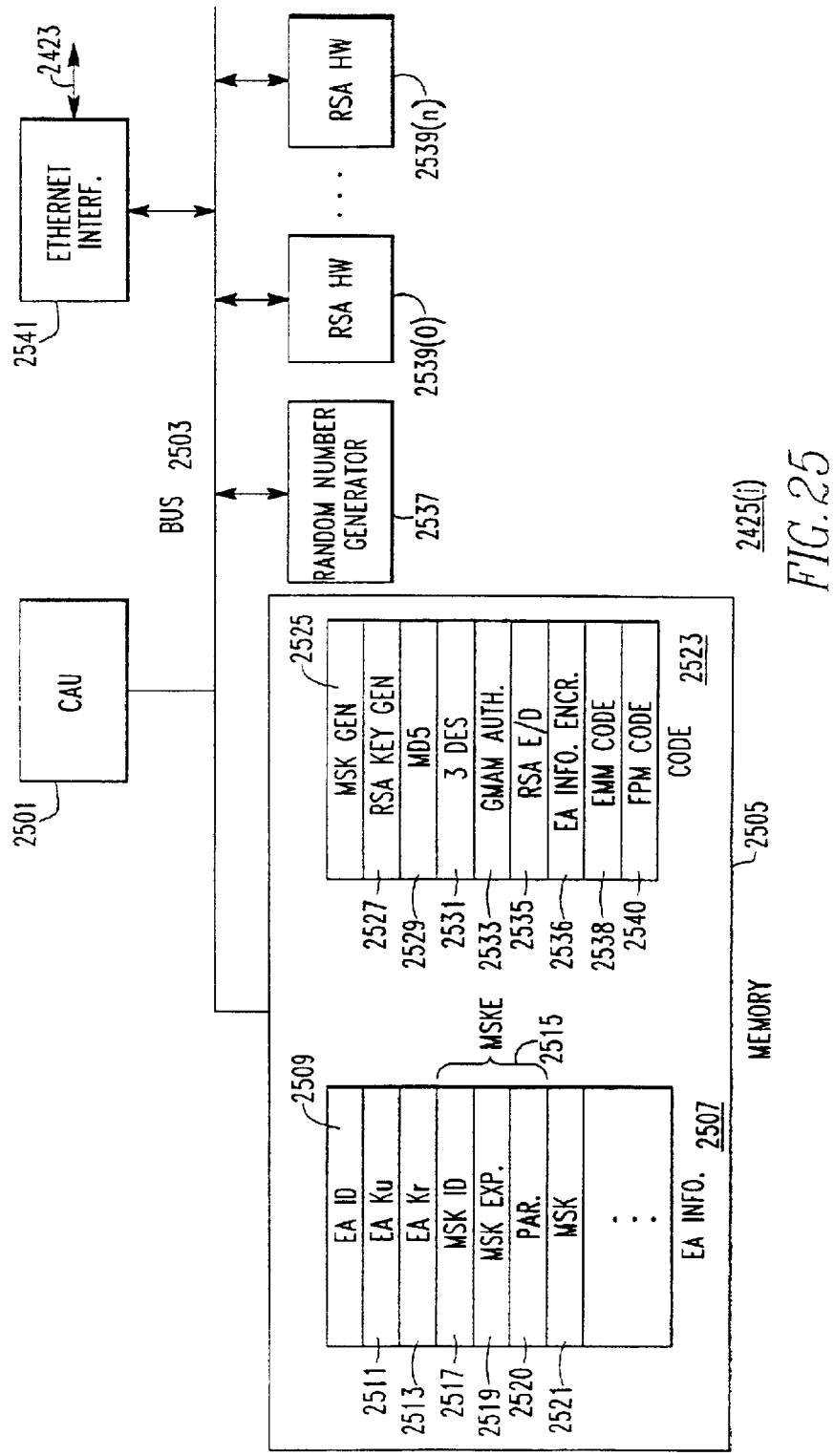
FIG. 25 is a detailed diagram of a TED.

Detailed Description of Transaction Encryption Device 603: FIGS. 24 and 25

Each CAA that can authorize entitlement agents in digital broadband delivery system 501 and each EA that can grant entitlements in system 501 has a Transaction Encryption Device or TED 603 in system 501. Preferably, each CAA or EA has its own separate TED in system 601. Alternatively, the TEDs could be combined in one device. The TED 603 stores the secret keys used by the entity to which it belongs and has hardware and software to do encryption, decryption, key generation, and authentication as required by the entity. The keys are kept secure by implementing the TED without a user interface or user I/O devices, by implementing it in a tamper resistant container, by connecting the TED only to the DNCS and using a secure link for that connection, and by keeping the TED in a physically secure environment such as a locked room.

In the case of a TED 603 for a CAA, the TED 603 stores the private keys corresponding to the three public keys representing the CAA in the DHCTs 333, encrypts and provides sealed digests for of EMMs from the CAA to the DHCTs 333, and decrypts and authenticates messages from the DHCTs 333 to the CAA. In the case of a TED 603 for an EA, the EA TED does the following:

(1) stores the public and private keys for the EA and the MSKs for the EA;

(2) generates the EA public and private keys and the MSKs;

(3) encrypts and prepares sealed digests for the EMMs sent on behalf of the EA:

(4) prepares the shared secret digests used to authenticate global broadcast messages:

(5) provides the MSKs to SEES module 620 for use in encrypting instances of services;

(6) generates interactive session keys (ISKs) for interactive session EMMs and provides them to SEES module 620 for use in encrypting the interactive session; and (7) decrypts FPMs and other messages sent from DHCT 333 to the entitlement agent.

TED 603 in Conditional Access System 601: FIG. 24

FIG. 24 shows the relationship between a number of TEDs 603 and the rest of conditional access system 601. Portion 2401 of conditional access system 601 includes a CAA TED 2427 for a CAA that authorizes entitlement agents in system 601. Portion 2401 also includes one EA TED 2425 for each of the n+1 entitlement agents which the CAA has currently authorized for DHCTs 333 in digital broadband delivery system 501. Alternatively, all EA TED 2425 functions could be combined into a single TED, which could include the CAA TED 2427 function. Each TED is kept in a physically secure area 2428 and is connected to DNCS 507 by a secure high-speed link 2423 that connects only DNCS 507 and the TEDs 603. In the preferred embodiment, the secure link is a secure Ethernet link. DNCS 507 uses TED 605 to encrypt EMMs, to decrypt FPMs, to generate EA public and private keys, to generate MSKs and ISKs, and to prepare global broadcast message digests. DNCS 607 has a remote procedure call interface to the TEDs 603 for performing these operations, and, consequently, programs executing on DNCS 607 can use the facilities of a TED simply by making a procedure call.

DNCS 507 is the sole connection between a given TED 603 and the rest of conditional access system 601. DNCS 507 is connected by a network 2415 to systems belonging to the CAA and the various EAs. Each of these entities has a database containing information relative to its function. CAA 2405 has CAA database 2403, which contains at least the CAA's three public keys and encrypted versions of the corresponding three private keys, the entitlement agent identifiers for the entitlement agents that the CAA and a per-DHCT database that contains the names, types, and numbers of the NVSCs that the CAA has allocated to each entitlement agent authorized for the DHCT Each EA 2409(*i*) has its own EA database 2407(*i*). EA database 2407(*i*) preferably contains the EAID for the EA, a list of the MSK IDs and expiration dates for the MSKs that the EA is currently using, and a database of the services and/or instances that the EA is providing. This database of services contains at least the entitlement ID for each service. EA database 2407(*i*) also includes a per-DHCT database of the entitlement IDs, entitlement expiration times, and MSK IDs for the entitlements and MSKs sent in EMMs to the DHCT. The per-DHCT database may also contain customer billing information such as the information required to deal with the purchase information in an FPM.

Key certification authority 2413 is an entity which certifies the public keys of DHCTs 333 to DNCS 507. In a preferred embodiment, key certification authority 2413 is maintained by the manufacturer of DHCTs 333. DHCT key database 2411 contains a database of DHCT serial numbers and their public keys. When a user of a DHCT 333 wishes to purchase an instance of a service offered by an EA, the user sends a purchase order to the EA with the serial number (which is also the IP address) of the DHCT 333. The EA provides the serial number to DNCS 507, which maintains a database 2421 of DHCT public keys by serial number. If the serial number is not in the database, DNCS 507 sends a request for the public key to KCA 2413. The request contains the serial number, and the key certification authority responds to the request by sending a digitally signed message 2412 to DNCS 507. This message contains the DHCT's public key. DNCS 507 has the public key for the key certification authority and uses the public key and the digital signature to confirm the authenticity of the DHCT public key in the message. If the public key is authentic, DNCS 507 places it in public key database 2421.

DNCS 507 is further connected via another high-speed link 2417 to SEES 620, which is provided with MSKs for encrypting instances of services. Additionally, DNCS 507 provides global broadcast messages (GBAMs) and EMMs for broadcast via transport link 517 to the DHCTs 333. Finally, DNCS 507 is connected via the reverse path provided by LAN interconnect device 617 to the DHCTs 333 and receives FPMs from the DHCTs 333. In other embodiments, DHCT 333 may also send EMMs to DHCTs 333 by this route.

Data flows in portion 2401 are shown by labels on the arrows connecting the components. Thus, an EA 2408(*i*) sends unencrypted contents 2410 of EA EMMs and global broadcast messages to DNCS 507 and receives unencrypted contents 2412 of FPMs for the EA from DNCS 507. With EA EMMs and global broadcast messages, DNCS 507 uses EA TED 2425(*i*) to do the necessary encryption, digest making, and key generation and then sends the encrypted and authenticated EMMs and global broadcast messages, as well as the MSKs, to SEES 620, as shown at 2426 and 2418. In the case of EMMs, which are repeatedly sent over an extended period of time to the DHCTs, DNCS 507 stores the encrypted EMMs in EMM database 2420 and provides them to SEES 620 from there. With FPMs, DNCS 507 uses the EA TED 2425(*j*) for the EA 2409(*j*) to which the FPM is addressed to do the decryption and authentication and sends decrypted FPM contents 2412 to EA 2409(*i*). DNCS 507 treats CAA EMMs the same way as EA EMMs, except that the encryption and digest making is done using CAA TED 2427.

DNCS 507 also contains a database of encrypted entity information 2419, which comprises encrypted copies of the private keys and MSKs stored in the TEDs 609 that are connected to DNCS 507. This encrypted entity information is used to restore a TED if a malfunction or the physical destruction of the TED should cause loss of the key information. The encryption is done in the TED using a pass phrase. When the information has been encrypted, it is output to DNCS 507 and stored in database 2419: when the TED is restored, the information is input together with the pass phrase to the TED, which then decrypts the key information.

Detailed Implementation of TED 2425(*i*): FIG. 25

FIG. 25 is a detailed block diagram of a preferred embodiment of an EA TED 2425(*i*). In the preferred embodiment, EA TED 2425(*i*) is implemented using a standard computer motherboard and chassis with a standard Ethernet board and additional means for accelerating RSA encryption and decryption.

As shown in FIG. 25, the main components of TED 2425(*i*) are CPU 2501, memory 2505, a hardware random number generator 2537, an Ethernet board 2541, and a number of RSA accelerator boards 2539(0 . . . n), all interconnected by bus 2503. The use of more than one RSA accelerator board 2549 permits RSA encryption and/or decryption in parallel; in consequence, the preferred embodiment of TED 2425(*i*) is capable of encrypting a plurality of EMMs very rapidly, e.g., within a second, while also performing other operations involving encryption, digest making, or decryption at a similar rate.

Memory 2505 contains EA information 2507, which is the public and private key for the entitlement agent to which TED 2425(*i*) belongs, the MSKs for the EA, and code 2523, which is the code executed by CPU 2501. The parts of memory 2505 which contain code 2523 and EA information 2507 are non-volatile, with the part containing code 2523 being read-only and an the part containing EA information 2507 being both readable and writable. The code which is of interest to the present discussion includes:

(1) MSK generating code 2525, which generates MSKs and ISKs from random numbers provided by random number generator 2537;

(2) RSA key generator 2517, which generates public and private RSA keys from random numbers;

(3) MD5 code 2529, which performs the MD5 one-way hash algorithm;

(4) 3DES code 2531, which does 3DES encryption and decryption;
(5) GBAM authorization code 2533, which makes the shared-secret digest used to authenticate global broadcast messages;
(6) RSA encryption/decryption code 2535, which performs RSA encryption/decryption with the assistance of RSA hardware 2539;
(7) EA information encryption code 2536, which encrypts EA information 2507 with a pass phrase for storage in DNCS 507;
(8) EMM code 2538, which produces encrypted and authenticated EMMs; and
(9) FPM code 2540, which decrypts and checks FPMs.

EA information 2507 contains the information needed to do the encryption and authentication of GBAMs and EMMs sent on behalf of the EA represented by TED 2425($i$). EA information 2507 also facilitates and contains information for decryption and authenticity checking on FPMs directed to that EA. In a preferred embodiment. EA information 2507 includes at least: (1) EAID 2509, which is the EAID for EA 2409($i$) EA Ku 2511 and EA Kr 2513, which are the public and private keys respectively for EA 2409($i$); and (2) a MSK entry (MSKE) 2515 for each MSK being used by EA 2409($i$) in conditional access system 601 to which TED 2425($i$) belongs. Each MSKE 2515 contains MSK identifier 2517 for the MSK, the expiration time 2519, if any, for the MSK. MSK parity 2520 for the MSK, and MSK 2521 itself.

Operations Performed by EA TED 2425($i$)

When EA TED 2425($i$) is initialized, it is provided with the EAID for the EA to be represented by TED 2425($i$). It stores the EAID at 2509 and uses RSA key generation code 2517 and a random number from random number generator 2537 to generate EA public key 2511 and EA private key 2513, which are stored in EA Information 2507. A Remote Procedure Call (RPC) permits DNCS 507 to read EA public key 2511. Other RPCs permit DNCS 507 to read TED 2425($i$)'s serial number, to get and set TED 2425($i$)'s system time, and to call TED 2425($i$) to determine whether it is responding. TED 2425($i$) responds to this call with its serial number. EA TED 2425($i$) also reports a number of alarm conditions to DNCS 507. These include encryption partial and total failure, random number generation failure, memory failure, and TED and Ethernet overload.

Continuing with the encryption and authentication of EMMs, DNCS 507 has two RPCs, one for EMMs generally and one for MSK EMMs. When DNCS 507 is to make a non-MSK EMM for EA 2049($i$), it receives the following from EA 2409($i$):
(1) the serial number of the DHCT 333 which is the destination of the EMM;
(2) an EAID for EA 2409($i$);
(3) the EMM's type; and
(4) the information needed for an EMM of that particular type, for example, an entitlement bit map together with the first entitlement ID, the expiration date, and the no-expiration date flag.

DNCS 507 uses the serial number to look up the public key for the DHCT 333 in public key database 2421, uses the EAID to determine which TED 2425 to use, formats the information as required for an EMM of this type, and provides the formatted information (1123, 1125, and 1127 in FIG. 11) via the RPC to TED 2425($i$) together with the DHCT's public key. EMM code 2538 then uses MD5 code 2529 to make a digest of the formatted information and uses RSA E/D code 2535 to encrypt the formatted information with the DHCT's public key and encrypt the digest with private key 2513 for the EA. The encrypted formatted information and the encrypted digest are provided to DNCS 507, which adds whatever else is necessary and places the EMM in EMM database 2420.

For an MSK EMM, DNCS 507 receives the EAID, the DHCT serial number, the EMM type, the MSK parity, the MSKID, and any expiration date from EA 2409($i$). DNCS 507 then retrieves the DHCT serial number, formats the information, and makes the RPC call as just described. In this case, EMM code 2538 looks in EA Information 2507 to find the MSK corresponding to the MSK ID and adds the MSK to the formatted information. Then EMM code 2538 uses MD5 code 2529 to make a digest of the formatted information. EMM code 2538 then uses RSA encryption/decryption code to encrypt the formatted information with the DHCT's public key and encrypt the digest with the EA's private key and returns the EMM to DNCS 507, as described above.

The interface for giving a global broadcast message its authentication information requires the MSKID of the MSK that is to be the shared secret and the contents of the global broadcast message. GBAM authorization code 2533 in TED 2425($i$) uses the MSKID to locate MSKE 2525 for the MSK, combines MSK 2521 with the contents of the global message (GBAM header 1807 and global broadcast data 1809 in FIG. 18), and uses MD5 code 2529 to produce the digest (GBAM MAC 1805), which it returns to DNCS 507.

With messages sent from the DHCT 333 to the EA, such as the forwarded purchase message, the IP packet in which the message is sent includes the IP address of the DHCT 333 which is the source of the message, and that in turn includes the serial number of DHCT 333. DNCS 507 uses the serial number to locate the public key for DHCT 333 in public key database 2421 and provides the public key to TED 2425($i$) together with encrypted envelope key 2103, CA FPM message 2105, and FPM signed authentication 2107 from the FPM. FPM code 2540 then:
(1) uses EA public key 2511 and RSA encryption/decryption code 2535 to decrypt FPM encrypted envelope key 2103;
(2) uses 3DES code 2531 and the decrypted envelope key to decrypt FPM encrypted events 2113;
(3) uses RSA encryption/decryption code 2535 and the public key for DHCT 333 to decrypt FPM authentication 2107; and
(4) uses the decrypted encrypted events with MD5 code 2529 to produce a new hash which it compares with the decrypted value of FPM authentication 2107. If this comparison indicates that the FPM is authentic, TED 2425($i$) returns the decrypted events to DNCS 507, which in turn forwards them to EA 2409($i$).

The MSKs in MSK 2515 are generated by TED 2425($i$). The interface for MSK generation simply requires the MSKID for the new MSK, the parity for the new MSK, and any expiration time. MSK generation code 2525 receives a random number from random number generator 2537 and uses it to generate the new MSK. Then the MSKE 2515 for the new MSK is made and added to EA information 2507. If there is already an MSKE 2525 for the MSKID for the new MSK, the new MSKE replaces the existing MSKE. TED 2425($i$) also generates interactive session keys for the add interactive session EMM. Key generation is as described for the MSK EMM. Once TED 2425($i$) has provided the EMM content with the encrypted key to DNCS 507, it overwrites the area in memory 2505 where the interactive session key was stored.

CAA TEDs

CAA TEDs 2427 have the same hardware as EA TEDs, but in the preferred embodiment, they only encrypt the CAA EMMs used to establish an entitlement agent in a DHCT 333. EMM encryption is done exactly as described for EA TEDs. The only keys required for encrypting and authenticating CAA TEDs are the DHCT 333's public key and the CAA's private key. They therefore need only store one of the three public-private key pairs that represent the CAA. The CAA public-private key pair is generated elsewhere. The private key is encrypted using a pass phrase that is provided to CAA TED 2405 along with the key pair. CAA TED then decrypts the private key and stores the decrypted private key, but not the pass phrase, in memory 2505. The encrypted private key, but not the pass phrase, is stored in encrypted entity information 2419 in DNCS 507 as well.

Figure 23:
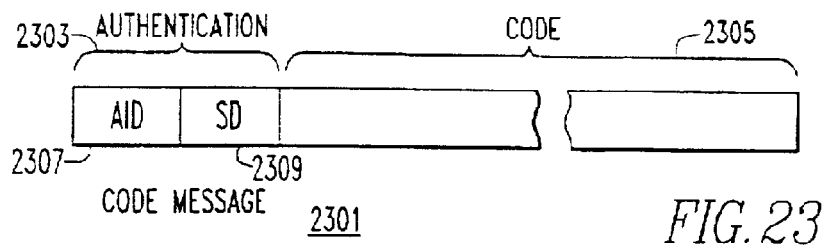
FIG. 23 is a diagram of a code message.

Authenticating Data for Applications Running on DHCT 333: FIG. 23

The foregoing has disclosed how conditional access system 601 uses the conditional access authority, the entitlement agents, DHCTSE 627, and transaction encryption device 603 to provide security for its own operations and for the keys and entitlement information required to decrypt an instance of a service. Another function of conditional access system 601 is that of ensuring secure data downloads for applications executing on DHCT 333. There are two paths by which data may be downloaded: (1) in an MPEG-2 stream via the high bandwidth path running from SEES 619 via transport network 517 to HFC network 521 to DHCT 333, and (2) in IP packets via the lower bandwidth path running from control suite 607 via LAN interconnect device 617 and QPSK modulator 621 to HFC network 521 and DHCT 333.

As with the data used in conditional access system 601, there are two aspects to the problem: security and authentication. Security may be attained by encrypting the data. In the case of data delivered by the high bandwidth path, encryption may be either by DES using an MSK when the data is intended for all DHCTs 333 having a given entitlement agent or by means of the public key for the DHCT when the data is intended for a specific DHCT 333. In the case of data delivered via the lower bandwidth path the data is addressed to the IP address of a specific DHCT 333 and may be encoded with the public key of the DHCT 333. In the case of encryption with a MSK, the MSK is provided by transaction encryption device 603, and, in the case of encryption with the public key of the DHCT 333, transaction encryption device 603 can provide the key or do the encryption itself. DHCTSE 627 contains the keys needed to do the necessary decryption in DHCT 333.

The authenticating entities in conditional access system 601 comprise the conditional access authority and the entitlement agents. Authentication of downloaded data is done in the same fashion as in EMMs, namely by using a one-way hash function to make a digest of the downloaded data and then encrypting the digest with the private key of the authenticating entity to make a sealed digest. In the preferred embodiment, the sealed digest is made in transaction encryption device 603. When the downloaded data arrives in DHCT 333, DHCTSE 627 uses the public key of the authenticating entity to decrypt the sealed digest and then uses the one-way hash function to again hash the downloaded data. If the downloaded data is authentic and has not been corrupted in transit, the decrypted sealed digest and the result of hashing the data in the one-way hash function will be equal. It should be noted at this point that the authentication is done not by the originator of the data, but rather by a CAA or EA that is known to the digital broad band delivery system. Moreover, because the CAA or EA is already known to DHCT 333, downloading of authenticated data to DHCT 333 can occur without intervention of the user of DHCT 333.

There are many ways of relating the authentication to the data being authenticated. One way is to use a GBAM as described above with regard to FIG. 20. In such a case, the GBAM payload 2003 would be the digest for the data being downloaded and entitlement agent 2005 would encrypt the digest with its private key as well as making a digest using payload 2003 and a MSK. Another way is to simply send a message via the MPEG-2 transport stream or using an IP packet that contained an authentication portion as well as the data.

One kind of data that can be downloaded using the above techniques is code to be executed by the general purpose processor in DHCT 333. The memory used by the processor includes a portion which is flash memory. That is, the memory cannot be written to like ordinary writable memory, but can be rewritten only as a whole. Such memory is typically used to hold downloadable code. FIG. 23 shows a message containing downloadable code. Code message 2301 has two parts: authentication part 2303 and code part 2305. Code part 2305 contains encrypted or unencrypted code, as the situation requires. Authentication part 2303 contains at least two items of information: authenticator identifier (AID) 2307 and sealed digest 2309. Authenticator identifier 2307 is the CAAID or EAID for the conditional access authority or entitlement agent that is authenticating code 2305; sealed digest 2309 is made by hashing code 2305 in a one-way function to make a digest and then encrypting the digest with the private key of the CAA or EA that is authenticating the code. SD 2309 is produced in a preferred environment by a transaction encryption device 605.

Code message 2301 can be sent either in a MPEG-2 transport stream or as an IP packet. Message 2301 may be broadcast to any DHCT 333 that has the authenticating CAA or EA, or it may be sent to a specific DHCT 333. In that case, the packet(s) carrying code message 2301 will include an address for DHCT 333. In the preferred embodiment, the address is DHCT 333's serial number. When code message 2301 arrives in the DHCT 333 for which it is intended, code executing on the processor performs the one-way hash function on code 2305 and provides the result together with AID 2307 and sealed digest 2309 to DHCTSE 627. DHCTSE 627 uses AID 2307 to locate the public key for the CAA or EA and then uses the public key to decrypt sealed digest 2309. Finally, it compares the hash value in decrypted sealed digest 2309 with that provided by the code executing on the processor, and, if they are equal, DHCTSE 627 signals that the code has been authenticated.

Figure 28:
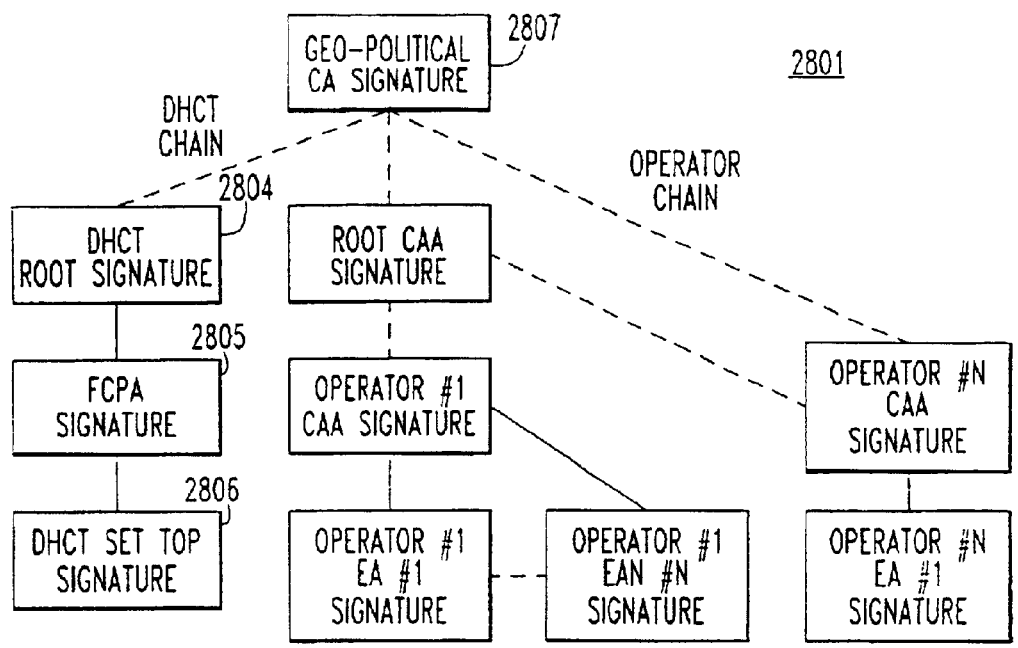
FIG. 28 is a description of a public key hierarchy.

Public Key Hierarchy (FIG. 28)

The various elements of the system described herein collectively implement a public key hierarchy 2801 within the network. This is advantageous because such a hierarchy can be used to establish the "trust chains" that support scaleable and spontaneous commercial interaction between DHCTs 333 and other networks that employ public key-based security, such as the Internet. It can also be used to establish trust in user commercial interactions with the DBDS 501.

FIG. 28 shows the hierarchy of public key certification in the DBDS. There are two independent "trust chains" shown. On the left hand side is the "DHCT chain", which establishes the validity of the public keys associated with DHCTs 333 and enables trusted use of digital signatures made by the DHCT 333. On the right hand side, is the "Operator chain" which establishes the validity of public keys associated with the network operators and the subtending EAs within each system and enables trusted use of signatures of these entities.

The DHCT signature 2806 may be used as described elsewhere herein to authenticate messages sent from the DHCT 333. However, for recipients to be able to trust such DHCT signatures as authentic, they must know with certainty that the public key claimed to be associated with DHCT 333 is in fact the true key which matches with the DHCT's private key. This is accomplished by certifying the DHCT certificate 2806 with the factory programmer certificate authority (FPCA) signature. The FPCA signature can be trusted because reference can be made to FPCA certificate 2805. The DHCT certificates 2806 and the FPCA signature as well as the FPCA certificate 2805 are preferably made at the manufacture time of DHCT 333 in a secure way. Since it may be necessary over time to issue new FPCA certificates and use new FPCA signatures, each FPCA certificate is also certified with a signature of the DHCT Root which may have its own certificate 2804. Said DHCT root certificate 2804 may either be self-signed or may be certified by another authority. DHCT root signature is preferably administered in a highly tamper-resistant device, such as one that meets the requirements of FIPS 140-1 Level 3 certification.

In the operator chain, the various EA certificates 2803 are used to make signatures in the manner described elsewhere herein. Likewise, the Operator CAA signature using the Operator CAA certificate 2802 is used to certify each EA signature as described previously herein. Above the operator CAA signature, two Root CAA signatures may be used to introduce an operator CAA 2802 to a DHCT 333 in a secure way. In fact, preferably at manufacture time, there are three Root CAA public keys placed into the secure NVM of the DHCT 333. Then, authentic messages from any two of the Root CAAs may be used to replace the third Root CAA public key with that of the Operator CAA whose key is certified in Operator CAA certificates 2802. The Root CAA is preferably administered by the manufacturer in a tamper-resistant device that meets or exceeds the requirements of FIPS 140-1 Level 3 certification. It is possible, however, through an appropriate sequence of messages, to change all of the Root CAA public keys to be those of other CAAs that the manufacturer has no control over. It is thus possible to remove the manufacturer from the signature chain. In this case, the Root CAA can be some other organization approved by one or more operators or it may be administered by an operator.

As shown in FIG. 28 and described elsewhere herein, each operator may have a plurality of EAs. In a preferred embodiment, there is a different EA and an associated EA certificate 2803 for every operating site of any given operator. This ensures that DHCTs can not be migrated between operational sites without the knowledge and participation of the operator CAA signature 2802.

The geo-political CA certificate 2807 shown in FIG. 28, is not required to operate the normal conditional access and electronic activities of the operator. However, the operator may desire to link its signature chain into a larger chain to be able to participate or have DHCTs 333 participate in transactions involving entities outside of the operator's DBDS. In this case, the signature chains may be readily linked to those of geo-political CA and its signature 2807 by having the public keys of one or all of the DHCT root signature 2804, the Root CAA signature 2808 or operator CAA signatures 2802 certified by the geo-political CA signature. This is accomplished by having a certificate placed in a database for each of the public keys associated with signatures 2804, 2808 and 2802. Said certificate is signed with the private key of the geo-political CA 2807.

Figure 29:
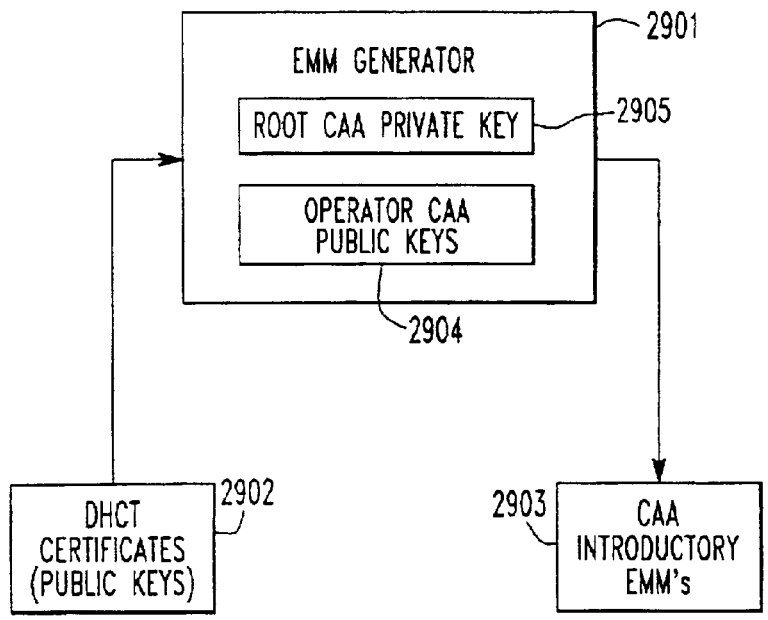
FIG. 29 is a description of an EMM generator according to the present invention.

FIG. 29 shows an EMM generator 2901. As described elsewhere herein, it is preferred that DHCTs 333 that are operated by different operators in different DBDS instances are controlled by an operator CAA that is specific to that operator and system. Since DHCTs 333 at manufacture time are not configured to be controlled by any operator CAA, but instead are controlled by three Root CAAs the public keys of which are placed in the memory of the secure processor during manufacture, they must be reconfigured for control by different operators. This must be done securely. As described elsewhere herein, messages bearing the digital signatures of two of the Root CAAs can be used to reconfigure the terminal with respect to the third CAA. The EMM generator 2901 is used to produce one of the two messages needed to introduce a new Operator CAA public key in a certified way to the DHCT 333. DHCT public key certificates 2902 are input to the EMM generator so that it may know for which DHCTs messages are to be made. The DHCTs that will be controlled by a specific operator may be placed in a separate file of the input device or may be associated with an operator in other ways clear to those skilled in the art.

Prior to generating introductory EMMs 2903, certified public keys of the various operators served by the EMM Generator 2901 are loaded into the public key memory 2904 of the EMM Generator 2901. Thus, when EMM generator 2901 reads input of DHCTs needed to be introduced to Operator A, the EMM generator uses the public key of Operator A read from memory 2904 to produce EMMs containing the public key of Operator A. Likewise, prior to generating introductory EMMs 2903, the private keys of the Root CAAs must be loaded into the private key memory 2905 of the EMM generator 2901. Said EMMs are digitally signed by the EMM Generator 2901 using the private keys of the Root CAAs contained in memory 2905. Since private signing keys are contained in memory 2905 of EMM Generator 2901, the EMM Generator 2901 must be implemented in a secure fashion that prevents discovery of the values of the Root CAA private keys stored in memory 2905. EMM Generator 2901 should thus be implemented in a tamper-resistant device which meets the requirements of FIPS 140-1 Level 3 or higher.

Since two Root CAA private keys must be used to sign separate CAA Introductory EMMs 2903, there are preferably two EMM Generators 2901 implemented, one each for each of the two Root CAA private keys. It is also preferred that EMM generators 2901 are operated in separate physical facilities.

The Detailed Description of a Preferred Embodiment set forth above is to be regarded as exemplary and not restrictive, and the breadth of the invention disclosed herein is to be determined from the claims as interpreted with the full breadth permitted by the patent laws.

What is claimed is:

1. Apparatus for representing entitlements for instances of services having entitlement IDs associated therewith in a receiver, the apparatus comprising:
   a port for receiving instances of service and at least a first message having an entitlement ID associated with a given instance of service;
   a memory having a starting entitlement ID and an indexed map of entitlement values for entitlements associated with instances of service, wherein the starting entitlement ID is used with the entitlement ID associated with the given instance of service to determine an index into the map for determining the entitlement value associated with the given instance of service, responsive to the entitlement value being a predetermined value, the receiver is entitled to the given instance of a service, and responsive to the receiver being entitled, the receiver grants access to the given instance of service.

2. The apparatus of claim 1, wherein the map represents a sequence of entitlement IDs.

3. The apparatus of claim 2, wherein the starting entitlement ID corresponds to the first entitlement ID in the sequence of entitlement IDs.

4. The apparatus of claim 3, wherein the sequence of entitlement IDs is a list.

5. The apparatus of claim 3, wherein the sequence of entitlement IDs is contiguous in the memory.

6. The apparatus of claim 5, wherein the map is a bit map representing the presence or absence of entitlements for the receiver for instances of service.

7. The apparatus of claim 3, wherein:
the map is represented by an array of elements having entitlement values that represent the presence or absence of entitlement; and
the index into the map is the difference in the sequence of entitlement IDs between the starting entitlement ID and the entitlement ID associated with the given instance of service.

8. The apparatus of claim 7, wherein:
the array has single-bit elements and the state of an element's bit indicates whether the receiver has the entitlement value represented by the array element.

9. The apparatus of claim 1, wherein:
the memory is accessible only to an access control component of the receiver.

10. The apparatus of claim 9, wherein:
the starting entitlement ID and the map are set in response to a message received in the receiver.

11. The apparatus of claim 1, wherein:
the starting entitlement ID and the map are set in response to a message received in the receiver.

12. The apparatus of claim 11; wherein:
the message contains a message starting entitlement ID and message map from which the starting entitlement ID and the map are set.

13. The apparatus of claim 12, wherein:
the memory includes at least a second map and at least a second starting entitlement ID, wherein the first map and the first starting entitlement ID are associated with a first entitlement agent, and the at least second map and the at least second starting entitlement ID are associated with at least a second entitlement agent, wherein the first message specifies the first entitlement agent and a second message specifies the at least second entitlement agent, responsive to the second message the at least second map and the at least second starting entitlement ID are set.

14. The apparatus of claim 1, further comprising:
a time value that indicates a time at which the entitlement values are not valid.

15. A method of providing a receiver with entitlements for instances of a service, the method comprising the steps of:
making a representation of entitlements that includes a starting entitlement ID and a map that specifies a set of entitlement values; and
sending a message to the receiver that contains the representation, wherein the receiver responds to the message by storing the representation and using the starting entitlement ID with the map and with an entitlement ID associated with a given instance of service to determine whether the receiver has an entitlement value for the given instance of a service.

16. The method of claim 15, wherein the map represents a sequence of entitlement IDs.

17. The method of claim 16, wherein the starting entitlement ID is the first entitlement ID in the sequence of entitlement IDs.

18. The method of claim 17, wherein the sequence of entitlement IDs is a list.

19. The method of claim 17, wherein the sequence of entitlement IDs is contiguous in the memory.

20. The method of claim 19, wherein the map is a bit map representing the presence or absence of entitlements for the receiver for instances of service.

21. The method of claim 17, wherein:
the map is represented by an array whose elements have entitlement values that represent the presence or absence of entitlement; and
the difference between the starting entitlement ID and the entitlement ID of the given instance of service is used to determine the index value for an element in the array, wherein the element having the index value represents the entitlement value of the given instance of service.

22. The method of claim 21, wherein:
the array has single-bit elements and the state of an element's bit indicates whether the receiver has the entitlement value represented by the array element.

23. The method of claim 15, wherein:
the receiver is given entitlements by at least one entitlement agent; and the method further includes the steps of:
putting a specification of a given entitlement agent in the message, wherein the receiver uses the specification to locate a list whose elements include an apparatus for representing entitlements and uses the representation of entitlements in the message to set the apparatus in the list for the given entitlement agent.

24. The method of claim 15, further comprising the steps of:
putting a time value that indicates a time at which the representation is not valid in the message; and
the receiver storing the time value and using the time value to determine whether the representation is valid.

25. The method of claim 15, further comprising the step, in the receiver, of:
determining that the receiver has an entitlement value for the given instance of service;
processing, in a secure element, a long-term key to obtain a short-term key; and
using the short-term key to decrypt the given instance of service.

26. The method of claim 15, wherein the sending step comprises the step of:
sending to the receiver a long-term key within the message.

27. The method of claim 15, wherein the message including the entitlement ID is authenticated by the receiver using information provided by an entitlement agent.

28. The method of claim 15, wherein authentication is performed using RSA digital signatures.

29. A receiver for receiving instances of service and entitlement IDs associated therewith and entitlement values for the entitlement IDs, the receiver comprising:

a memory having a starting entitlement ID and an indexed map of entitlement values that have been given to the receiver stored therein, wherein the map of entitlement values includes a particular entitlement value for a given instance of service having a particular entitlement ID associated therewith;

a processor in communication with the memory adapted to use the starting entitlement ID in conjunction with the particular entitlement ID associated with the given instance of service to determine an index into the map for determining the particular entitlement value, wherein responsive to the particular entitlement value being a predetermined value, the receiver is entitled to the given instance of service, and responsive to the receiver being entitled the processor grants access to the given instance of service.

30. The receiver of claim 29, wherein the map represents a sequence of entitlement IDs.

31. The receiver of claim 30, wherein the sequence of entitlement IDs corresponds to a discrete list of entitlement IDs.

32. The receiver of claim 30, wherein the starting entitlement ID is the first entitlement ID in the sequence of entitlement IDs.

33. The receiver of claim 30, wherein the map is represented by an array of elements having entitlement values stored therein, and the index number of the element in the array having the entitlement value for a given instance of service is determined from the sequence of entitlements IDs by the difference between the starting entitlement ID and the entitlement ID for the given instance of service.

34. The receiver of claim 29, wherein the array is a bit map.

35. The receiver of claim 29, wherein the memory is accessible only to an access control component.

36. The receiver of claim 29, wherein the starting entitlement ID and the map are set in response to a message received in the receiver.

37. A method of determining entitlements for instances of service in a receiver, the method comprising the steps, in the receiver, of:

receiving at least a first message having a starting entitlement ID and a map having entitlement values that represent entitlements of the receiver for instances of service;

storing in a memory at least the starting entitlement ID and the map of the first message;

receiving at least a second message having an entitlement ID associated with a given instance of service; and determining whether the receiver is entitled to the instance of service by using the starting entitlement ID and the entitlement ID associated with the given instance of service to determine an element of the map which has the entitlement value of the given instance of service;

wherein the map is an indexed map, of entitlement values for entitlements associated with instances of service, wherein the starting entitlement ID is used with the entitlement ID associated with the given instance of service to determine an index into the map for determining the entitlement value associated with the given instance of service, responsive to the entitlement value being a predetermined value, the receiver is entitled to the given instance of a service, and responsive to the receiver being entitled, the receiver grants access to the given instance of service.

38. The method of claim 37, wherein the map is stored as an array, the starting entitlement ID is the first entitlement ID in a sequence of entitlement IDs including the entitlement ID associated with the given instance of service, and the difference in the sequence between the starting entitlement ID and the entitlement ID associated with the given instance of service is used to determine an element in the array having the entitlement value for the given instance of service.

39. The method of claim 38, wherein the map is a bit map.

40. The method of claim 38, further comprising the step of:

authenticating the first message using information provided by an entitlement agent.

41. The method of claim 40, wherein the step of authentication is performed by using RSA digital signatures.

42. The method of claim 37, further including:

receiving at least a second message that specifies a given entitlement agent; and allocating a portion of the memory to the given entitlement agent.

43. The method of claim 42, further comprising:

receiving at least a third message having a starting entitlement ID and a map;

storing the starting entitlement ID and the map of the at least third message in the portion of the memory allocated to the given entitlement agent.

44. The method of claim 37, wherein the first message further includes a time indicator representing expiration date of the entitlements and the storing step further includes storing the expiration date; and wherein the determining step further includes:

determining whether the entitlement value for the given instance of service has expired.

45. The method of claim 37, further comprising the steps of:

receiving a third message having a long-term key;
processing in a secure element the long-term key to obtain a short-term key; and
decrypting the given instance of service with the short-term key.

* * * * *